United States Patent [19]

Adams et al.

[11] Patent Number: 4,717,916
[45] Date of Patent: Jan. 5, 1988

[54] HIGH RESOLUTION IMAGING DOPPLER INTERFEROMETER

[75] Inventors: Gene W. Adams, Richmond, Utah; John W. Brosnahan, Longmont, Colo.

[73] Assignee: Holodyne Ltd., 1986, Longmont, Colo.

[21] Appl. No.: 864,436

[22] Filed: May 16, 1986

[51] Int. Cl.$^4$ .................... G01S 13/48; G01S 13/89; G01S 15/89; G01N 29/00
[52] U.S. Cl. ............................ 342/107; 342/156; 342/179; 342/194; 342/444; 367/8; 73/602
[58] Field of Search ............... 342/25, 107, 108, 115, 342/156, 161, 179, 192, 194, 195, 196, 417, 444; 364/516, 517; 367/7, 8; 73/602, 603

[56] References Cited

U.S. PATENT DOCUMENTS

| | | | |
|---|---|---|---|
| 3,717,843 | 2/1973 | Farrah et al. | 342/179 X |
| 3,719,922 | 3/1973 | Lopes, Jr. et al. | 342/179 X |
| 3,953,822 | 4/1976 | Vilkomerson | 342/179 X |
| 4,034,370 | 7/1977 | Mims | 342/194 X |
| 4,219,811 | 8/1980 | Herman et al. | 342/194 X |
| 4,385,301 | 5/1983 | Tricoles et al. | 367/9 X |
| 4,549,184 | 10/1985 | Boles et al. | 342/107 X |
| 4,639,733 | 1/1987 | King et al. | 342/444 X |

FOREIGN PATENT DOCUMENTS 2104753 1/1983 United Kingdom ............... 342/179

OTHER PUBLICATIONS

R. Keith Raney, Synthetic Aperture Imaging Radar and Moving Targets, May 71, IEEE Trans. on Aerospace: Elec. Sys., vol. AES-7, No. 3.

Primary Examiner—T. H. Tubbesing
Assistant Examiner—Gilberto Barrón, Jr.
Attorney, Agent, or Firm—Dorr, Carson, Sloan & Peterson

[57] ABSTRACT

A system for simultaneously locating a plurality of targets and distinguishing the targets from noise which utilizes phase detector techniques to generate complex voltage signals and obtain phase information. Spectral analysis is performed on the complex voltage temporal functions to generate doppler frequency functions. Both spectral phase functions and spectral amplitude functions are generated from the doppler frequency functions. Spectral phase functions are analyzed using interferometry techniques to determine if a potential target has a common locational source from returns of a plurality of sensors. A zenith angle is also generated using interferometry techniques to provide locational information of the multiple targets. Range gating and two frequency range detection methods provide high resolution range information as to the location of the targets. High resolution range information and two dimensional zenith angle information are used to provide an image of the targets. The present invention uses a two-frequency pulse which can be generated simultaneously or sequenced within a pulse in a manner which is phase coherent. The two-frequency pulse eliminates problems associated with range aliasing, zenith angle aliasing, scattering point analysis and allows for range location with high resolution. An error correction factor is also generated which eliminates spectral smearing.

41 Claims, 30 Drawing Figures

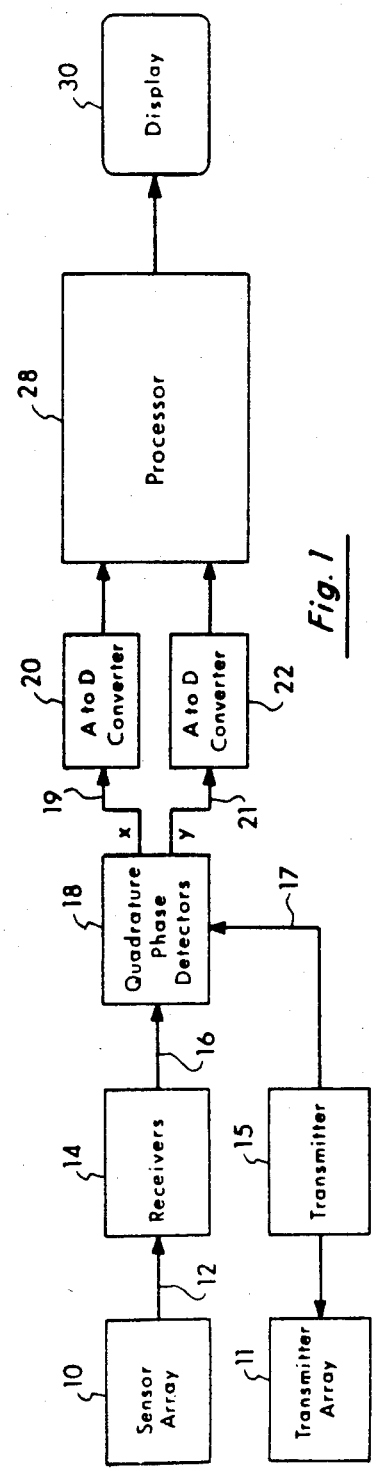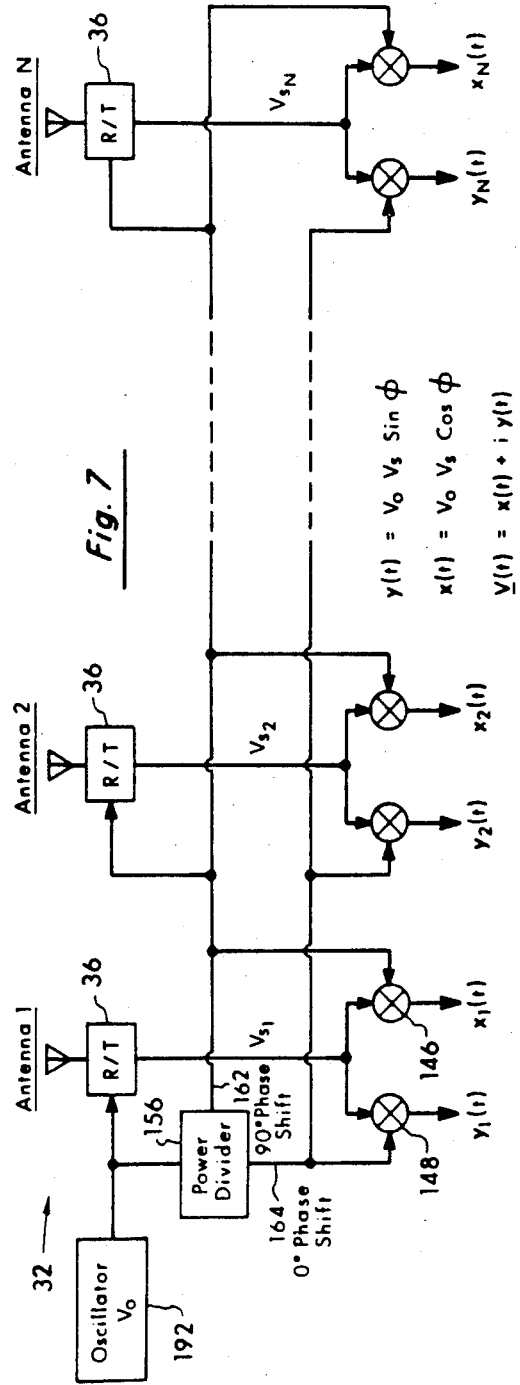

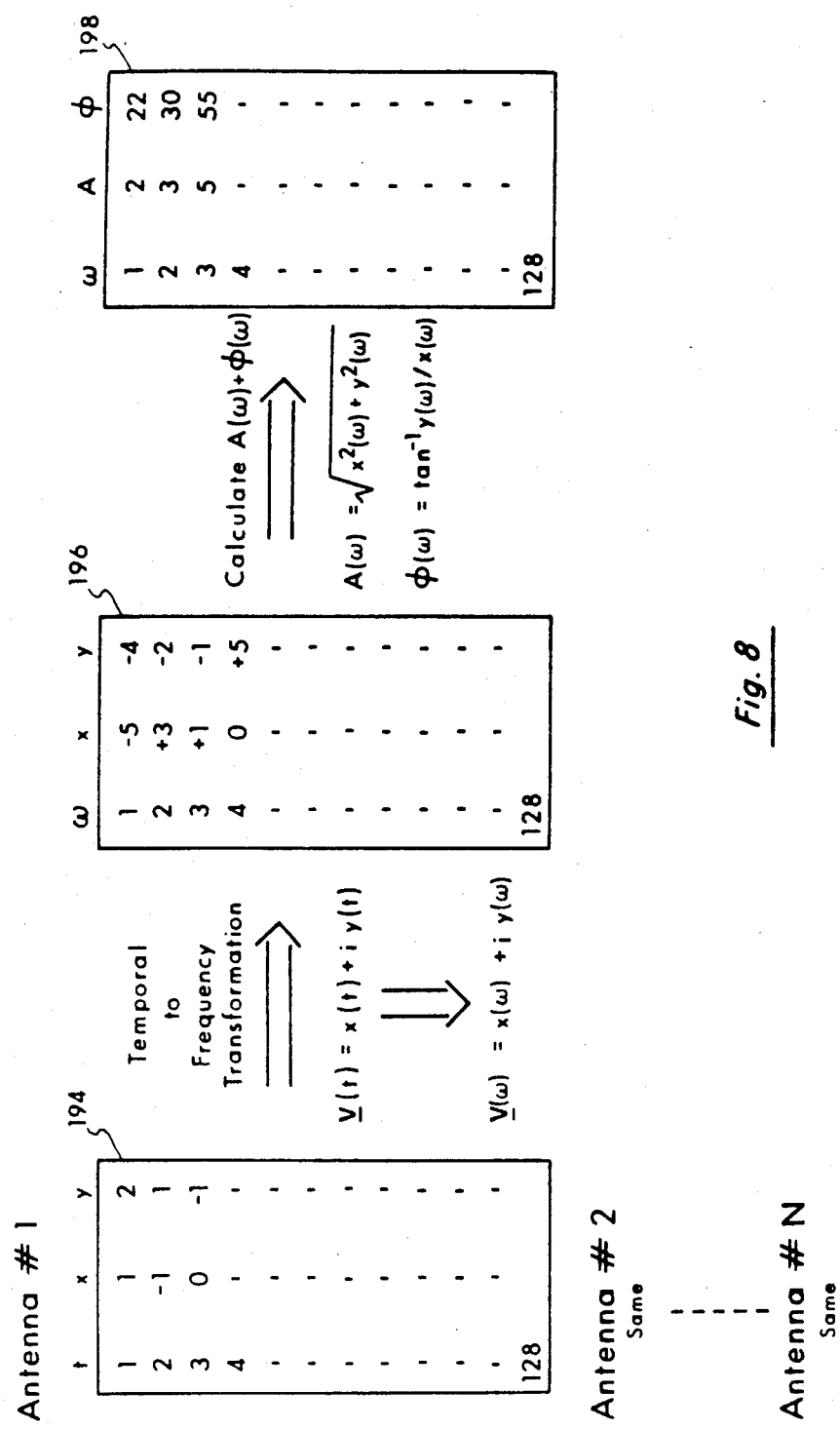

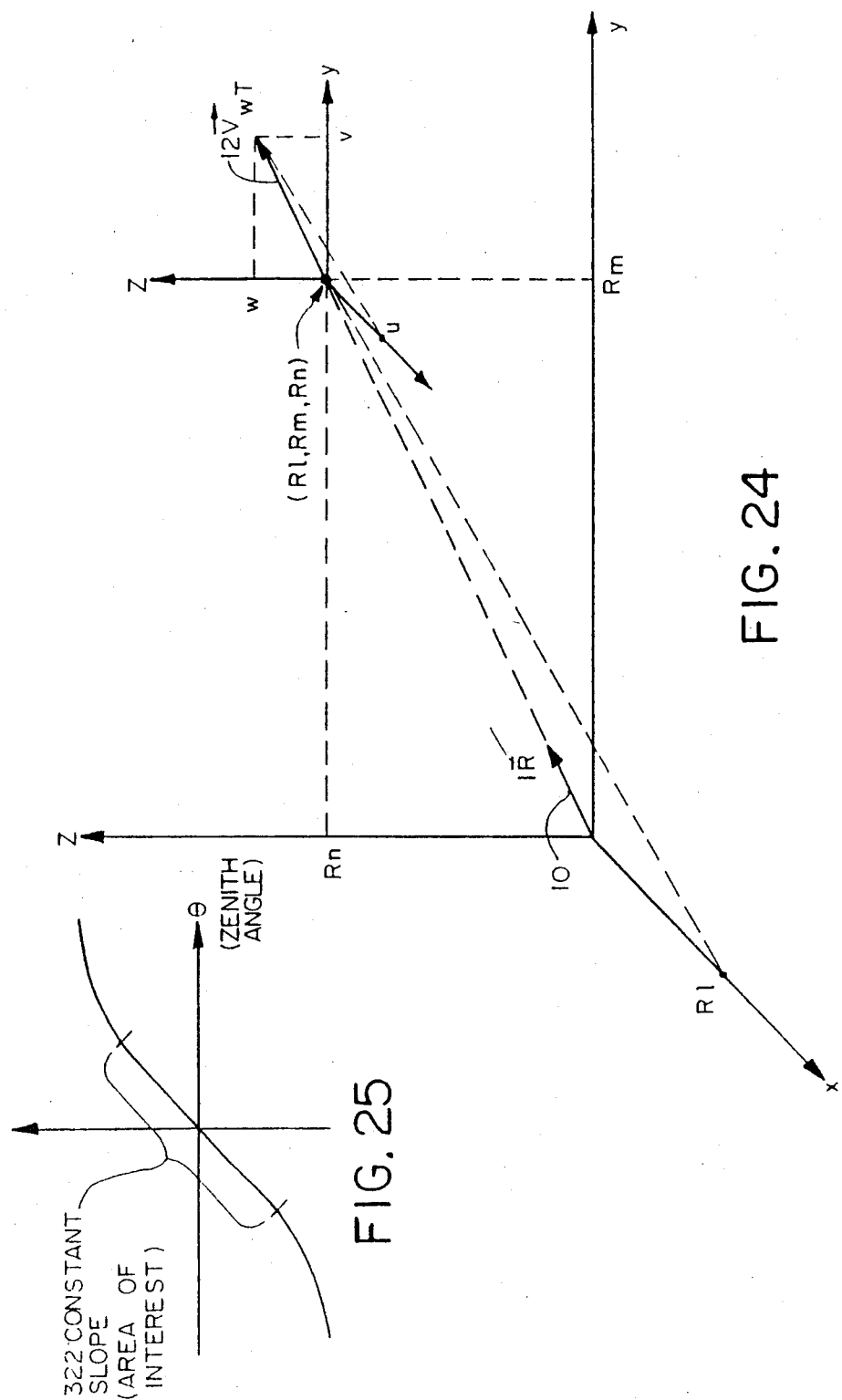

HIGH RESOLUTION IMAGING DOPPLER INTERFEROMETER

BACKGROUND OF THE INVENTION

The present invention pertains generally to pulsed sounder imaging and more specifically to high resolution, three dimensional imaging of a large number of independently moving targets.

There are two broad classes of methods for generating pictures of target arrays, i.e., optical methods and raster scanning methods. Optical imaging produces a discernible picture by receiving light signals from the entire target array simultaneously, and employs a lens to sort, or focus, the various signals to form the image. Three dimensional pictures are achieved by using either stereographic viewing systems or by employing holographic techniques. A time series of images must be viewed to obtain motion information of targets in an array using optical imaging. The closest optical analogue to the present invention is the imaging Michelson Interferometer as disclosed by G. G. Shepherd, W. A. Gault, R. A. Koehler, J. C. McConnell, K. V. Paulson, E. J. Llewellyn, C. D. Anger, L. L. Cogger, J. W. Haslett, D. R. Moorcrott and R. L. Gettinger, "Optical Doppler Imaging of the Aurora Borealis", Geophys. Res. Ltrs. of Vol. II No. 10, pp. 1003 to 1006 (1984).

Fourier transform holography techniques have been used in an attempt to image electromagnetic radiation outside of the visible spectral region, but such techniques require extensive sensor arrays.

The other method of generating images of a target array comprises raster scanning which produces a picture by scanning, or mapping, the target array. Raster scanning requires that a narrow sensor beam be formed to obtain spatial resolution. The object being imaged must then be scanned at a rate which is faster than any significant changes in movement of the object (target). Radial velocities of objects (targets) can be measured using the raster scanning system by determining the doppler frequency, but this occurs only at considerable expense in resolution.

One area of particular interest for over thirty years in locating and imaging targets had been the use of medium frequency radars to explore the middle atmosphere, as disclosed by F. F. Gardner and J. L. Pawsey, "Study of the Ionospheric D-region Using Partial Reflections," J. Atmos. Terr. Phys. 3, 321–344, 1953. Since that time, there have been a considerable number of suggestions regarding the physical source of observed weak scattering. These include single target scattering from horizontally continuous layers as disclosed by Gardner and Pawsey, supra.; J. B. Gregory, "Radio Wave Reflections From the Mesosphere," J. Geophys. Res. 66, 429–445, 1961; volume scattering from small (as compared to a fresnel zone) turbulent irregularities in the electron density as disclosed by Gardner and Pawsey, supra.; J. S. Belrose and M. J. Burke, "Study of the Lower Ionosphere Using Partial Reflection, 1. Experimental Technique and Method of Analysis," J. Geophys. Res 69, 2799–2818, 1964; W. A. Flood, "Revised Theory for Partial Reflection D-region Measurements," J. Geophys. Res. 73 (17), 5585–5598, 1968; A. H. Manson, M. W. J. Merry and R. A. Vincent, "Relationship Between the Partial Reflection of Radio Waves From the Lower Ionosphere and Irregularities as Measured by Rocket Probes," Radio Sci. 4(10), 955–958, 1969; H. A. Von Biel, "Amplitude Distributions of D-region Partial Reflections," J. Geophys. Res. 76, 8365–8367, 1971; B. Tanenbaum, J. Samuel, H. Shapiro, and J. E. Reed, "Phase-difference Distributions in a D-region Partial Reflection Experiment," Radio Sci. 8, 437–448, 1973; D. B. Newman, Jr. and A. J. Ferraro, "Sensitivity Study of the Partial Reflection Experiment," J. Geophys. Res. 78, 774–777, 1973; volume scattering from irregularities in the electron neutral collision frequency as disclosed by W. R. Piggott and E. V. Thrane, "The Effect of Irregularities in Collision Frequency on the Amplitude of Weak Partial Reflections," J. Atmos. Terr. Phys. 28, 311–314, 1966; multiple large discrete irregularities as disclosed by J. B. Gregory and A. H. Manson, "Seasonal Variations of Electron Densities Below 100 km at Mid-latitude. I. Differential Absorption Measurements," J. Atmos. Terr. Phys. 31, 683–701, 1969; G. L. Austin and A. H. Manson, "On the Nature of the Irregularities That Produce Partial Reflections of Radio Waves From the Lower Ionosphere (70–100 km)," Radio Science 4(1), 35–40, 1969; G. L. Austin, R. G. T. Bennett, and M. R. Thorpe, "The Phase of Waves Partially Reflected From the Lower Ionosphere (70–120 km)," J. Atmos. Terrest. Phys. 31, 1299–1106, 1969; D. J. Cohen and A. J. Ferraro, Modeling the D-region Partial Reflection Experiment, Radio Sci. 8, 459–465, 1973; constructive interference from fortunately spaced vertical stratifications as disclosed by T. Beer, "D-region Parameters From the Extraordinary component of Partial Reflections," Ann. Geophys. 28, 341–347, 1972; a large number of small scatters, highly dispersed horizontally but highly concentrated vertically as disclosed by J. D. Mathews, J. H. Shapiro, and B. S. Tanenbaum, "Evidence for Distributed Scattering in D-region Partial-reflection Processes," J. Geophys. Res. 78(34), 8266–8275, 1973; irregularities caused directly by gravity waves as disclosed by C. O. Hines, "Internal Atmospheric Gravity Waves at Ionospheric Heights," Can. J. Phys. 38, 1441–1481, 1960; A. H. Manson, J. B. Gregory, and D. G. Stephenson, "Winds and Wave Motions (70–100 km) as Measured By a Partial-reflection Radiowave System," J. Atmos. Terrest. Phys. 35, 2055–2067, 1973; reflections from the top and bottom of a turbulent sheer flow layer as disclosed by K. Schlegel, A. Brekke, and A. Haug, "Some Characteristics of the Quiet Polar D-region and Mesosphere Obtained With the Partial Reflection Method," J. Atmos. Terrest. Phys. 40, 205–213, 1978; P. K. Rastogi and O. Holt, "On Detecting Reflections in Presence of Scattering From Amplitude Statistics With Application to D-region Partial-reflections, Radio Sci. 16(6), 1431–1443, 1981; oscillations caused by surface, or ducted waves as disclosed by R. M. Harper and R. F. Woodman, "Preliminary Multiheight Radar Observations of Waves and Winds in the Mesosphere Over Jicamarca," J. Atmos. Terrest. Phys. 39, 959–963, 1977; interference modes of acoustic waves as disclosed by K. Schlegel, E. V. Thrane, and A. Brekke, "Partial Reflection Results in the Auroral D-region Explained in Terms of Acoustic Waves," J. Atmos Terrest. Phys. 42, 809–814, 1980; and Bragg scattering from gravity waves as disclosed by R. M. Jones and R. N. Grubb, "D-region Partial Reflection Doppler Measurements With the NOAA/MPE Digital HF Radar, Max-Planck Institut Fur Aeronomie," Rpt. No. MPAE-W-02-80-20, September 1980; R. M. Jones, G. W. Adams, and D. C. Walden, "Preliminary Partial Reflection Measurements at Brighton, Colo. on 9 Jan. 1981, NOAA Tech.

Memo," ERL SEL-80, 1982. These references are specifically incorporated herein by reference for all that they disclose.

There has been considerable development in the understanding of the nature of the scattering processes. Several studies have shown that there appear to be periodic wave patterns, rather than random patterns moving across antenna fields from E-region reflections, as disclosed by R. F. Kelleher, "Some Statistical Properties of the Ground Diffraction Patterns of Vertically Reflected Radio Waves," J. Atmos. Terrest. Phys. 28, 213–223, 1966; M. G. Golley and D. E. Rossiter, "Some Tests of Methods of Analysis of Ionospheric Drift Records Using an Array of 89 Aerials," J. Atmos. Terrest. Phys. 33, 701–714, 1971; W. Pfister, "The Wave-Like Nature of Inhomogeneities in the E-region," J. Atmos. Terrest. Phys. 33, 999–1025, 1971; and from D-region partial reflections as disclosed by M. G. Golley and D. E. Rossiter, "Some Tests of Methods of Analysis of Ionospheric Drift Records Using an Array of 9 Aerials," J. Atmos. Terrest. Phys. 3, 701–714, 1971. The specularity, or aspect sensitivity, of the scatters at medium frequencies was first noted by Gardner and Pawsey, supra. and has been studied by B. C. Lindner, "The Nature of D-region Scattering of Vertical Incidence Radiowaves I. Generalized Statistical Theory of Diversity Effects Between Spaced Receiving Antennas," Aust. J. Phys. 28, 163–170, 1975a; B. C. Lindner, "The Nature of D-Region Scattering of Vertical Incidence Radiowaves II. Experimental Observations Using Spaced Antenna Reception," Aust. J. Phys. 28, 171–184, 1975b; R. A. Vincent and J. S. Belrose, "The Angular Distribution of Radio Waves Partially Reflected From the Lower Ionosphere," J. Atmos. Terrest. Phys. 40, 35–47, 1978; K. L. Jones, "Angular Variation of Partial Reflections from the D-region Using a Steerable Beam Radar," J. Atmos. Terrest. Phys. 42, 569–575, 1979; W. K. Hocking, "Angular and Temporal Characteristics of Partial Reflections from the D-region of the Ionosphere," J. Geophys. Res. 84(A-3), 845–851, 1979; W. K. Hocking, "Investigations of the Movement and Structure of D-region Ionospheric Irregularities," Ph.D. Thesis, Physics Dept. Univ. Adelaide, Australia, 1981. The picture that has emerged from this work is that the scattering is highly specular below 75 kilometers, and most of the radar pulse is returned within a few degrees of vertical. Off-vertical scattering increases rapidly with increasing altitude, exceeding a ten degree width by 85 kilometers. Above the mesopause, the specularity has been observed to increase again. Measurements at VHF (P. Czechowsky, R. Ruster, and G. Schmidt, "Variations of Mesospheric Structures in Different Seasons," Geophys. Res. Lett. 6(6), 459–462, 1979; W. L. Ecklund and B. B. Balsley, "Long-term Observations of the Arctic Mesosphere with the MST Radar at Poker Flat, Alaska," J. Geophys. Res. 86, 7775–7780, 1981; B. B. Balsley, "The MST Technique—A Brief Review," J. Atmos. Terrest. Phys. 43(516), 495–509, 1981; J. Rottger, "Investigations of Lower and Middle Atmosphere Dynamics with Spaced Antenna Drifts Radars," J. Atmos. Terrest. Phys. 43(4) 277–292, 1981), have revealed considerable detail about the mesospheric scattering structures observed at 50 MHz. A high degree of specularity is observed at these frequencies also, except at high latitudes. The VHF results suggest a two-component scattering mechanism; one specular and sporadic, and the other isotropic and more constant in time. All of these references are specifically incorporated herein by reference for all that they disclose.

The structures that scatter medium frequency radar pulses appear to occur on scales smaller than can be resolved with a practical antenna beam so that there is no practical way of imaging the targets. For example, beam forming techniques produce a beam which is tens of kilometers wide at altitudes of 80 kilometers. Clearly, this size beam is incapable of providing sufficient resolution to image targets. Of course, the same problems exist in ultrasonic imaging and sonar imaging.

Apart from imaging, time domain interferometry techniques have been used by radio-astronomers for many years to locate distant targets such as distant stars and galaxies with a high degree of precision. Interferometry techniques are capable of determining the zenith angle to locate one specific target with high precision. The detected red shift of the target indicates its doppler frequency.

Consequently, time domain interferometry techniques have been used by radio astronomers to provide high resolution information pertaining to the zenith angle of a single target. This clearly overcomes the low-resolution problems associated with steered beams.

Pfister, supra., originally suggested that Fourier transformations could be performed on data reflected from targets and the phase differences compared to locate the target. This technique was attempted by D. C. Cox, N. Cainos, and A. T. Watermann, "A Technique for Obtaining the Doppler Spectrum from Sampled Amplitude-Phase Data in a Data-gathering Array," IEEE Trans. Ant. Prop. AP-18(4) 580-582, 1970, which utilized a physically steered beam and examined the Fourier transform of the returned data. Since Cox et al. utilized a physically steered beam, the resolution of the data was limited by the resolution of the physically steered beam.

The technique suggested by Pfister, supra. was later used by D. T. Farley, H. Ierkic, and B. G. Fejer for "Radar Interferometry: A New Technique for Studying Plasma Turbulence in the Ionosphere," J. Geophys. Res. 86, 1467–1472, 1981. As disclosed by Farley et al., two complex voltage signals were detected from each of two antennas from which both amplitude and phase data were derived. Interferometry techniques were then utilized by Farley et al. to locate the target by zenith angle in one dimension. Farley et al. then distinguished targets from noise by observing the data in a series of time interval returns to determine the temporal persistence of a potential target. If a potential target did not persist for several time intervals, it was determined to be noise. A three-antenna array formed in a triangle was later suggested by H. M. Ierkic and J. Rottger in "Mesopheric Measurements of Irregularity Patches Using a Three Antenna Interferometer", Proceedings, Second Workshop on Technical Aspects of MST Radar, Urbana, Ill. May 21-25, 1984. Ierkic et al. again utilized temporal persistence to distinguish targets from noise.

U.S. Pat. No. 4,172,255 issued Oct. 23, 1979 to Barrick et al. discloses an HF coastal current mapping radar system which utilizes two separate radar transmitters and receivers which look at specific points in the ocean to determine the radial velocity vector of the movement of surface currents of the ocean as a result of moving waveforms. The doppler frequency is used at each separate antenna location to determine the speed of movement of the waves. The radial velocities determined in this manner are combined trigonometrically to determine the true direction and speed of the waveforms. This provides information regarding movement of surface currents. As disclosed in FIG. 5 of the Barrick et al. patent, a particular point in the ocean is selected for investigation using the phase difference of the returned signals. This is the same technique used by Farley et al., supra., except that rather than determining a one-dimensional zenith angle, Barrick et al. determines a one-dimensional azimuth angle.

Consequently, Barrick et al. essentially performs the same techniques as disclosed by Farley et al. with the exception that a point is being selected in the azimuthal plane by Barrick et al., rather than a zenith angle, as disclosed by Farley et al. Other differences also exist between the manner in which the data is utilized. Farley et al. used the one-dimensional zenith angle data to distinguish targets from noise by recognizing the time persistence of the target over several sampling periods. The temporal persistence of the target functions to distinguish the target from noise. Barrick et al., on the other hand, is not interested in locating specified targets, but rather, locates specific points on the surface of the ocean using interferometry techniques. The selected specified point is then analyzed to determine the radial speed of the target relative to each of the two antenna locations. This inforamtion is analyzed trigonometrically to produce a vector velocity indicating the speed and direction of the wave motion.

Again, neither of these references uses a comparison of phase angles of the received data to eliminate noise. Barrick et al. merely compares phase values to select a specified point to analyze. Consequently, Barrick et al. has not even addressed the question of identifying the location of a detected target, but rather, uses interferometry techniques to select a predetermined location to be examined. Farley et al., on the other hand, relies upon temporal persistence of the target, as disclosed above, to distinguish the targets from noise. Both of these techniques rely upon data in a single plane, i.e., a zenith angle in a single plane, as disclosed by Farley et al. and an azimuth angle, as disclosed by Barrick et al.

Consequently, the prior art has failed to provide a device which is capable of generating three dimensional data with high resolution so that an image can be formed of an object. Moreover, prior art techniques have been unable to accurately distinguish noise from target data without losing temporal resolution.

SUMMARY OF THE INVENTION

The present invention overcomes disadvantages and limitations of the prior art by providing an imaging doppler interferometer which is capable of high resolution, three dimensional imaging. The present invention comprises a process of locating and distinguishing targets comprising the steps of transmitting a temporal series of pulses to illuminate the targets; detecting the temporal series of pulses reflected from the targets by at least three independent sensors; producing complex voltage temporal functions at each of the independent sensors; transforming the complex voltage temporal functions to complex voltage doppler functions which vary with a doppler frequency (w) indicative of relative movement between the targets and the sensors; generating phase value functions from the complex voltage doppler frequency functions which vary as a function of doppler frequency (w); analyzing the phase value functions to distinguish the targets from noise and locate the targets in zenith angle by comparing differences in phase amplitudes of the phase value functions as a function of spatial separation of the independent sensors such that a common locational source of the temporal series of pulses returned from the targets can be identified; generating at least one correction factor function which varies with the rate of change of the doppler frequency (w); modifying the complex voltage temporal functions by a previously generated correction factor function to correct the complex voltage temporal functions for spectral smearing.

An advantage of the present invention is that targets can be distinguished from noise by the simultaneous use of the individual sensors within the sensor array. Unlike prior art devices such as Farley et al., supra., and Ierkic et al., supra., which rely upon temporal persistence of a target to distinguish targets from noise, the present invention uses a single sample of data having a number of individual sensors to determine whether the signal is being returned from a common locational point. In other words, the present invention relies upon a spatial coincidence of scattering points by comparing phase values of the independent sensors simultaneously, rather than temporal persistence which relies upon identifying target in a series of time interval returns. Moreover, the present invention provides zenith angle data in two dimensions together with range (time-of-flight) data and radial movement derived from the doppler frequency. Consequently, the spatial location of multiple targets can be determined simultaneously to form images of said targets. The radial motion of the targets provides data from which the collective motion of the targets is derived.

The dual frequency produced by the present invention allows the range of the targets to be resolved with a high degree of resolution. A difference frequency is selected so that the wavelength of the difference frequency is longer than the range gate. This allows the target to be precisely detected within the range gate by determining the phase of the difference frequency signal. Additionally, the difference frequency signal eliminates zenith angle aliasing by providing a long wavelength signal which does not vary by more than 360 degrees across the sky. Consequently, the targets can be located without aliasing by generating a difference phase signal from the difference frequency signal which is capable of locating the zenith angle with a first crude resolution without aliasing. In a similar manner, the sum frequency provides a sum phase signal which is capable of resolving the zenith angle with a very high degree of resolution using the crude resolution information from the difference frequency signal.

Another advantage of the present invention is that spectral smearing resulting from a change in location of the targets during the temporal to doppler frequency transformation periods is eliminated by a correction factor generated by the present device.

BRIEF DESCRIPTION OF THE DRAWINGS

FIG. 1 is a schematic block diagram of the system of the present invention.

FIG. 7 is a schematic block diagram of the quadrature phase detector of the present invention.

FIG. 8 is a schematic diagram of the transformation techniques utilized in accordance with the present invention.

FIG. 13 is an example of a displacement pattern table for use with the present invention.

FIG. 16 discloses the manner in which the range gate is calculated.

FIG. 20 discloses a sensor array configuration.

FIG. 21 discloses an alternative sensor array configuration.

FIG. 24 is a graph of a wind vector located in a cartesian coordinate system at a location (l, m, n).

FIG. 25 is a graph of radial velocity versus azimuthal angle for a target having a constant horizontal velocity.

DETAILED DESCRIPTION OF THE INVENTION

Figure 2:
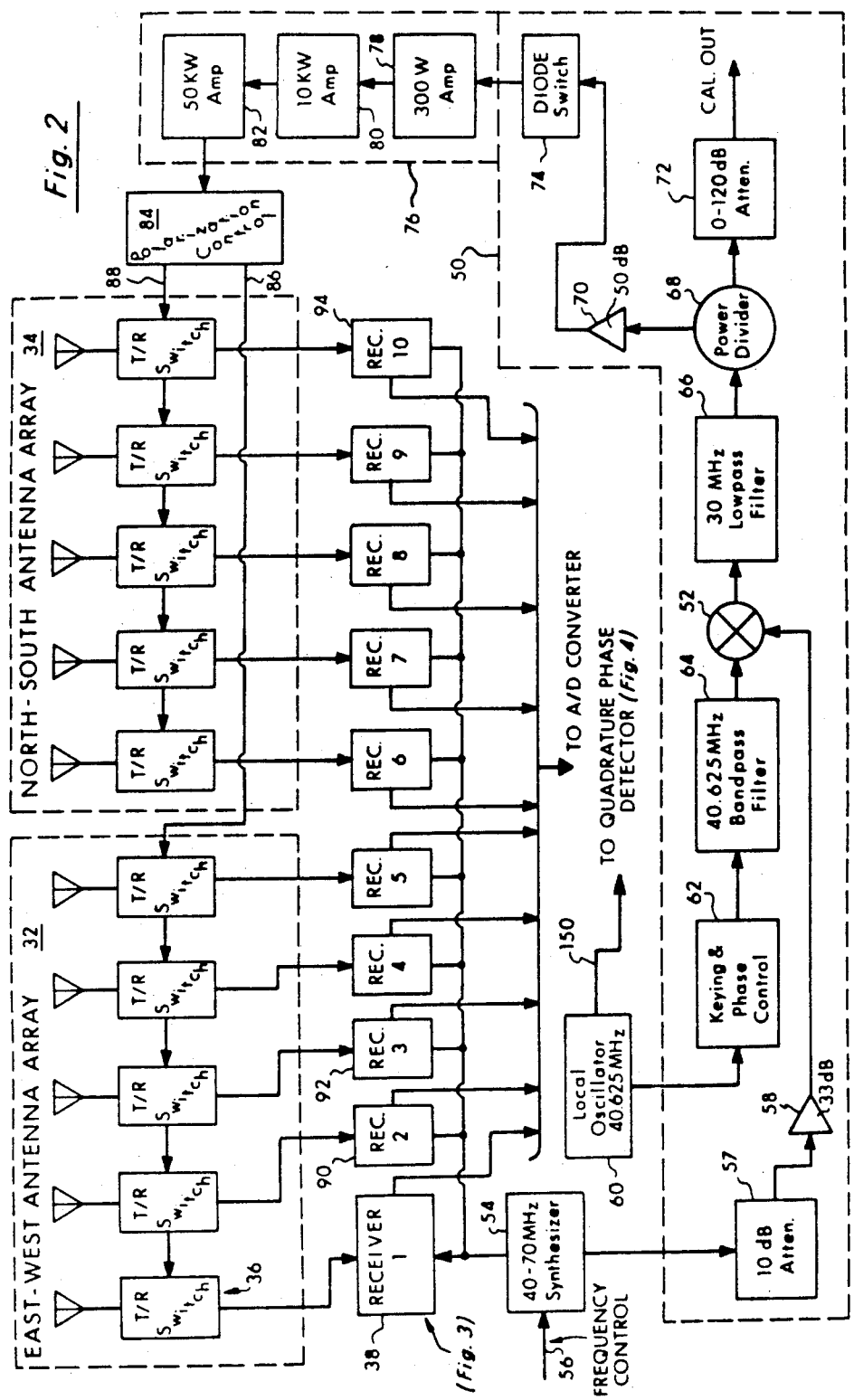
FIG. 2 is a detailed schematic block diagram of the antenna arrays, transmission and drive module, pulsed amplifier stages, receiver circuit array, polarization control, synthesizer and local oscillator of the present invention.

FIG. 1 schematically illustrates, in a block diagram form, the primary components of the present invention.

The transmitter array 11 is used to transmit a time series of pulses via transmitter 15. The sensor array 10 functions to detect the time series of pulses reflected from the target. In certain applications, the transmitter 11 and sensors 10 can comprise the same hardware or separate components. Any desired form of transmitter array 11 or sensor array 10 can be used which is capable of generating a time series of pulses which are capable of being detected subsequent to reflection or scattering by a target. The target which reflects the time series pulses can comprise any desired target, such as radar targets capable of partial reflections, sonar targets, ultrasound targets, laser targets, or any object which is capable of reflecting, at least partially reflecting or scattering some detectable form of a time series pulse. Additionally, the present invention can utilize sensors only if a self luminous source is being detected. Self luminous sources can take the form of a nuclear radiation generator, magnetic generator, electromagnetic radiation generator, a sound or vibrational generator, all of which are applicable for use with the present invention, as long as these sources produce a detectable signal. Consequently, the targets generally comprise anything which is capable of reflecting or scattering a time series of pulses or which is self-luminous and produces detectable signals. Such signals can be in the form of sound, vibrational pulses, electromagnetic radiation, or particulate radiation and can cover a wide range of frequencies as long as they are detectable by the sensors being employed.

For example, the present invention can be utilized as a real-time wind shear detector around airports, aircraft carriers, etc. Currently available wind shear detectors can only examine a few selected spots for wind shear. This greatly limits the safety aspects of airport operations and influences take-off and landing schedules considerably. The present invention can utilize electromagnetic radiation in the frequency range of 30 to 1000 MHz, for example, to obtain images of clear air turbulence and wind shear. Acoustic sounders can also be utilized to obtain wind shear and air turbulence data. The present invention is capable of imaging from ground level to a several mile radius in all directions simultaneously. A graphical display can be produced by the present invention which illustrates the surrounding environment of an airport including air traffic, regions of clear air turbulence and wind shear.

The present invention can also be utilized to provide a surface, two dimensional, or three dimensional description of the behavior of a fluid, i.e., liquid, gas, or plasma unbounded or flowing in a pipe or channel, such as an oil pipeline, wind tunnel, or magnetic plasma chamber. Prior art techniques of flow analysis have been limited to dye tracers and strips of tissue paper on wires to analyze the flow characteristics of certain fluids. The present invention is capable of providing a three dimensional doppler image of the flow utilizing a relatively small number of sensors, e.g. 5 sensors, to characterize the flow. Furthermore, the entire transducer array can be formed into the physical structure determining the flow so that no perturbation of the flow is caused by the sensors. The present invention can also be used to map both surface and internal flow characteristics and perturbations of small and large bodies of water.

The present invention can also be used as a sonar device to generate images of submarine or geographical features in the ocean. As a sonar device for submarine imaging, the present invention can be implemented using transmitter and sensor arrays similar to existing arrays. For example, sensors can be deployed in the underwater portions of a surface ship or along the length of a submarine to achieve maximum separation. The present invention would then be capable of providing photograph-like images of underwater terrain and underwater objects such as submarines.

The present invention is also useful in swarm tracking and imaging since it is capable of generating individual doppler images of a plurality of independently moving targets. Consequently, it is directly applicable to use in following elements of swarms, such as flocks of birds, bees, or a large number of targets, such as missiles or airplanes.

The present invention can also be utilized for three dimensional imaging in medicine and dentistry using ultra-sonics to achieve a resolution comparable to x-rays. X-ray imaging produces considerable apprehension and concern by patients because of the health hazards associated with ionizing electromagnetic radiation. Ultra-sonic techniques provide a safe alternative, but to date, have been unable to provide a resolution sufficient to be of interest to the medical and dental profession. The present invention, however, achieves resolution comparable to x-rays with ultra-sonic techniques and is capable of providing three-dimensional images which cannot be produced by prior art x-ray techniques. The present invention has particular application in dental imaging since repetitive exposure of the brain to x-rays is of special concern. Furthermore, because x-rays are limited by the viewing angle which can be achieved, the present invention is particularly useful in providing a wide range of selectable viewing angles. The present invention could be implemented as five rows of 120 transducers which are placed to make physical contact around either the upper or lower jaw. The application of the present invention to dental medicine would eliminate the dangers associated with x-rays, while simultaneously providing three-dimensional image information which has not been achievable in the prior art.

Similarly, radiation flux from fluoroscopy can be eliminated using the present invention. The present invention can be used as a medical tool in a manner similar to a fluoroscope to view an image of an internal body part as it is moved and manipulated by the doctor. This would allow doctors to view internal body portions of a patient with a completely safe office diagnostic tool rather than a somewhat hazardous hospital diagnostic tool.

The present invention can also be used in materials testing to examine the interior of a solid body for defects, cracks, thickness uniformity, etc. Prior art techniques of material testing normally utilize x-rays. The present invention can be utilized to examine structural features, such as welds, in a manner which achieves the resolution afforded by x-ray techniques. For example, pipeline welds can be examined using ultrasonic arrays formed to make physical contact with the circumference of the pipe.

In each of these cases, the sensors 10 produce a complex voltage signal $\underline{V}(t)$ which is applied to receivers 14 via connector 12. Receivers 14 function to amplify the complex voltage signals produced by sensors 10. In accordance with the present invention, a separate complex voltage signal is produced for each sensor element of the sensor array 10. Each of these complex voltage signals is individually amplified by receivers 14.

These individually amplified complex voltage signals are then applied to quadrature phase detectors 18 which function to separate the quadrature components of the complex voltage signal into an in-phase quadrature component x(t) and a 90 degree quadrature component y(t), hereinafter referred to as the in-phase and quadrature components. This is accomplished by multiplying the sensed signal with the in-phase version of the transmitted signal to obtain the in-phase component x(t), and also multiplying the sensed signal by a 90 degrees phase-shifted version of the transmitted signal to produce the quadrature component y(t). The in-phase signal x(t) and the quadrature component y(t) are referred to as the quadrature phase signals or time domain quadrature signals. The quadrature phase signals are applied to analog-to-digital (A to D) converters 20 and 22 via connectors 19, 21. A to D converters 20, 22 convert the analog quadrature phase signals to digital signals which are applied to processor 28 which performs a plurality of functions to the time domain quadrature signals to produce a two or three dimensional display of data on display 30.

Figure 3:
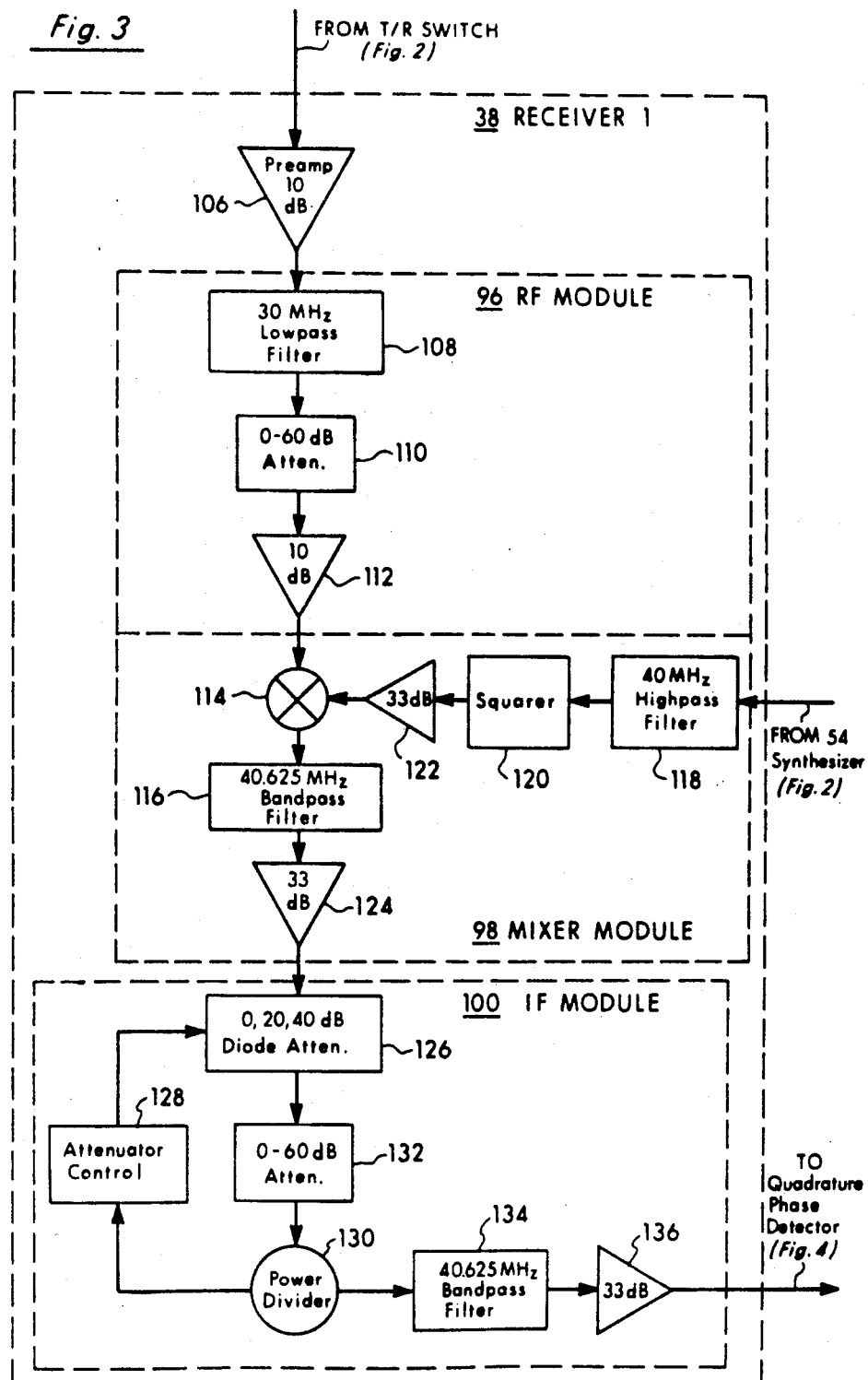
FIG. 3 is a detailed block diagram of a receiver circuit used in the present invention.
Figure 4:
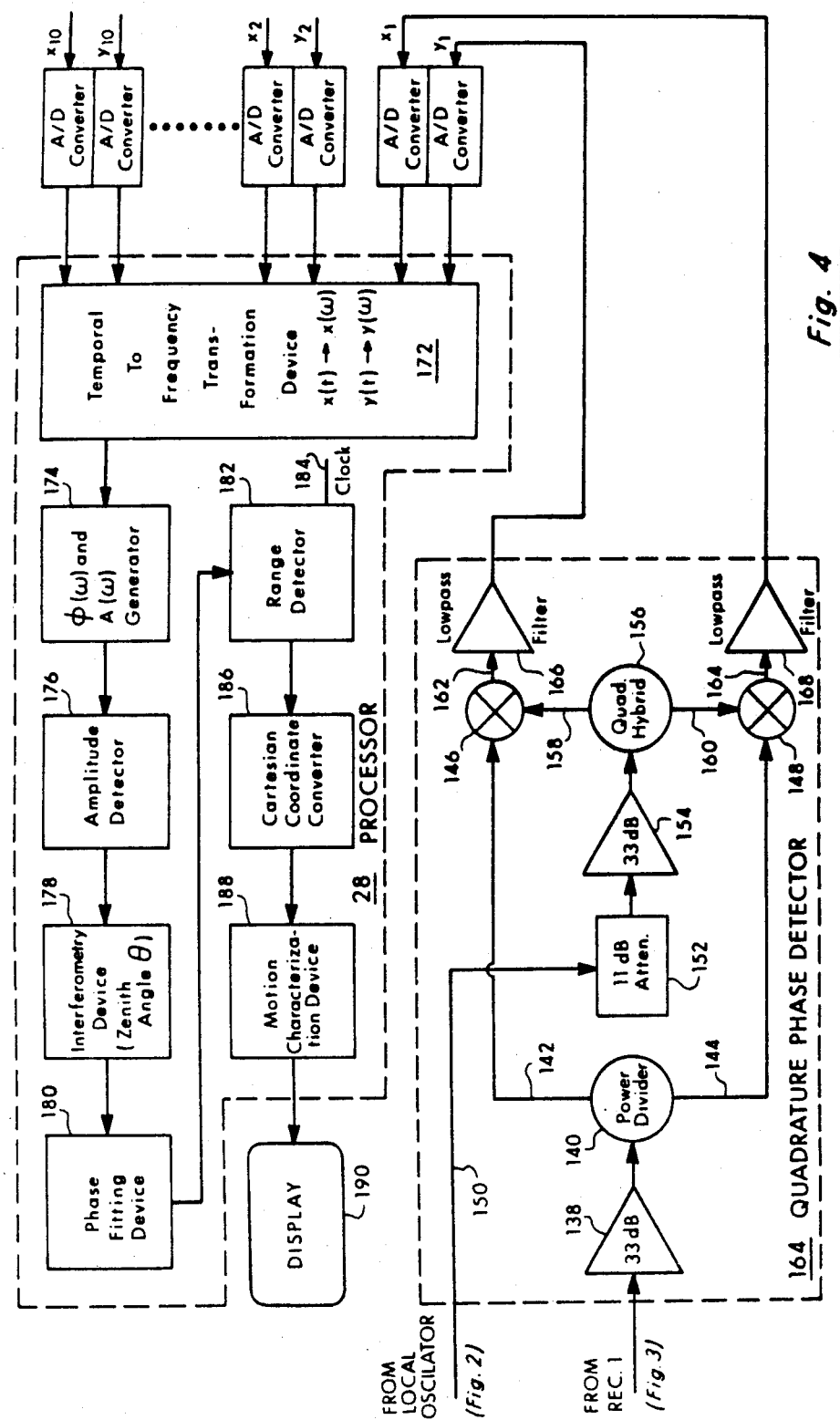
FIG. 4 is a detailed block diagram of a quadrature phase detector, processor and A/D converters.
Figure 5:
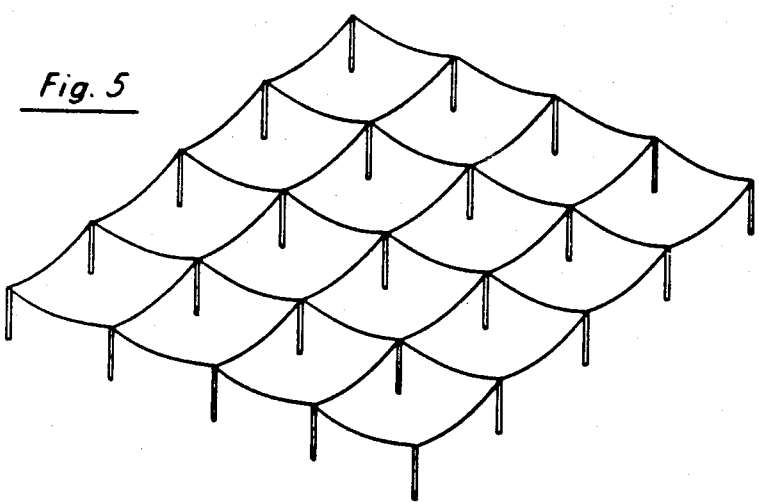
FIG. 5 is a schematic illustration of an antenna array which can be utilized with the present invention.

FIG. 2 is a detailed block diagram of the antenna array, transmission and drive module, pulsed amplifier stages, receiver circuit array, synthesizer and local oscillator of the present invention. Portions of an HF radar system similar to that disclosed in FIGS. 2, 3 and 4 is set forth in Grubb, R. N., "The NOAA SEL HF Radar System (Ionospheric Sounder)," NOAA Technical Memo No. ERL SEL-55, October 1979. The present invention has been implemented as a radar imaging device for performing mesospheric observations using a 2.66 MHz radar which was operated at the "Boot Lake Field Site" 10 miles east of Brighton, Colo. The particular sensor/transmitter array utilized took the form of an array, as illustrated in FIG. 5, which comprised ten independent coaxial, colinear antennas as described in B. B. Balsley and W. L. Ecklund, "A Portable Coaxial Colinear Antenna," IEEE Trans. Ant. Prop., AP-20(4), 513–516, 1972, having an east-west antenna array 32 which comprises five parallel antennas running in an east-west direction, and a north-south antenna array which comprises five parallel antennas running in a north-south direction. Each antenna consists of eight half-wave dipoles connected end to end with a 180 degree phase reversal at each junction to give the appearance of a length of coaxial cable with periodic splices. All ten antennas are used as a unit for transmission but are used separately for reception. In the actual experimental setup, only two receiver channels were used, for cost considerations, so that reception sampling was performed in pairs and in rapid sequence along the antenna array. Transmit/receive switches 36 were utilized to allow a single antenna to be used for both transmission and reception. The longitudinal and transverse antenna spacings in the experiment were 0.33 of the wavelength ($\lambda$) and 0.707 of a wavelength, respectively. The transmitted beam was 28 degrees wide and all ten antennas were used.

For the experimental device, pulses were transmitted at 50 pulses per second with a four pulse coherent integration at each antenna-pair before recording the data and moving on to the next antenna pair, i.e., the data was averaged over four pulses to get one data point. The full antenna array illustrated in FIG. 5 was used in-phase for transmission so that a 45 degree linear polarization was transmitted. The data was sampled by taking 50 range gates with three kilometer spacing for each of the ten antennas. A single complete frame of data required 0.4 seconds.

The transverse spacing gives grating lobes at plus or minus 45 degrees to the zenith, i.e., scatterers that lie within 45 degrees of the horizontal are aliased into zenith angles of 24.5 degrees minus 45 degrees. This means scatterers located beyond 24.5 degrees of the zenith in either plane are ambiguous, but that scatterers within 24.5 degrees of zenith are not. A more conventional spacing of a half of a wavelength, rather than 0.707 of a wavelength, would eliminate the region of ambiguity at the expense of some degradation in resolution of the antenna array illustrated in FIG. 5. However, this can be overcome by the antenna array illustrated in FIG. 6 wherein the central detectors 40 provide unambiguous data as to location since they are located within ½ wavelength of one another, while detectors 42, 44, 46, 48 provide high resolution information since they are spaced at greater distances. Transmission and reception nulls associated with sidelobes are present, but these only introduce blind spots, rather than ambiguities into the imaging process. Consequently, the ambiguities that are normally prevalent in beam steering devices due to sidelobes are not present in the detected data of the present invention.

Most medium frequency experiments make use of the birefringency due to free electrons in the atmosphere, which causes right hand and left hand circularly polarized waves to propagate differently. The analysis method of the present invention is insensitive to this phenomenon. While birefringency can be studied using the amplitudes and phases of the individual scattering points detected in accordance with the present invention, it is not a factor in the imaging process itself. For this reason, transmitting with linear polarization is adequate for determining images and winds. However, use of linear transmission polarization does reduce the potential return from higher altitudes by approximately 3 dB since the extraordinary half (the left hand circularly polarized signal) of the transmitted signal is strongly absorbed.

The transmitter mixer and drive module 50 produces the 2.66 MHz signal to be transmitted. The 40 to 70 MHz synthesizer 54 produces a frequency equal to 43.28 MHz which is applied to 10 dB attenuator 57 and 33 dB amplifier 58 to obtain a desired gain level. This signal is then applied to mixer 53 together with a 40.625 MHz signal produced by local oscillator 60. The local oscillator signal is applied to a keying and phase controlled device 62 and a 40.625 MHz band pass filter 64. The difference signal, which is equal to 2.66 MHz, produced by mixer 52, is then applied to a 30 MHz low pass filter 66 which passes the low frequency 2.66 MHz signal to power divider 68.

The output of the transmitter mixer and driver module 50 is applied to a three stage pulsed amplifier 76 is applied to polarization control unit 84 which splits the incoming 50 kilowatt pulses into two identical signals and then allows the phase of either or both signals to be retarded by 90 degrees by the use of delay lines. Output 86 is applied to east-west antenna array 32, while output 88 is applied to north-south antenna array 34. This allows transmission of linear, right hand circularly, or left hand circularly, polarized signals. Use of different polarization provides for different propagation through the atmosphere due to the birefringent properties of the atmosphere. Polarization control unit 84 does not pertain specifically to the imaging techniques of the present invention, but rather, allows for research to be performed on the effect of free electrons in the earth's atmosphere.

The output of the transmit/receive switches 36 are connected to the plurality of receivers 38, 90, 92, 94. As illustrated in FIG. 2, the output of each transmit/receive switch 36 is connected to a separate receiver. In the actual implementation of this experiment only two receiver circuits were utilized and the outputs of the transmit/receive switches were multiplexed between the two receiver circuits to obtain data. For the purposes of simplicity, a separate receiver circuit is illustrated for each transmit/receive switch 36. First receiver circuit 38 is illustrated in detail in FIG. 3.

As shown in FIG. 3, first receiver 38 comprises an RF module 96, a mixer module 98, an IF module 100 and a quadrature phase detector 104. The received signal is supplied to preamp circuit 106 which amplifies the signal and applies it to RF module 96. The primary frequency of interest is 2.66 MHz. The signal is applied to a 30 MHz low-pass filter 108 within the RF module 96 which functions to filter out frequencies higher than 30 MHz. A 0–60 dB attenuator 110 and 10 dB amplifier 112 function to adjust the gain of the signal from low-pass filter 108. The output of the module is applied to a double balanced mixer module 114 together with an input from the 40–70 MHz synthesizer 54 (FIG. 2). The 40–70 MHz synthesizer 54 (FIG. 2) produces a frequency which can be adjusted by frequency control 56. The output of the double balanced mixer module 114 produces both a sum and difference frequency signal which is applied to 40.625 MHz band pass filter 116. The 40.625 MHz signal is the intermediate frequency (IF frequency) utilized in the IF module 100. The 40–70 MHz synthesizer 54 (FIG. 2) is adjusted so that the IF frequency (40.625 MHz) is equal to the difference of 2.66 MHz and the frequency of the output of synthesizer 54. In other words, synthesizer 54 produces a signal having a frequency of 43.285 MHz which is equal to 2.66 MHz (the detected frequency) plus 40.625 MHz (the IF frequency). The output of synthesizer 54 is applied to double balanced mixer 114 via 40 MHz high pass filter 118, squarer 120 and 33 dB amplifier 122, to produce an output signal of 40.625 MHz which equals the difference between 2.66 MHz (which is the desired frequency to be detected) and 43.285 MHz (which is the output of the synthesizer 54). The IF frequency of 40.625 MHz is then applied to band pass filter 116 which represents the 2.66 MHz signal which is to be detected. This signal is applied to 33 dB amplifier 124 prior to application IF module 100.

If module 100 comprises a gain control feed-back loop consisting of diode attenuator 126, attenuator control 128, power divider 130 and 0–60 dB attenuator 132. This feed-back loop is used to provide proper attenuation to detect partial returns from atmospheric structures which vary substantially in return magnitude. This signal is applied to a 40.625 MHz band pass filter 134 and a 33 dB amplifier 136 prior to application to quadrature phase detector 104.

The intermediate frequency signal received from IF module 100 is applied to a 33 dB amplifier 138 within quadrature phase detector 104, as illustrated in FIG. 4. The output is then applied to a power divider 140 which divides the signal into two separate signals 142, 144 having equal phase. These signals are applied to double balanced mixers 146, 148, respectively. Local oscillator 60 produces a signal 150 having a frequency of 40.625

MHz, which is equal to the IF frequency. This signal is applied to an 11 dB attenuator 152 and a 33 dB amplifier 154 prior to application to power divider 156. Power divider 156 comprises a quad hybrid power divider which produces 90 degree hybrid signals. In other words, outputs 158 and 160 differ in phase angle by 90 degrees. These outputs are applied to double balanced mixers 146, 148 which provide sum and difference signals at outputs 162, 164. Mixer modules 146, 148 function to remove the intermediate frequency 40.625 MHz from the signal and simultaneously multiply the receive signal by an in-phase and 90 degree phase shifted component of the transmitted signal to produce in-phase x(t) and quadrature components y(t). Low pass filters 164, 168 insure that the modulation of the original 2.66 MHz carrier signal is obtained from the output of mixer modules 146, 148. The in-phase temporal component x(t) and the quadrature temporal component y(t) from each of the quadrature phase detectors, which are connected to each of the receivers circuits, are applied to A to D converters 170. For purposes of simplicity, only one quadrature phase detector 104 has been illustrated in FIG. 4, although a separate quadrature phase detector is connected to the output of each separate receiver circuit. The quadrature phase detector 104 is further disclosed in FIG. 7. The A to D converters 170 function to transform the analog signal to a digital signal for application to processor 28.

As disclosed in FIG. 4., processor 28 comprises a plurality of components which can be implemented either in software or hardware. Processor 28 comprises a temporal to frequency transformation device which transforms the complex voltage temporal functions $\underline{V}(t)$, which consists of the in-phase component x(t) and the quadrature component y(t), to doppler frequency functions $\underline{V}(w)$ which vary with a doppler frequency (w) indicative of the relevant movement between targets and the antenna array 32, 34. The doppler frequency function $\underline{V}(w)$ is applied to a phase value and amplitude value generator 174 which generates phase values $\phi(w)$ and amplitude values A(w) from the doppler frequency functions $\underline{V}(w)$ produced in temporal to frequency transformation device 172. The functions performed by the temporal to frequency transformation device 172 and phase value and amplitude value generator 174 are more specifically disclosed in FIG. 8.

Amplitude detector 176 examines the amplitude values A(w) for each doppler frequency (w) produced by each sensor of the sensor array 32, 34 to determine if all of the sensors detect a signal response at a particular doppler frequency which is greater than a predetermined minimum threshold value. When all of the sensors indicate a response above a predetermined threshold value, phase values are examined for that doppler frequency to determine the existence of a target. The function of amplitude detector 176 is disclosed in greater detail in FIG. 10.

Figure 9:
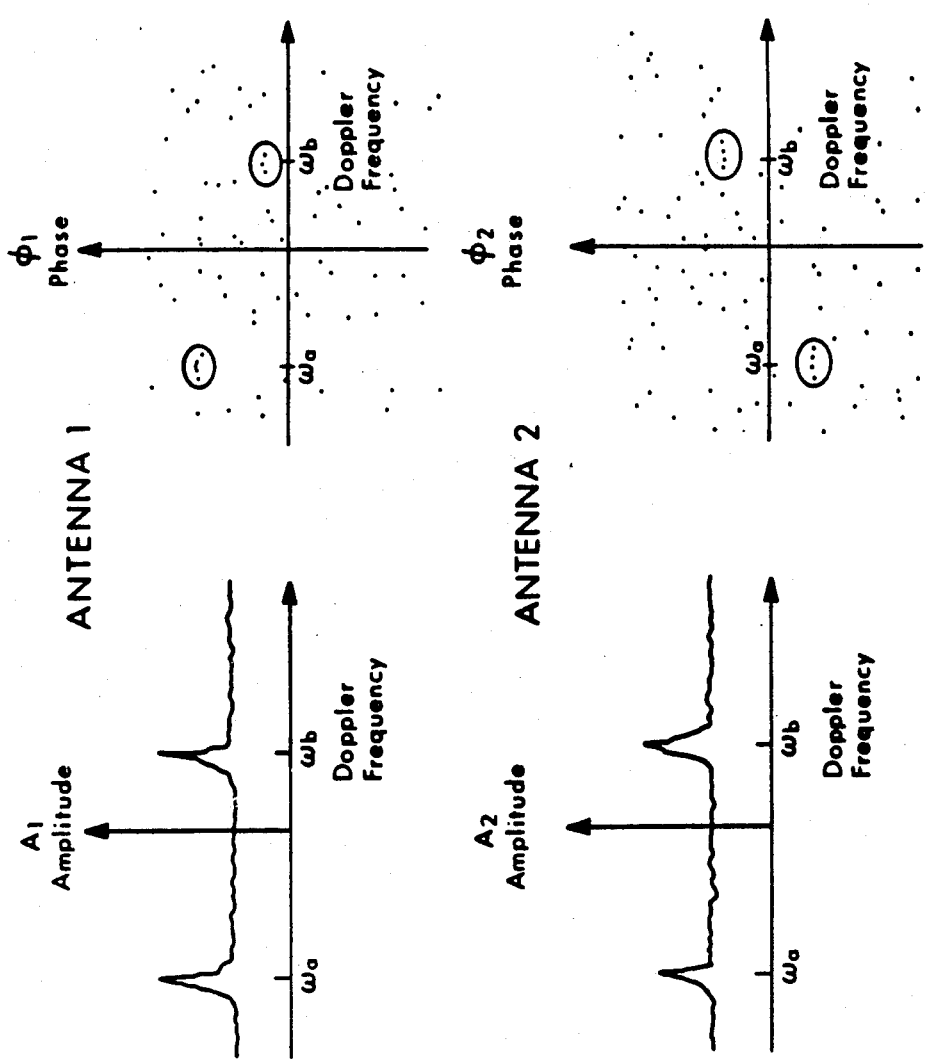
FIG. 9 is a schematic graphical depiction of signals produced in accordance with the present invention.

Interferometry device 178 utilizes interferometry techniques to determine the zenith angle $\theta$ of a target detected at a specific doppler frequency using the techniques illustrated in FIG. 9.

Phase fitting device 180 functions to fit the detected phase values for a particular doppler frequencies into one of a series of possible displacement patterns to eliminate $2\pi$ differences in phase values. The manner in which this is allowed is disclosed in more detail in FIGS. 11, 12, and 13.

Range detector 182 selects data at a predetermined time periods delayed from the initial transmission of the time series of pulses from the transmitter 15 which represents signals received from a predetermined distance. Clock signal 184 provides the clock data necessary to determine the delay periods for selecting signals representative of returns from predetermined distances.

Cartesian coordinate converter 186 converts the zenith angle data and radial range data to Cartesian coordinate data.

Motion characterization device 188 uses mathematical techniques to describe the motion of the targets. Display 190 displays the target data.

FIG. 7 is a schematic block diagram illustrating the functions performed by the quadrature phase detector. Considering a single array of antennas 32, a plurality of individual antennas in array 32 produce a plurality of temporal pulses received from a plurality of moving targets. These temporal pulses are applied to receive/transmit switches 36 which function to switch the antenna array 32 between the receive and transmit mode. Oscillator 192 produces a time series of pulses $\underline{V}(t)$ which comprise the 2.66 MHz signal generated by the transmitter portion of the present invention. This signal is supplied to the receive/transmit switches 36 for transmitting the 2.66 MHz signal when the receive/transmit switches 36 are in the transmit mode. The transmitted signal $\underline{V}(t)$ is also applied to a power divider 156 which divides the signal into a 90 degree phase shifted signal 162 and a zero degree phase shifted signal 164. Each of these signals is supplied to mixers 146, 148, respectively which produce the in-phase x(t) and quadrature y(t) components of the complex voltage temporal function $\underline{V}(t)$. Consequently, the output of the quadrature phase detector 104, illustrated in FIG. 7, can be expressed as follows:

$$\underline{V}(t) = x(t) + iy(t) \quad (1)$$

where:

$$x(t) = V_o V_s \cos \phi \quad (2)$$

$$y(t) = V_o V_s \sin \phi \quad (3)$$

$V_o$ = transmitted complex voltage function (times series of pulses $\underline{V}_o(t)$).

$V_s$ = received or reflected function (times series of pulses returned from the target $\underline{V}_s(t)$).

As is illustrated in FIG. 7, each sensor element, i.e., each antenna produces a complex voltage temporal function $\underline{V}(t)$ which appears as separate x(t) and y(t) components having digital values.

Of course, any desired phase detection technique can be used to characterize the complex voltage signal including signal multiplication techniques, zero crossing techniques, analog, and digital filtering techniques, etc.

FIG. 8 schematically illustrates the functions performed by the temporal to frequency transformation device 172. As shown in FIG. 8, the output of each quadrature phase detector connected to each receiver channel for each antenna produces both x(t) and y(t) digital components for each time period. FIG. 8 illustrates a time sampling of 128 time periods for which both x(t) and y(t) digital components are generated. These complex voltage temporal functions V(t) are transformed to doppler frequency functions $\overline{V}(w)$ by the use of a temporal to frequency transformation function, such as a fast Fourier transform, fast Hadamard transform, etc. This transformation is mathematically indicated as follows:

$$V(t)=x(t)+iy(t) \rightarrow V(w)=x(w)+iy(w) \qquad (4)$$

where: w=doppler frequency indicative of relative movement between antennas (sensors) and targets.

The time domain digital data chart 194 is then transformed into a frequency domain data chart 196, as illustrated in FIG. 8. For each doppler frequency (w) both a real component x(w) and imaginary component y(w) is produced. Both the time domain data chart 194 and the frequency domain data chart 196 are produced for antennas 2 through N as schematically illustrated in FIG. 8.

The data derived from the frequency data chart 196 is then used to calculate the amplitude values A(w) and phase values $\phi$(w) for each doppler frequency. A amplitude value A(w) represents the amplitude of the return at a particular doppler frequency and is calculated as follows:

$$A(w) = \sqrt{x^2(w) + y^2(w)} \qquad (5)$$

Similarly, the phase value comprises the phase value of the return signal for each doppler frequency and is calculated as follows:

$$\phi(w)=\tan^{-1} y(w)/x(w) \qquad (6)$$

From this, an amplitude and phase value data chart 198 can be derived for each antenna return.

FIG. 9 illustrates a graphical depiction of the data produced on the amplitude and phase data chart 198. For each antenna, a separate plot is provided of doppler frequency versus amplitude and doppler frequency versus phase value. As illustrated in FIG. 9, the amplitude returns for both antenna 1 and antenna 2 indicate that possible targets may exist at both the doppler frequencies $w_a$ and $w_b$. The phase values at doppler frequencies $w_a$ and $w_b$ for both antenna 1 and antenna 2 are illustrated in a separate plot in FIG. 9. The difference in phase values between the returns for antenna 1 and antenna 2 can be utilized to determine the zenith angle $\theta$ to locate targets for specified doppler frequencies by determining the difference in phase values at those doppler frequencies using the interferometry techniques illustrated in FIG. 11. Additionally, the amplitude versus doppler frequency responses can be examined for each doppler frequency to determine if an amplitude response is received on each of the antennas which exceeds a predetermined response value to make and initial determination of the possible existence of a target at a predetermined doppler frequency. Also, responses below a predetermined value can be examined to eliminate large returns. Additionally, the returns can be sorted by amplitude in any desired manner for selective detection of targets having desired characteristics.

Figure 10:
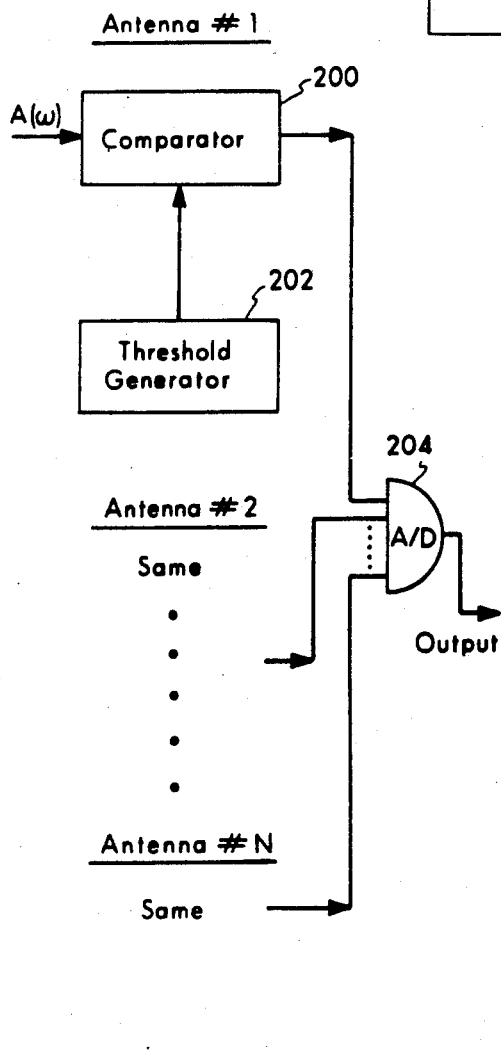
FIG. 10 is a schematic block diagram illustrating the manner in which the amplitude detector operates.

FIG. 10 schematically illustrates the operation of amplitude detector 176. The amplitude data from amplitude value and phase value chart 198 is directed to the amplitude detector 176 for each value of the doppler frequency (w). For example, the amplitude values for the first doppler frequency (w) from each antenna are applied to a series of comparators 200 which compare the amplitude value with a predetermined threshold value produced by threshold generator 202. If all of the amplitude values exceed the threshold value for each antenna response, an output is produced by logical AND circuit 204 indicating the presence of a possible target moving towards or away from the antenna array at the first doppler frequency. This procedure is duplicated for each doppler frequency. For the doppler frequencies at which the amplitude detector 176 indicates the possible existence of a target, the phase values versus doppler frequency response, as illustrated in FIG. 9, are examined by interferometry device 178.

Figure 11:
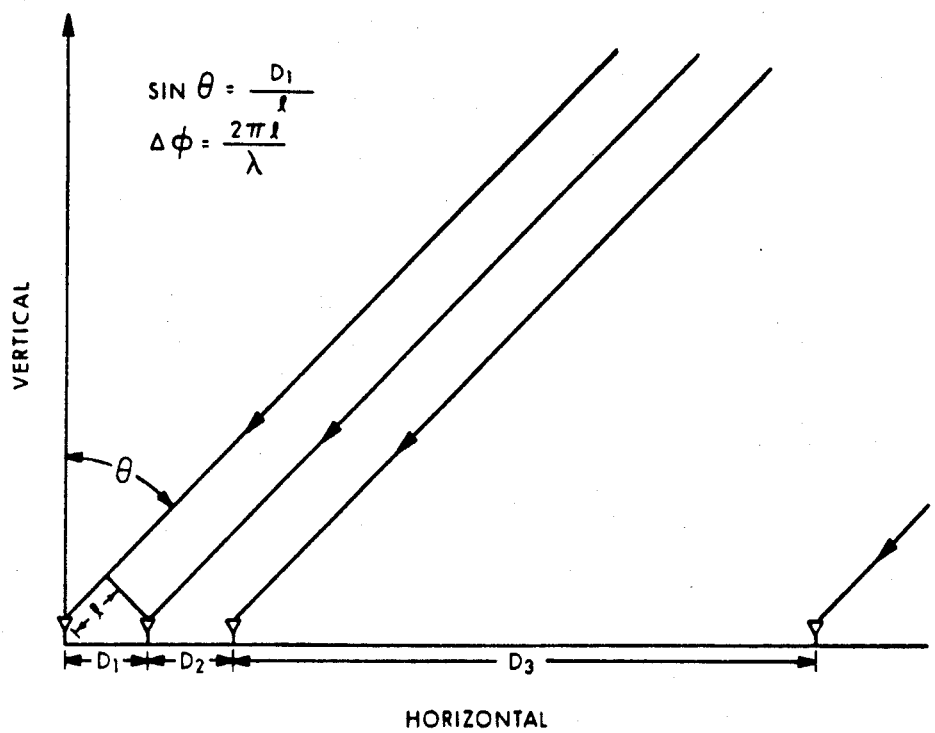
FIG. 11 is a schematic diagram illustrating the manner in which interferometry techniques are utilized in accordance with the present invention.

FIG. 11 schematically illustrates the manner in which the zenith angle $\theta$ is derived by the interferometry device 178. FIG. 11 assumes that the target comprises a point source located at infinity. Consequently, the zenith angle $\theta$ for the returns for each of the antennas is constant. It can be readily seen from FIG. 11 that:

$$\sin \theta = l/D \qquad (7)$$

where:
l=difference in travel distance of the signal for two antennas
D=separation between the two antennas It is also known that the difference in phase between the signal received by the two antennas is a function of the distance l divided by the wavelength of the received signal. By eliminating multiple wavelengths ($2\pi$) the change in phase angle can be expressed as follows:

$$\Delta\phi = 2\pi l/\lambda \qquad (8)$$

Consequently, the distance l can be determined in equation 7 by measuring the phase difference ($\Delta\phi$) of the signals received by the two antennas. The zenith angle $\theta$ is then calculated as follows:

$$\theta = \sin^{-1}(\lambda \cdot \Delta\phi/2\pi \cdot D) \qquad (9)$$

Each of these parameters is known, i.e., the wavelength, the difference in phase angle between the two antennas and the distance of separation of the antennas so that the zenith angle $\theta$ can be readily measured. Of course, for each potential target indicated by an amplitude return from amplitude detector 176, illustrated in FIG. 10, the difference in the phase values $\phi$(w) can be readily determined for each doppler frequency. This difference in phase value comprises the $\Delta\phi$ value so that a zenith angle can be determined by comparing the difference in phase value $\Delta\phi$ of the responses of any pair of antennas. If the distance of separation D of the antennas is less than a half wavelength, the target can be unambiguously identified from zenith angles of $-90°$ to $+90°$, as illustrated in FIG. 11.

Figure 12:
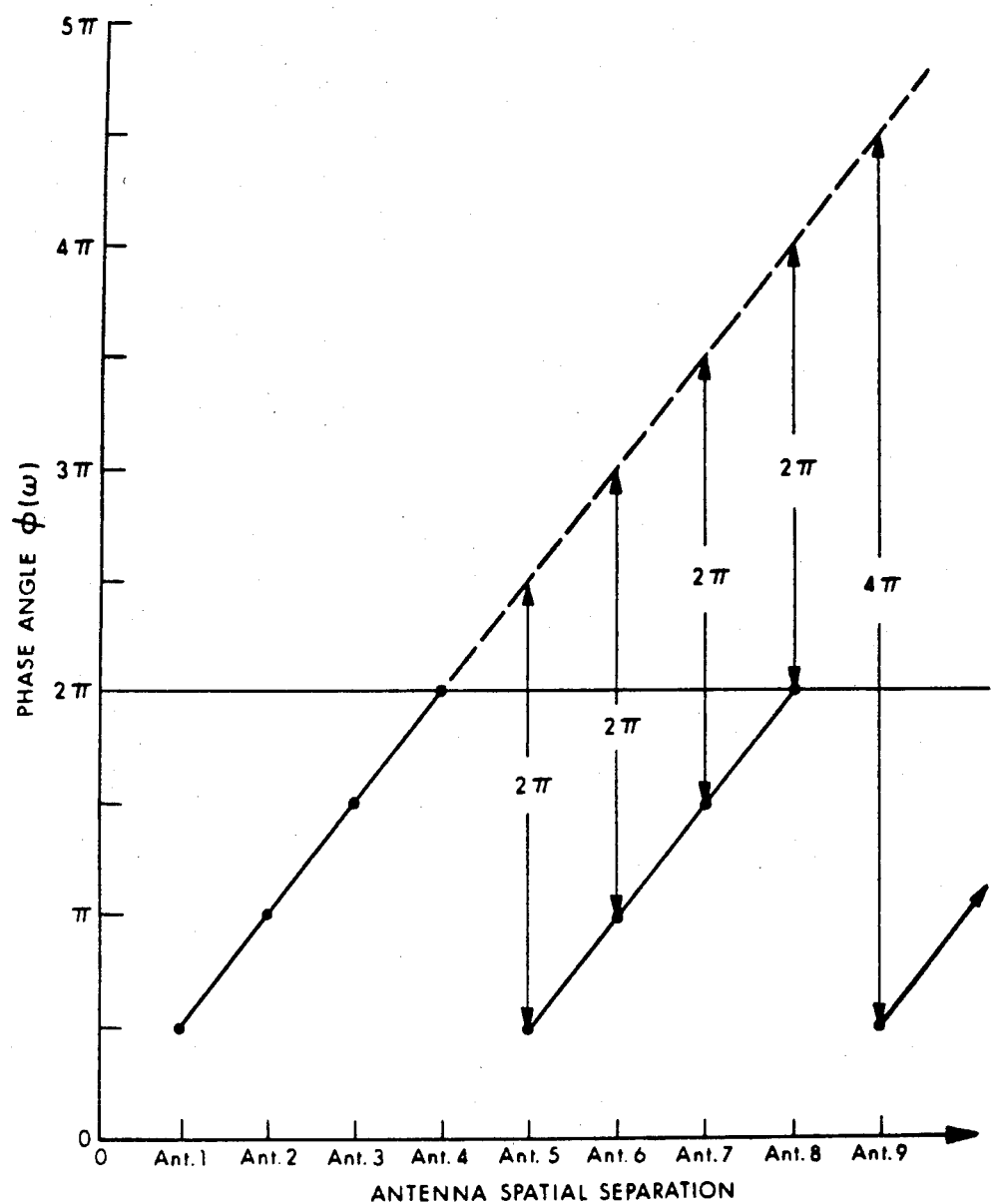
FIG. 12 is a schematic graphical depiction of phase values versus the antenna spatial separation for the various antennas of the present invention.

FIG. 12 graphically depicts the functions performed by phase fitting device 180. Phase fitting device 180 provides information to distinguish potential targets from actual targets by comparing the phase differences from multiple antennas within the array. The phase values for each of the antennas is plotted versus the antenna spatial separation. FIG. 12 depicts phase values for 9 antennas at a single doppler frequency. FIG. 12 illustrates a linear response of phase angle values versus antenna spatial separation. The phase values for antenna #5 through antenna #8 are greater than $2\pi$ radians so that $2\pi$ radians must be added to these values to determine if a linear relationship exists. Similarly, antenna #9 requires that the value of $4\pi$ be added to the phase values to determine if a linear relationship exists.

FIG. 13 comprises a table which lists the possible displacement patterns for five antennas. These displacement patterns further allow for a plus or minus 90 degree displacement due to noise on the individual antennas. As shown in FIG. 13, there are 49 displacement patterns possible. FIG. 12 illustrates that the phase versus antenna spacing can be fit to a linear response only after performing a correction consisting of adding or subtracting $2\pi$ radians (360 degrees) to the phase values of some antennas. FIG. 13 illustrates that the center antenna, i.e. antenna #3, is the reference from which the other antennas are corrected. Since there is no way of knowing beforehand which of the 49 possible displacement patterns is correct, the 49 possible displacement patterns must be compared to the returns of the five antennas and a calculation made of the error of the fit in each case. The fit with the smallest error, if that error is less than some threshold value, e.g. 15 degrees, determines the existence of a scattering point. Using equation 9, the zenith angle can be calculated.

The fitting process can be described mathematically as follows. If the measured phase value is $\underline{V}(j)$, where j=antenna number for equally spaced antennas, then a corrected phase is given by:

$$\phi_j' = \phi_j + 360 M_{ij} \quad (10)$$

where:
  $M_{ij}$=is the displacement pattern number given in FIG. 13
  i=pattern number (0–49)
  j=antenna number (0–5)
  $\phi_j$=measured phase value for the antenna being fit into the displacement pattern.

The fitting procedure requires that a straight line be fit to the corrected data in the form:

$$A + jB \quad (11)$$

The problem is to determine the outcome of the value of A and B for the fitting procedure. This is accomplished by a conventional least squares approach in which it is desirable to minimize the rms error ($\epsilon$). The rms error ($\epsilon$) is given by:

$$\epsilon = \sqrt{\frac{1}{5} \sum_{j=1}^{5} [\phi_j + 360 M_{ij} - A - jB]^2} \quad (12)$$

To do this, the partial derivatives, $\delta\epsilon/\delta A$ and $\delta\epsilon/\delta B$, must be determined. These partial derivatives are then equated to zero in order to find the minimum values. This gives:

$$5A + 15B = \sum_{j=1}^{5} \phi_j + \sum_{j=1}^{5} M_{ij} \quad (13)$$

$$15A + 55B = \sum_{j=1}^{5} j\phi_j + \sum_{j=1}^{5} jM_{ij} \quad (14)$$

Solving these equations for A and B gives:

$$A = 1.1 \left( \sum_{j=1}^{5} \phi_j + \sum_{j=1}^{5} M_{ij} \right) - .3 \left( \sum_{j=1}^{5} j\phi_j + \sum_{j=1}^{5} jM_{ij} \right) \quad (15)$$

$$B = -.3 \left( \sum_{j=1}^{5} \phi_j + \sum_{j=1}^{5} M_{ij} \right) + .1 \left( \sum_{j=1}^{5} j\phi_j + \sum_{j=1}^{5} jM_{ij} \right) \quad (16)$$

Once A and B are known, then equation 12 can be used to calculate the rms error ($\epsilon$). By doing this forty-nine times, i.e., once for each pattern number of table 10, the choice that gives the smallest RMS error is selected. If this error is less than a predetermined threshold value, e.g, 15 to 25 degrees, then it is concluded that a real target has been located. The zenith angle is then calculated as follows:

$$\theta = \sin^{-1}(B \cdot \Delta\phi/360 D) \quad (17)$$

To extend this process to a second dimension, each linear array 32 and 34 is treated separately and a scattering point is only treated as a target if the two independently calculated least squares straight line fits and rms error calculations independently indicate a valid target at exactly the same doppler frequency. In this manner, the present invention confirms the spatial existence of a target in a single spatial location from the simultaneous detection of the temporal series of pulses reflected from the targets by the independent sensors to thereby distinguish the target from noise. In other words, by comparing the difference in phase values of the phase functions $\phi(w)$ produced by different antennas as a function of spatial separation D of the antennas, a multiple number of targets can be distinguished from noise by identifying a common locational source of the temporal series of pulses reflected from the targets for each doppler frequency.

Consequently, each of the sensors has a phase value at a specific doppler frequency which, when combined with the other phase values, are collectively compatible to indicate a single target as a source for a predetermined doppler frequency.

Range detector 182 utilizes clock pulses 184 to detect the delay period between the transmission of the pulse and its receipt at antenna array 32, 34. By knowing the time delay period, the time of flight of the temporal series of pulses is calculated so that targets at a predetermined range can be investigated by examining return pulses having predetermined time delay. Range gating is a common method of determining the distance of targets and is more fully disclosed in "The Radar Handbook" by Merrill I. Skolnik, McGraw Hill Co., 1970, N.Y., N.Y. which is specifically incorporated herein by reference for all that it discloses. A two frequency technique of providing higher resolution range information is more fully disclosed in FIGS. 15 and 16 herein.

The two antenna array system provides two zenith angles, i.e., one for the north-south plane and another for the east-west plane. A third coordinate is supplied by the range of the scattering point which is determined from the range gate data provided by range detector 182. The two zenith angles and the range data comprise a three-dimensional description of the location of the scattering point. This is then converted to a conventional x, y, z cartesian coordinate system where x is the displacement in the east-west direction, y is the displacement in the north-south direction and z is the displacement in the vertical direction. The direction cosines are calculated as follows:

$$l = \sin \theta_{EW} \quad (22)$$
$$m = \sin \theta_{NS} \quad (23)$$
$$n = \sqrt{R^2 - l^2 - m^2} \quad (24)$$

where:
l=x/R; m=y/R; n=z/R
R=detected range
$\theta_{EW}$=zenith angle in the east-west plane
$\theta_{NS}$=zenith angle in the north-south plane Cartesian coordinate converter 186 functions to take the range and zenith data and transform it into a cartesian coordinate system. The cartesian coordinate system allows scattering point parameters to be sorted by altitude rather than radial distance.

The motion characterization device 188 characterizes the motion field of the target array. In accordance with the invention, this is accomplished by a least squares fit of the identified target point in each region of interest with a vector motion field in the form of:

$$VMF = [U + a(1,1)*l + a(1,2)*m + a(1,3*N]*\vec{x} + \quad (18)$$
$$[V + a(2,1)*l + a(2,2)*m + a(2,3)*N]*\vec{y} +$$
$$[W + a(3,1)*l + a(3,2)*m + a(3,3)*N]*\vec{z}$$

where:
VMF=vector motion field
U=mean motion in the x direction
V=mean motion in the y direction
W=mean motion in the z direction
l=East-West direction cosine
m=North-South direction cosine
n=Vertical direction cosine
$\vec{x}$=unit vector in the x direction
$\vec{y}$=unit vector in the y direction
$\vec{z}$=unit vector in the z direction
and a(i,j) are the various spatial partial derivatives of the vector motion field, so that the mean and divergence of the motion field are given by:

$$\text{Mean motion} = U*\vec{x} + V*\vec{y} + W*\vec{z} \quad (19)$$

$$\text{Divergence} = a(1,1) + a(2,2) + a(3,3) \quad (20)$$

Display 190 comprises any one of the number of standard display devices such as CRT's, LCD's, etc. Since the present invention provides three-dimensional data, three dimensional display devices can also be utilized in accordance with the present invention. The data produced by the present invention can be processed in display device 190 using conventionally available computer graphic techniques for forming images on various electronic display devices.

As set forth above, each of the functions performed by the processor 28 can be performed by either a hardware or software implementation. The above description has set forth a description of the invention which has primarily been implemented in hardware. The following pseudo-code presents a method for implementing the present invention in software. The starting point is the receipt of a time series of pulsed-radar returns.

| Pseudo Code |
|---|
| 1. Read In and Fourier-Transform the Data |

| -continued |
|---|
| Pseudo Code |
| For 50 Ranges |
|   For 2 Linear Arrays (N-S and E-W) |
|     For 5 Antennas |
|       Read In 128 Complex Voltages (as X-Y pairs) |
|       For 128 Fourier Frequencies |
|       Calculate the Complex Fourier Transforms |
|       (as X-Y pairs) |
|       Next Fourier Frequency |
|     Next Antenna |
|   Next Linear Array |
| Next Range |
| 2. Calculate Fourier Amplitude and Phase From The Complex Transform |
| For 50 Ranges |
|   For 128 Fourier Frequencies |
|     For 2 Linear Arrays |
|       For 5 Antennas |
|       Read In The X-Y Pair From the Transform |
|       Calculate Phase = Arctan (Y/X) |
|         Amplitude = SQRT (X2 + Y2) |
|       Next Antenna |
|     Next Linear Array |
|   Next Fourier Frequency |
| Next Range |
| 3. Fit Fourier Phase Vs Antenna Number With A Straight Line |
| For 50 Ranges |
|   For 128 Fourier Frequencies |
|     For 2 Linear Arrays |
|     Fit Phase Vs Antenna Number With a Straight Line. |
|     Calculate Phase at Center Antenna, Rate of Change of Phase Across Antenna Array (DPDA), and the RMS Error Of the FIT (Error). |
|     Next Linear Array |
|   Next Fourier Frequency |
| Next Range |
| 4. Determine Which Spectral Features Are From Valid Scattering Points |
| For 50 Ranges |
|   For 128 Fourier Frequencies |
|     Are Both DPDA (E-W) and DPDA (N-S) Less Than 25 Degrees? |
|     If Yes: This Spectral Component is From a Valid Scattering Point |
|     If No: Disregard This Spectral Component |
|   Next Fourier Frequency |
| Next Range |
| 5. Calculate the Locations of the Valid Points |
| For Each Valid Point |
| l-Coordinate = Lamda*DPDA(E-W)/(2*PI*D) |
|   (X is East) |
| m-Coordinate = Lamda*DPDA(N-S)/(2*PI*D) |
|   (Y is North) |
| n-Coordinate = SQRT (1-l2-m2) |
|   (Z is Up) |
|   (PI= 3.1415; D= Antenna Spacing=0.707*Lamda; Lamda= Radar wavelength) |
| Next Valid Point |
| 6. Calculate the Radial Velocity of Each Valid Point |
| For Each Valid Point |
| Radial Velocity = 0.5*Speed of Light*Fourier Frequency/Radar Frequency |
| Next Valid Point |
| 7. Gather the "Scattering-Point Parameters" at Each Altitude |
| Scattering-Point Parameters: |
|   Radial Velocity of the Scattering Point |
|   l, m, and n direction cosines of the Scattering Point |
|   Average Amplitude of the Scattering Point On the N-S Array |
|   Average Amplitude of the Scattering Point On the E-W Array |
|   Average Phase (Referenced to Center Antenna) On the N-S Array |
|   Average Phase (Referenced to Center Antenna) On the E-W Array |

| Pseudo Code |
|---|
| Error of the Phase Fit on the N-S Array |
| Error of the Phase Fit on the E-W Array |
| 8. Fit a Wind Vector to the Scattering-Point Parameters at Each Altitude |
| For 50 Altitudes |
| Calculate U,V,W for Minimum RMS error. |
| RMS Error is Given By: |
| For Each Valid Point |
| RMS Error = RMS Error + [(U*l + V*m + W*n-VRadial)² |
| Next Valid Point |
| RMS Error = SQRT (RMS Error/Number Points) |
| 9. End. |

Figure 14:
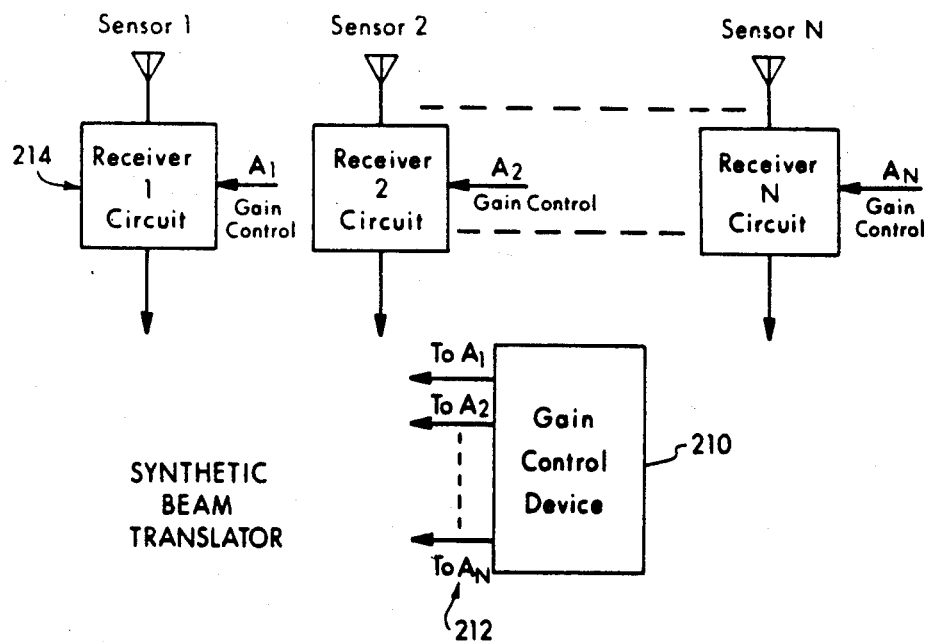
FIG. 14 is a schematic block diagram of the synthetic beam translator of the present invention.

FIG. 14 discloses a synthetic beam translator for use with the present invention to achieve the effects of relative motion between the targets and the sensors when no relative motion exists. Relative motion is required to perform the temporal to frequency domain transformation. The temporal to frequency domain transformation is based upon the doppler frequency produced by the relative motion produced between the sensors and the targets. Synthetic motion can be induced into the data by the manner in which it is sampled by the antenna array. For example, a synthetic moving transducer voltage series can be constructed by taking the first pulse from the first sensor, the second pulse from the second sensor, etc., the 128th pulse from the 128th sensor. This produces the same voltage series that would have been measured by a transducer moving across a fixed array. A much finer scale of motion can be synthesized from a pair of stationary real sensors by combining the signals from the two real sensors in a time varying combination. For example, if $V_1(t)$ is the complex voltage series of the first transducer and $V_2(t)$ is the complex voltage series from the second transducer, the first voltage can be progressively reduced, while the second voltage is progressively increased, in a manner similar to turning down the first voltage while simultaneously turning up the second voltage, to obtain:

$$V_s(t) = V_1(t)*(1-at) + V_2(t)*(at) \quad (25)$$

where: at = an attenuation value which varies between 0 and 1.

The effect of the transducer represented by this combination of voltages is a transducer progressively moving from the position of transducer #1 to the position of transducer #2. Consequently, the voltage outputs of the various receivers illustrated in FIG. 2 can be progressively varied to induce motion across an entire antenna array. A total number of N stationary real sensors can therefore generate N−1 simultaneously synthetically moving transducers. By using parallel rows of real transducers, a number of parallel synthetically moving transducers can be constructed so that a doppler frequency is induced between a stationary target and stationary transducers.

FIG. 14 schematically illustrates a method for achieving synthetic beam translation in the device illustrated in FIGS. 2, 3 and 4. As shown in FIG. 14, a gain control device 210 is employed which produces a series of gain control output signals $A_1, A_2, \ldots A_N$ 212 which are applied to receiver circuit 214. Gain control device 210 produces gain control signals which vary the gain of the receiver circuits 214 in a linear manner from one receiver circuit to another to induce a synthetic linear motion in the sensor array.

Figure 16:
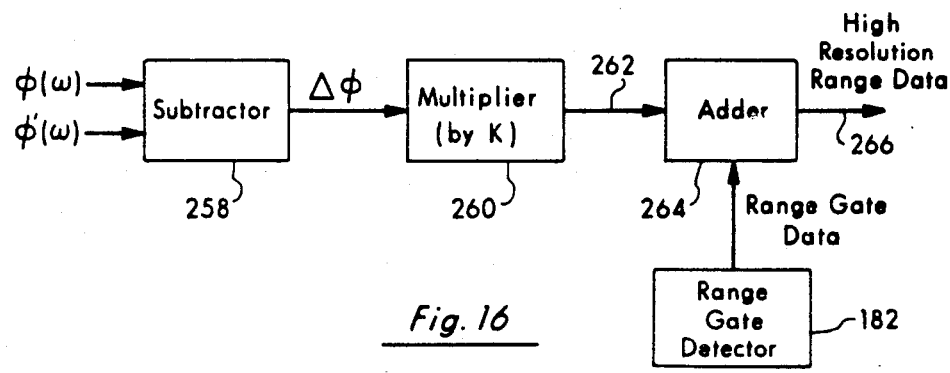
FIGS. 15 and 16 schematically illustrate a two-frequency range detector which can be utilized with the present invention to provide high resolution range information.
Figure 15:
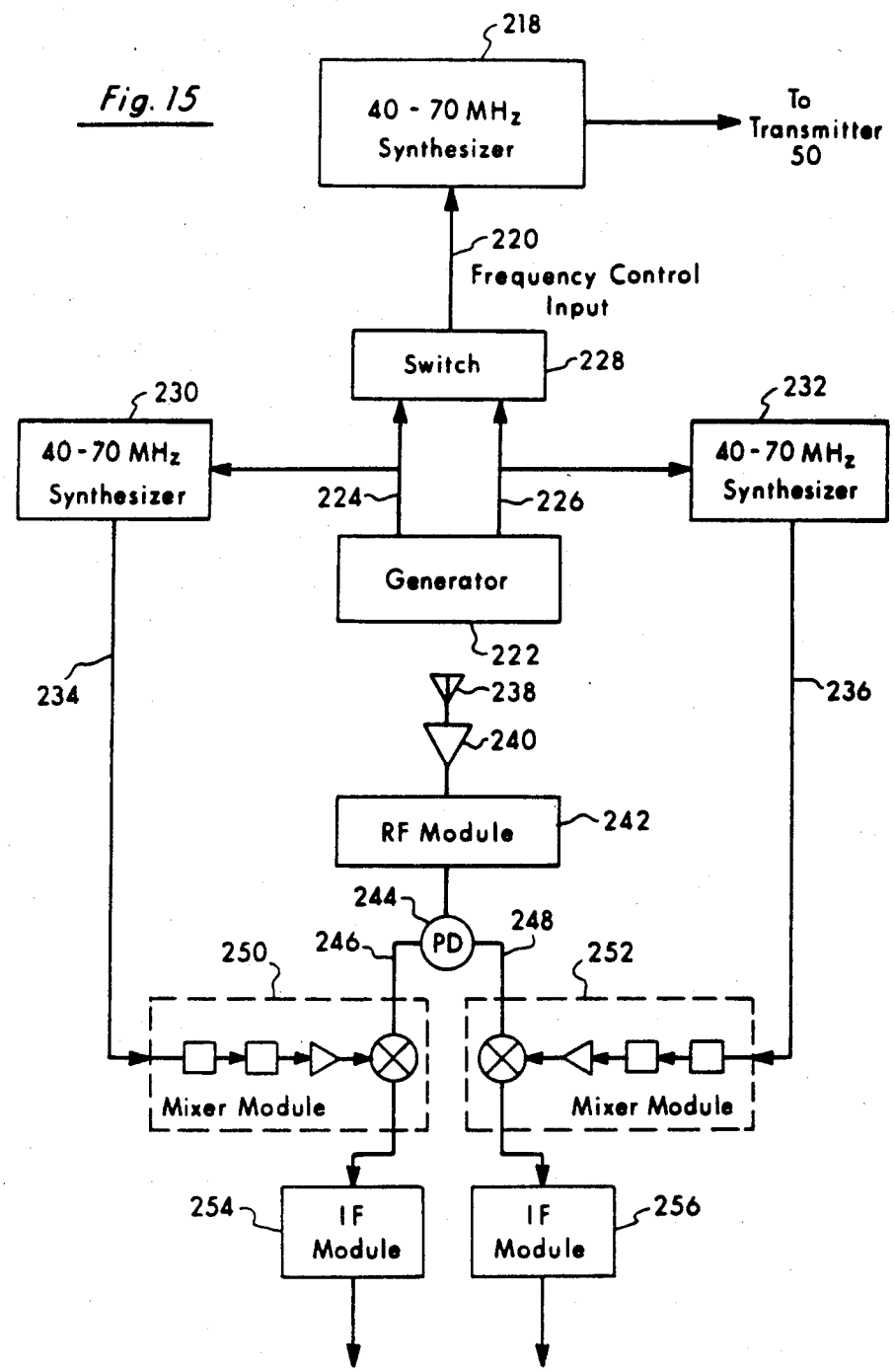

FIGS. 15 and 16 schematically illustrate a two-frequency range detector which can be utilized with the present invention to provide high resolution range information to complement the range information provided by the range gate detector 182. FIG. 15 discloses the manner in which the two-frequency range detector can be implemented in a device such as illustrated in FIGS. 2, 3, and 4. The 40 to 70 MHz synthesizer 54 of FIG. 2 is used to generate a mixer frequency for both the transmitter circuit 50 and the receiver circuit 38. Referring to FIG. 15, 40-70 MHz synthesizer 218 could be used to replace synthesizer 54 of FIG. 2 to provide a mixer frequency for transmitter 50. Synthesizer 218 has an input 220 which comprises a frequency control device capable of producing a phase coherent shift from a first frequency to a second frequency within one pulse width of the transmitter circuit. For example, synthesizer 218 produces a mixer frequency of 43.285 MHz during the first portion of the transmission pulse and then phase coherently shifts to a frequency of 43.335 MHz within a single pulse. This produces a transmitted frequency of 2.66 MHz during a first portion of the transmitted pulse and a second frequency of 2.71 MHz during a second portion of the pulse. This gives a difference of 50 kilohertz between the two transmitted frequencies. Generator 222 produces two control signals 224, 226 which are switched by switching device 228 to provide a single frequency control input 220 to the synthesizer 218. The two control signals 224, 226 comprise the control signals for operating synthesizer 218 at the two different frequencies. Switch 228 is designed to interact with synthesizer 218 to provide a phase coherent shift from the first to the second frequency.

Control signals 224, 226 are also applied to synthesizers 230, 232, respectively, to provide two mixer frequencies 234, 236 for use in the receiver circuits of the two frequency range detector embodiment of the present invention. In a manner similar to that illustrated in FIGS, 2, 3, and 4, a series of antennas 238 are connected to a series of preamps 240 and a series of RF modules 242 contained within the receiver circuit. Because two different frequencies are used, the two frequency range detector embodiment must detect both frequencies simultaneously. A power divider 244 divides the output from the RF module 242 into two signals 246, 248. Each of these signals is applied to a separate mixer module 250, 252 respectively. The two different frequencies 234, 236 are applied to mixer modules 250, 252, respectively, to produce two output frequencies which are applied to the two IF modules 254, 256. All of the remaining circuitry illustrated in FIGS. 2, 3, and 4 is then duplicated, up to the phase and amplitude generator 174, for each frequency obtained from each separate antenna of the series of antennas 238.

The phase values obtained from each antenna are then applied to the device illustrated in FIG. 16. The phase value $\phi_1(w)$ for the first frequency and the phase value for the second frequency $\phi_2(w)$ are both applied to a substractor device 258 which produces a difference signal $\Delta\phi$ which is the difference in the phase values for the two frequencies. This difference in phase values is directly proportional to the location of the target detected within the range gate. The phase difference signal $\Delta\phi$ is applied to a multiplier 260 which functions to multiply the phase value signal by a constant K to achieve the proper proportionality. This output signal is applied to an adder 264 by way of connector 262. Adder 264 adds the phase difference signal which has been multiplied by constant K to provide the proper proportionality to the range gate data provided by range gate detector 182. The range gate data comprises range gate information to which the phase difference is added in adder 264 to provide a high resolution range data signal 266.

Figure 17:
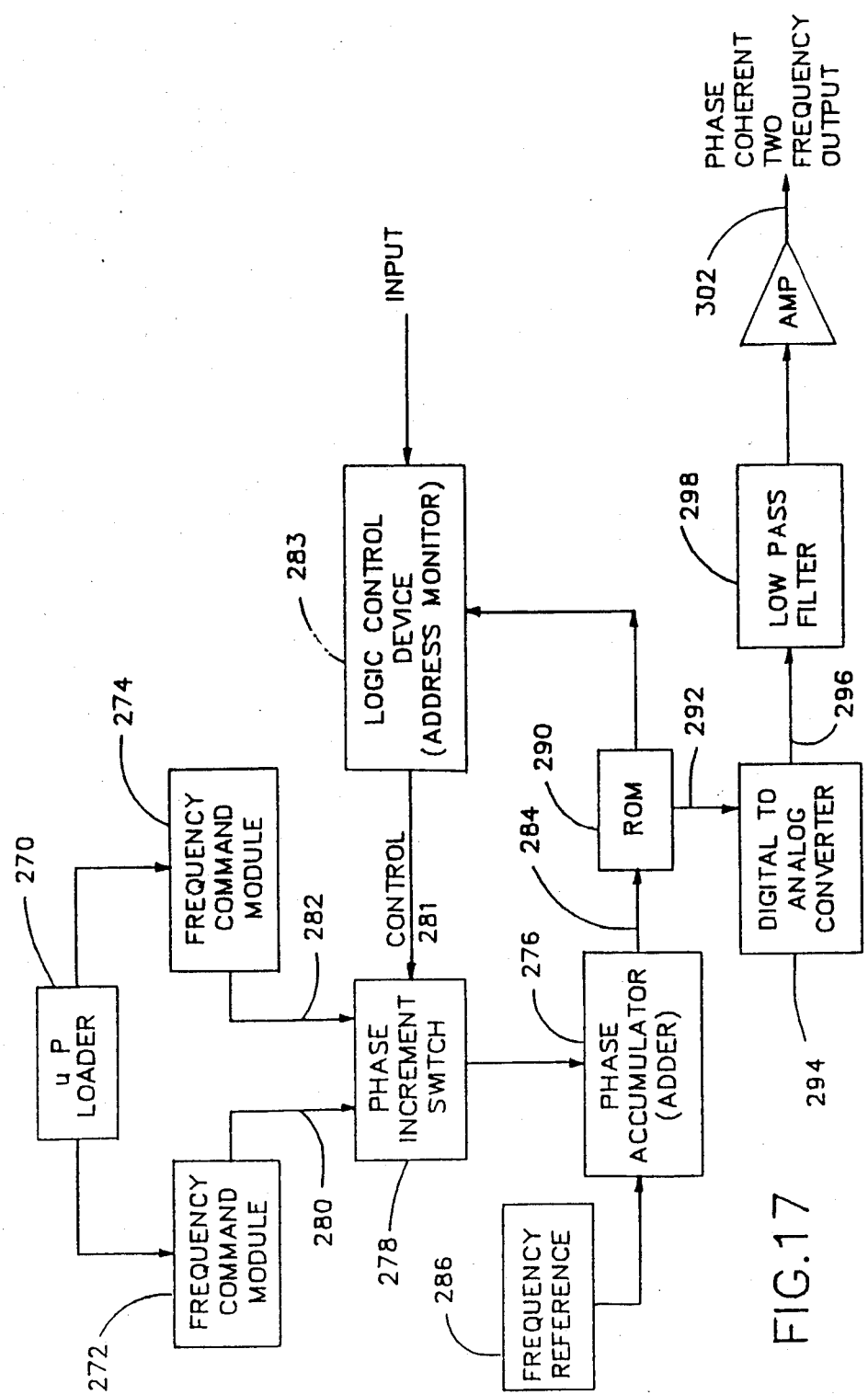
FIG. 17 is a schematic block diagram of a two frequency generator device.

FIG. 17 is a schematic block diagram of a two frequency generator device. The two frequency generator device of FIG. 17 is capable of producing a two frequency phase coherent pulse which changes from a first frequency to a second frequency in a phase coherent manner. This is accomplished by changing from the first frequency ($f_1$) to the second frequency ($f_2$) at a selected place of one of the sinusoidal waveforms comprising the pulse. Typically, the pulsewidth is sufficient to produce multiple cycles of the waveform at the first frequency prior to shifting to the second frequency. The pulsewidth of each frequency is substantially equal.

FIG. 17 schematically illustrates a digital frequency synthesizer for generating a two frequency pulse which is substantially phase coherent. Microprocessor 270 comprises an input device such as a computer or a microprocessor chip coupled to a keyboard for entering phase values for frequencies $f_1$ and $f_2$. The phase values are equivalent to the incremental time for sampling a sine wave. Microprocessor 270 functions as a loader device to load a first increment value into frequency command module 272 corresponding to a first frequency and a second frequency command module 274 constituting a second frequency. Both frequency command module 272 and frequency command module 274 can comprise shift registers or other storage devices for storing an incremental value which is provided to phase accumulator 276 via gate 278. Gate 278 selects either input 280 or input 282 from frequency command module 272 and frequency command module 274, respectively, to provide a phase incremental value for phase accumulator 276. Gate 278 operates in response to a control signal 280 produced by address monitor and logic control device 282 which monitors the current address signal 284 produced at the output of phase accumulator 276. Frequency reference 286 provides a clock signal 288 which is applied to phase accumulator 276 to periodically clock out the accumulated phase value, constituting address signal 284, at a rate determined by frequency reference 286. Read only memory (ROM) 290 has values of sinusoidal functions stored at a plurality of address locations corresponding to the phase values produced at input 284 to ROM 290. Frequency reference 286, as disclosed above, provides the phase values from phase accumulator 276 at a predetermined rate.

Consequently, by changing the accumulator values provided by frequency command manual modules 272 and 274, a digital representation of a sinusoidal waveform produced at output 292 of ROM 290 will have a frequency which is dependent upon the phase incremental value provided by frequency command modules 272 and 274. Digital to analog converter 294 converts the digital representation of a sinusoidal signal 292 to an analog signal at output 296 which comprises an approximation to a true sinusoidal output. The analog signal 296 is applied to low pass filter 298 to integrate the output and reduce the high frequency noise generated by the digital to analog converter 294 to provide a true (better) sinusoidal output. The filtered signal is then amplified by amplifier 300 to produce the phase coherent two frequency output 302. Address monitor 282, as stated above, monitors the address signal 284 applied to ROM 290 and enables gate 278 to shift from one phase increment signal to another consistently on the same point of the sine wave. Alternatively, the change over can occur at the zero crossing or other location on the waveform to minimize generation of harmonics.

RANGE RESOLUTION

Figure 18:
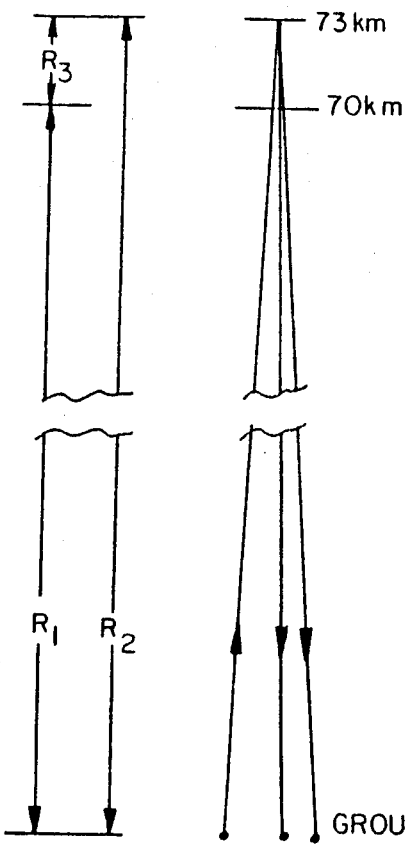
FIG. 18 is a schematic diagram of the range gate.

FIG. 18 is a schematic diagram illustrating the range gate ($R_3$) of the present invention. The range gate ($R_3$), as shown in FIG. 18, is 3 km long ranging from an altitude of 70 km to an altitude of 73 km. The base of the range gate, which is at an altitude of 70 km, is at a range of $R_1$. The top of the range gate, which is at an altitude of 73 km, is at a range $R_2$. As can be seen from FIG. 18, $$R_2 = R_1 + R_3 \tag{26}$$

The distance $R_3$ can be represented as the velocity (c) of light times half of the time ($T_{rg}$) to traverse the distance $R_3$ and back. Hence, equation 26 can be rewritten as:

$$R_2 = R_1 + c^* T_{rg}/2 \tag{27}$$

Equation 27 can then be rewritten as:

$$R_2 - R_1 = c^* T_{rg}/2 \tag{28}$$

Figure 19:
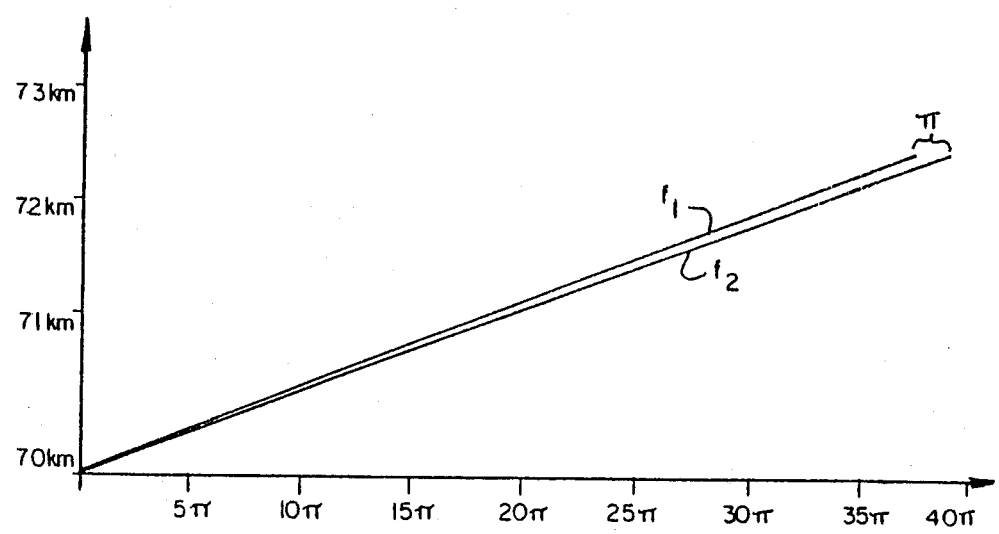
FIG. 19 is a schematic illustration of the phase changes of two-frequencies over a range gate.

FIG. 19 is a graphical depiction of the range gate which varies between an altitude of 70 km and 73 km versus the number of phase wavelengths in radians of frequencies $f_1$ and $f_2$ which comprise the individual frequencies of the two frequency pulse generated by the transmitter of the present invention. As can be seen from FIG. 19, frequency $f_1$ changes by a total of $80\pi$ radians in the distance $R_1$ from 70 km to 73 km. Frequency $f_2$ ranges by a $81\pi$ radian wavelengths between the altitudes of 70 km and 73 km. These comprise typical changes in wavelengths for a frequency $f_1$ equal to 2 MHz which has a wavelength ($\lambda_1$) of 150 meters. The wavelength of $f_2$ to produce $81\pi$ radian wavelength changes between 70 km and 73 km is calculated as follows:

$$\lambda_2 = 6 \text{ km}/(81\pi/2\pi) \approx 146.3415 \text{m} \tag{29}$$

Hence, $f_2$ is approximately 2.04847 MHz.

The frequency $f_1$ of 2 MHz has been selected as an example to illustrate a typical situation which may exist in a radar system and typical numbers which may be applied to such a system. These numbers are presented for the purposes of example only, and the basic concepts of the present invention may be employed in other systems using much different scales such as ultrasonic imaging within the body. In any event, the above description discloses the manner in which a second frequency ($f_2$) can be selected to produce $\pi$ radian additional wavelength changes greater than the number of wavelength changes of $f_1$ over the range gate from 70 km to 73 km. This difference of $\pi$ radian wavelengths between $f_1$ and $f_2$, over the distance of the range gate, can be used as a vernier scale for precisely determining the range of the target within the range gate, as will be disclosed below:

To accomplish this objective, it is desirable to have both $f_1$ and $f_2$ in-phase at the bottom of the range gate, i.e., at the distance $R_1$, as illustrated in FIG. 19. This is accomplished in the following manner.

The total number of wavelengths $L_{11}$ of a waveform having a frequency $f_1$ required to sound to level $R_1$ and back to ground level is:

$$L_{11}=2R_1/\lambda_1 \quad (30)$$

where $\lambda_1$=wavelength of a waveform at frequency $f_1$.

The total number of wavelengths $L_{21}$ of a waveform having a frequency $f_2$ required to sound to level $R_1$ and back to ground level is:

$$L_{21}=2R_1/\lambda_2 \quad (31)$$

where $\lambda_2$=wavelength of waveform of frequency $f_2$.

It is known that the velocity of propagation (c) is equal to the product of the frequency f and wavelength ($\lambda$).

$$c=f*\lambda=w\lambda/2\pi \quad (32)$$

or $$\lambda=2\pi c/w \quad (33)$$

Substituting equations (32) and (33) into equations (30) and (31) gives:

$$L_{11}=2R_1/(c/f_1)=2R_1f_1/c \quad (34)$$

or $$L_{21}=2R_2/(c/f_2)=2R_1f_2/c \quad (35)$$

Similarly, the number of wavelengths to sound to range $R_2$ and back with a waveform of frequency $f_1$ is:

$$L_{12}=2R_2f_1/c \quad (36)$$

The number of wavelengths to sound to range $R_2$ and back with a waveform of frequency $f_2$ is:

$$L_{22}=2R_2f_2/c \quad (37)$$

The difference in the number of wavelengths ($\Delta L_1$) when sounding between ranges $R_1$ and $R_2$ at frequency $f_1$ is:

$$L_{12}-L_{11}=2R_2f_1/c-2R_1f_1/c \quad (38)$$

or $$\Delta L_1=2f_1(R_2-R_1)/c \quad (39)$$

We know from equation 28 that:

$$R_2-R_1=c*T_{rg}/2 \quad (28)$$

Substituting equation (28) into equation (39):

$$\Delta L_1=(2f_1*c*T_{rg}/2)c=f_1*T_{rg} \quad (40)$$

Similarly, the difference in the number of wavelengths ($\Delta L_2$) when sounding between ranges $R_1$ and $R_2$ at frequency $f_2$ is:

$$\Delta L_2=f_2*T_{rg} \quad (41)$$

The number of wavelengths to a predetermined level ($R_1$) can be adjusted by adjusting cable lengths or by slightly adjusting the range of $R_1$ so that both $L_{11}$ and $L_{21}$ are integer numbers causing $f_1$ and $f_2$ to be in-phase when received at the sensor.

As disclosed in FIG. 19 and as discussed above, the wavelengths of waveforms $f_1$ and $f_2$ are considerably smaller than the range gate spacing, i.e. $R_2-R_1$. In the example of FIG. 19, at 2 MHz the waveform has a wavelength of 150 meters. Pulsewidth limitations, as well as altitude resolution requirements, restrict the length of the range gate spacing. The pulsewidth is limited in expansion by the altitude resolution which is desired. With a 20 km pulsewidth, about the best altitude resolution achievable is 10 km. On the other hand, the pulsewidth is limited in the amount it can be shortened by the signal-to-noise ratio. The signal-to-noise ratio increases as the square of the pulsewidth. This means that if the pulsewidth is decreased by a factor of 2, the noise increases by a factor of 4.

In view of these two competing factors, range gates are normally 50% to 75% of the pulsewidth. The information content of the signal is not increased by placing the range gates any closer because the information content is not increased by sampling at a rate faster than the bandwidth of the signal. Hence, typical range gate spacing for 2 MHz radars is 3 km.

Consequently, the difference in the number of wavelengths ($\Delta L_1$ and $\Delta L_2$) between ranges $R_1$ and $R_2$ is many multiples of $2\pi$ radians. This means that $\Delta L_1$ and $\Delta L_2$ provide a resolution which is much too fine to avoid ambiguities in locating a specified altitude of a target within the coarse range gate spacing. In other words, to avoid ambiguities, the range gate spacing would have to be one-half of the wavelength of $f_1$ or $f_2$, or less. This is impossible because of the limitations of the pulsewidth of the signal imposed by signal-to-noise considerations, as set forth above.

However, these problems are overcome by considering the difference between $\Delta L_1$ and $\Delta L_2$ which is a number indicating the difference between the additional wavelengths for $f_1$ and $f_2$ necessary to sound to $R_2$. This indicated as follows:

$$\Delta L=\Delta L_2-\Delta L_1 \quad (42)$$

$$\Delta L=f_2*T_{rg}-f_1*T_{rg}=T_{rg}(f_2-f_1)=T_{rg}*\Delta f \quad (43)$$

If we set:

$$\Delta f=1/T_{rg} \quad (44)$$

then:

$$\Delta L=1 \text{ wavelength} \quad (45)$$

Consequently, the wavelength difference between the two ranges $R_1$ and $R_2$ changes by 1 wavelength of the difference frequency ($\Delta f$) whenever the difference in the frequencies is $1/T_{rg}$. This equates to a phase change of $2\pi$ (360°) since:

$$\Delta w=2\pi\Delta f \quad (46)$$

$$\Delta w=2\pi(1)=2\pi \quad (47)$$

Therefore, the phase difference becomes a vernier scale that divides each range gate into $2\pi$ radian parts, or 360 parts, if degrees are being used.

Hence, high resolution range information can be calculated as follows:

$$\text{Range} = \Delta\phi_B \cdot R_3/(2\pi) + R_1 \tag{48}$$

where $\Delta\phi_B$ equals the phase difference between $f_1$ and $f_2$ detected at the sensors and $\lambda_d$ is equal to the wavelength of $\Delta f$.

Equation 48 is a simple proportionality equation which functions as a vernier scale to detect the range of the target within the range gate.

Figure 6:
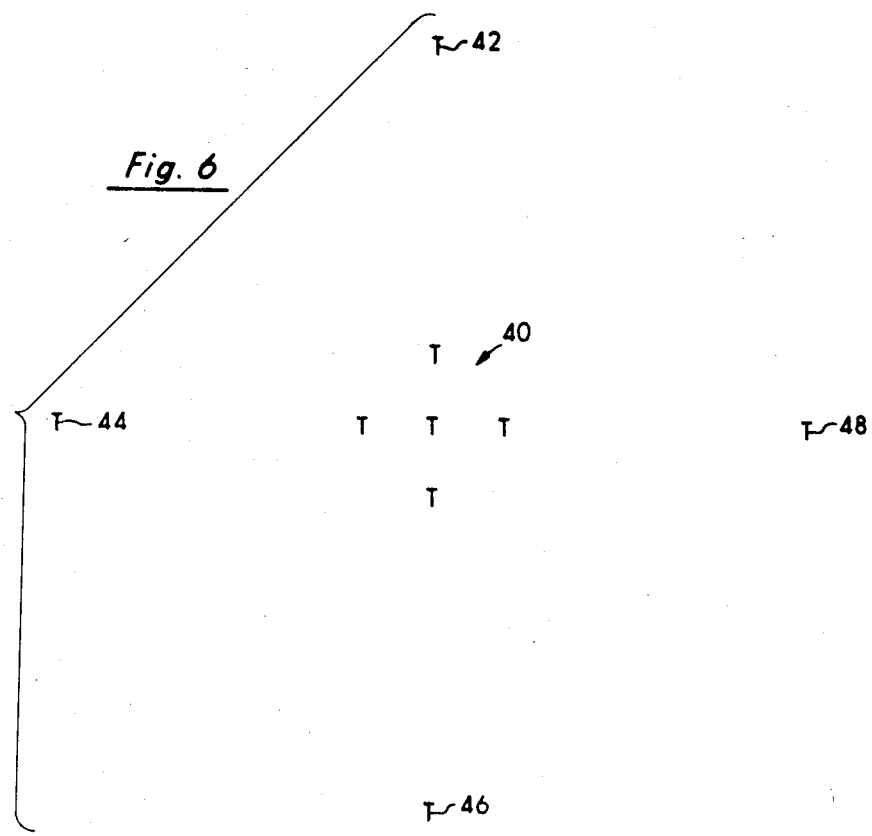
FIG. 6 is a schematic illustration of another antenna array which can be utilized with the present invention.
Figures 20, 21:
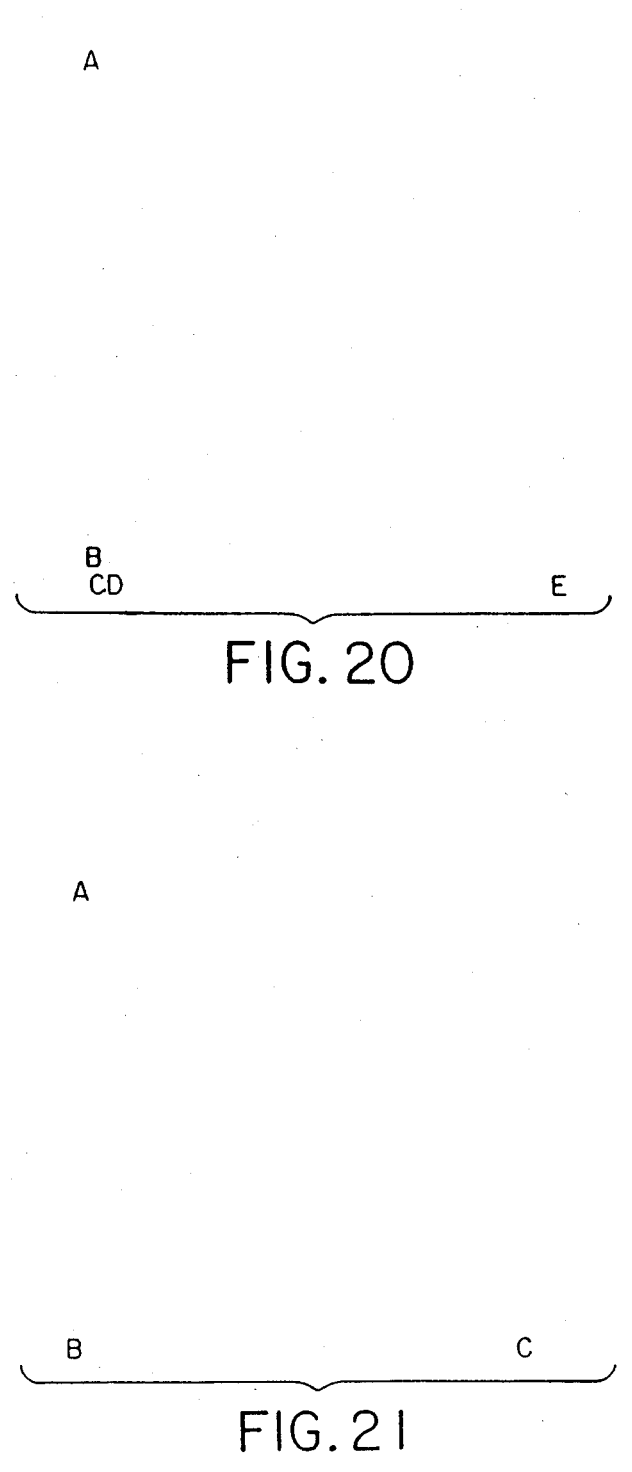

FIG. 20 discloses a typical configuration of antennas, such as disclosed in FIG. 6, wherein a central antenna is spaced within one-half wavelength of closely spaced antennas 306, 308 to prevent zenith angle aliasing, as set forth in the description of FIG. 11. Widely spaced antennas 310 and 312 are spaced at dual spacing greater than one-half wavelength to provide high resolution information regarding zenith angle as disclosed above.

However, in many applications, it is undesirable or impossible to place sensors within one-half wavelength of each other. For example, in ultrasound applications, the wavelength is measured in mm and spacing of the sensors within one-half wavelength is virtually impossible.

The sensor configuration, illustrated in FIG. 21, provides a first antenna A which is widely spaced from a central antenna B, and a third widely spaced antenna C. Both antennas A and C are spaced at multiple wavelengths of the basic frequency of the system. The configuration of sensors illustrated in FIG. 21 can be used in accordance with the present invention and still maintain an ability to unambiguously identify zenith angles of targets, as disclosed below.

ZENITH ANGLE ALIASING

Figure 22:
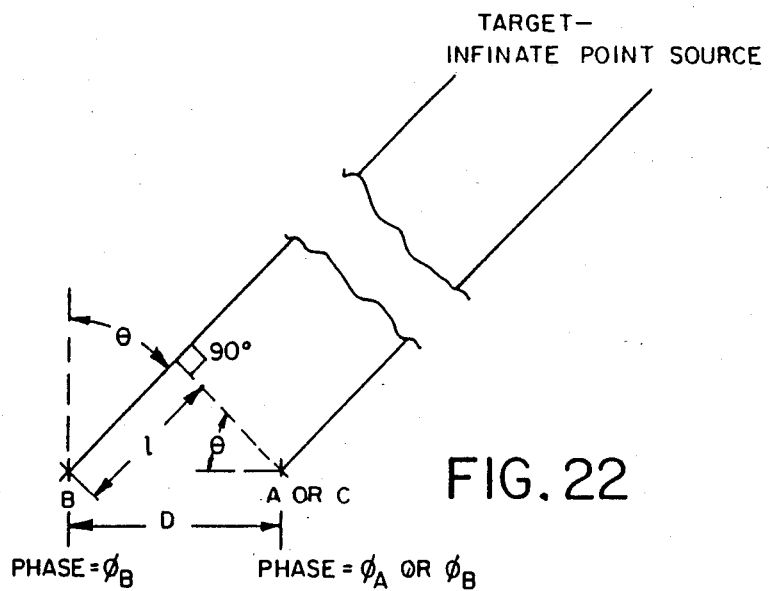
FIG. 22 is a schematic illustration of the manner in which interferometry techniques are utilized in accordance with the present invention to generate zenith angle data.

FIG. 22 is a schematic illustration disclosing the manner in which the zenith angle $\theta$ is derived from the antenna configuration of FIG. 21 using interferometry techniques. As illustrated in FIG. 22, antennas A and C are separated from the reference Antenna B by a distance D. Considering only one set of antennas, e.g., antennas A and B, the phase difference is:

$$\Delta\phi_A = \phi_A - \phi_B = 2\pi l/\lambda \tag{49}$$

From the geometry of FIG. 22, it is known that:

$$\sin \theta = l/D \tag{50}$$

and, $$l = D \sin \theta \tag{51}$$

Substituting equation (51) into equation (49) gives:

$$\Delta\phi_A = 2\pi D \sin \theta/\lambda \tag{52}$$

We know that:

$$c = f\lambda \tag{53}$$

Substituting equation (53) into equation (52) gives:

$$\Delta\phi_A = 2\pi D \sin \theta/(c/f) \tag{54}$$

or $$\Delta\phi_A = 2\pi D \cdot f \cdot \sin \theta/c \tag{55}$$

Now consider a two frequency signal. The phase change between antennas for frequency $f_1$ is:

$$\Delta\phi_{A f_1} = 2\pi D \cdot f_1 \cdot \sin \theta/c \tag{56}$$

The phase change between antennas for frequency $f_2$ is:

$$\Delta\phi_{A f_2} = 2\pi D \cdot f_2 \cdot \sin \theta/c \tag{57}$$

The difference between the phase changes for $f_1$ and $f_2$ is:

$$\Delta P_A = \Delta\phi_{A f_1} - \Delta\phi_{A f_2} \tag{58}$$

or, $$\Delta P_A = 2\pi D \cdot \sin \theta (f_1 - f_2)/c \tag{59}$$

The frequency $f_2$ can be selected so that $\Delta P_A$ is $\pi$ radians (180°) when $\sin \theta = 1$:

$$\Delta P_A = 2\pi D \cdot \sin \Delta f/c = \pi \tag{60}$$

where:

$$\Delta f = f_1 - f_2 \tag{61}$$

giving:

$$\Delta f = c/2D \tag{62}$$

Equation (62) gives the maximum distance of separation of the antennas to eliminate zenith angle ambiguities (aliasing) using the difference frequency $\Delta f$. When $\sin \theta = 1$, the target is located on the horizon which gives the maximum phase difference between the two antennas. This maximum phase difference cannot exceed $\pi$ (180°) to prevent ambiguities. Phase differences greater than $\pi$ generate ambiguous multiple zenith angle values. By limiting the maximum phase difference to $\pi$, a total change of $2\pi$ occurs from horizon to horizon so as to prevent ambiguities.

If $\Delta f$ is 100 kHz, the maximum distance the two antennas can be separated to unambiguously locate a target is 1.5 km. This is half a wavelength of the $\Delta f$ 100 kHz wave. If either $f_1$ or $f_2$ were used, assuming $f_1$ and $f_2$ are nearly equal, a 20 fold ambiguity would occur at an antenna spacing of 1.5 km.

Although the difference frequency $\Delta f$ can be used to locate the target approximately in the sky in the manner disclosed above, either $f_1$ or $f_2$, or $f_1 + f_2$ can be used to provide a very high resolution locational signal since the antennas are separated by approximately 10 wavelengths at either $f_1$, or $f_2$, and approximately 20 wavelengths at $f_1 + f_2$. Therefore, a single widely spaced pair can simultaneously give both unambiguous resolution, by using the difference frequency, and ultra-high resolution, by using either of the single frequencies, or the sum frequency signal.

In view of this, the conventional five antenna configuration illustrated in FIG. 19 can be reduced to the three antenna configuration illustrated in FIG. 21. Hence, use of two-frequency signal (dueting) reduces the number of transducers needed from 5 to 3. The transmission of the two frequency signal can be entered so that the two frequencies, as well as the sum and difference frequencies, are transmitted simultaneously from a single antenna array. This can be achieved if the hardware is capable of producing a sinusoidal waveform of sufficient clarity to prevent generation of harmonics together with the required power. Of course, this may have special application in sonic (e.g. sonar) and ultrasonic applications.

The elimination of the closely spaced pair of antennas by using dueting is extremely useful in applications such as ultrasound testing where it is physically impossible to place transducers within a half-wavelength of each other at the sounding frequency, e.g., $f_1$ or $f_2$. Additionally, very high resolution can be achieved by using the sum frequency signal.

This process can also be extended to three frequencies or more to improve resolution, and eliminate aliasing. To improve resolution, the first frequency difference is used to divide each range gate into, e.g., 360 parts. In a similar manner, a second frequency difference can be used to divide each of those parts into, e.g., 360 smaller parts, and so on. The second difference frequency needed will be much larger than the first difference frequency.

Spatial resolution using interferometry techniques can also be improved by adding a third frequency, except that the second frequency difference must be much smaller than the first frequency difference. This is exactly the opposite of the difference frequency required to increase range resolution so they must be balanced when designing a system for optimum performance. For improved azimuthal resolution using interferometry techniques, the outboard antenna is spaced one-half wavelength at the second difference frequency which, e.g., may be 100 wavelengths at the first difference frequency and 2000 wavelengths at the fundamental frequency. This may be very useful in applications such as precise satellite tracking.

As was disclosed in the description of FIG. 11, a scattering point analysis technique is used in accordance with the present invention to distinguish targets from noise by locating a common zenith angle of a possible target by determining a common phase relationship at a particular doppler frequency, as is graphically disclosed in FIG. 9. The phase difference signals $\Delta\phi$ are analyzed for the signals received at a plurality of antennas. Assuming in the equal spacing between the antennas, equal phase differences will appear on each antenna indicating a consistent zenith angle so as to distinguish the target from noise. It is assumed that each target will have a different doppler frequency so that the targets are separated by doppler frequency, as graphically indicated in FIG. 9.

In accordance with an alternative embodiment of the present invention wherein the sensor configuration illustrated in FIG. 21 is employed, a plurality of sensors along a single plane do not exist to enable the user of the system to compare more than one phase difference relationship for more than one antenna pair aligned in the same direction. Consequently, a different technique must be employed to distinguish targets from noise.

SCATTERING POINT ANALYSIS

Figure 27:
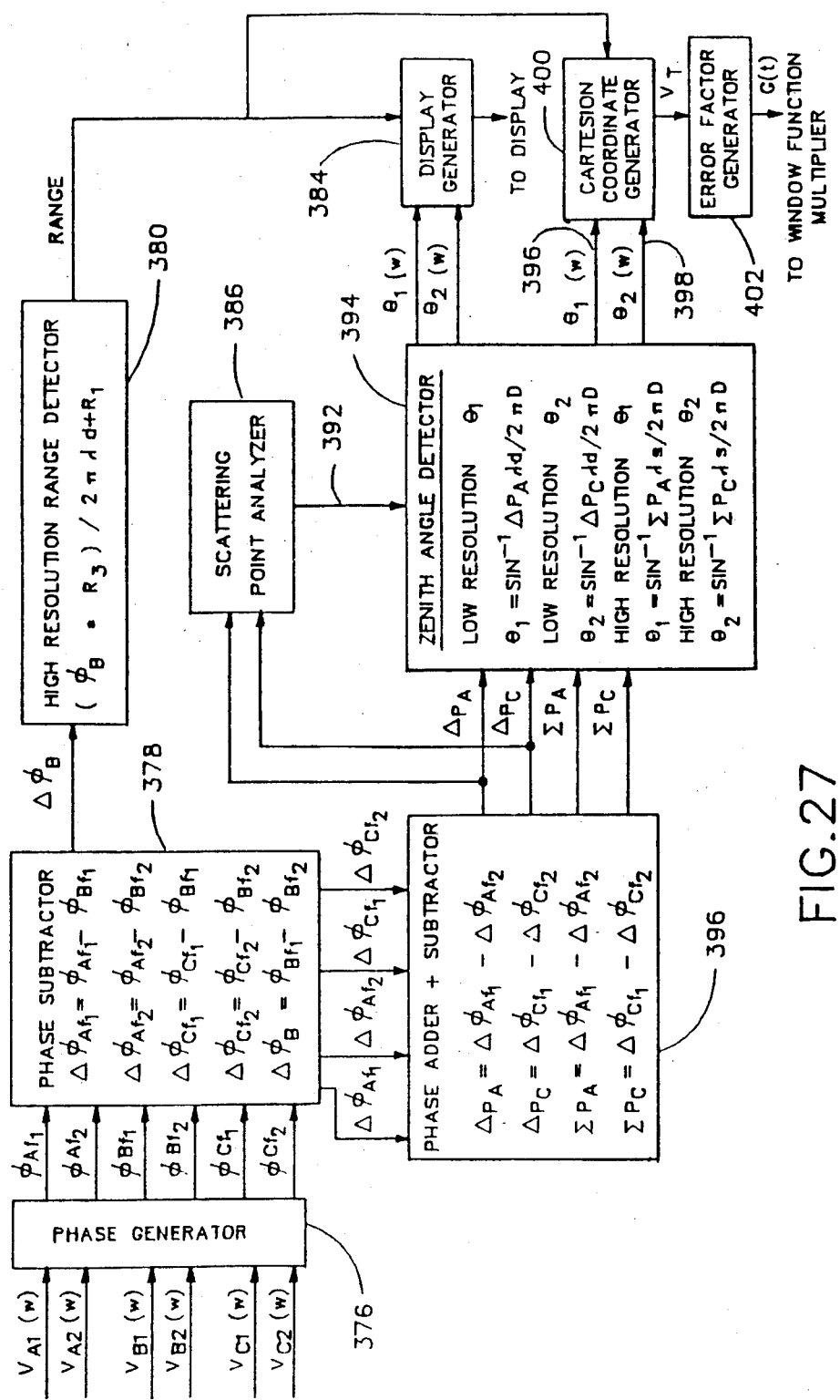
FIG. 27 is a schematic block diagram of one processor configuration used as the processor illustrated in FIG. 25.
Figure 28:
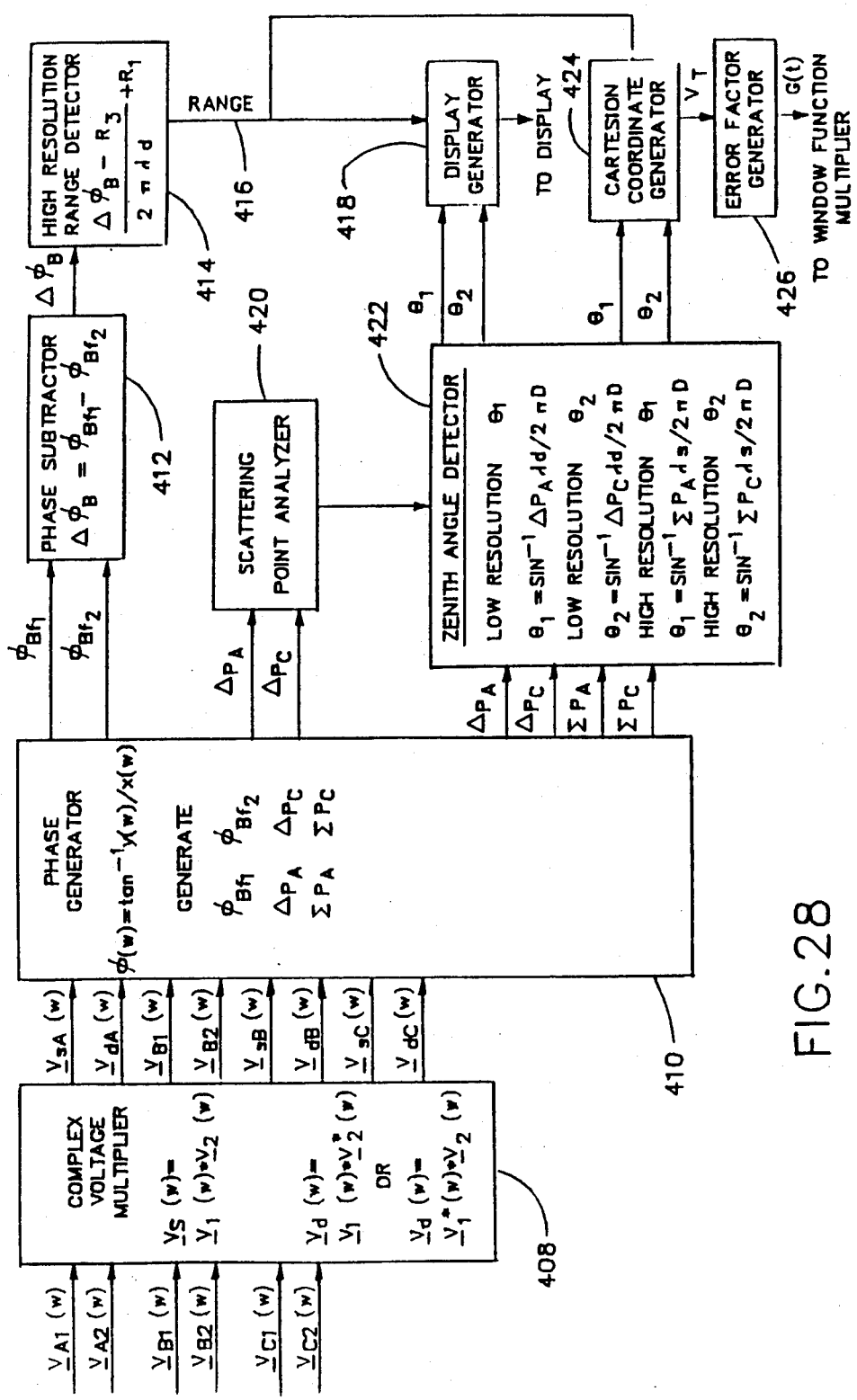
FIG. 28 is a schematic block diagram of an alternative processor configuration to be used as the processor illustrated in FIG. 25.

As disclosed in FIGS. 27 and 28, a threshold detector or persistence detector can be used as a scattering point analyzer to distinguish the targets from noise. This is explained in greater detail below.

Figure 29:
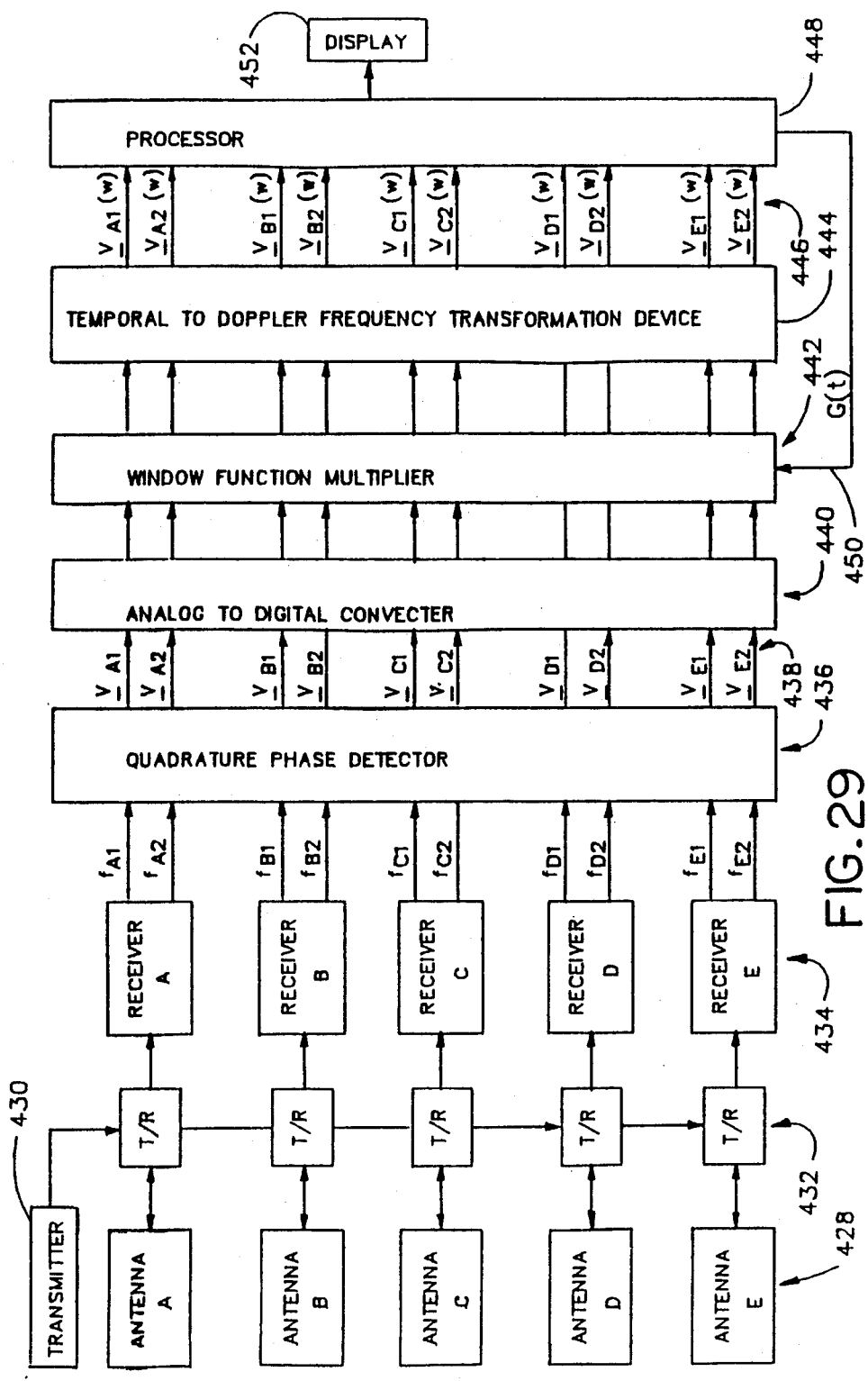
FIG. 29 is a schematic block diagram of an alternative embodiment of the device of the present invention for processing data from a five antenna array.
Figure 30:
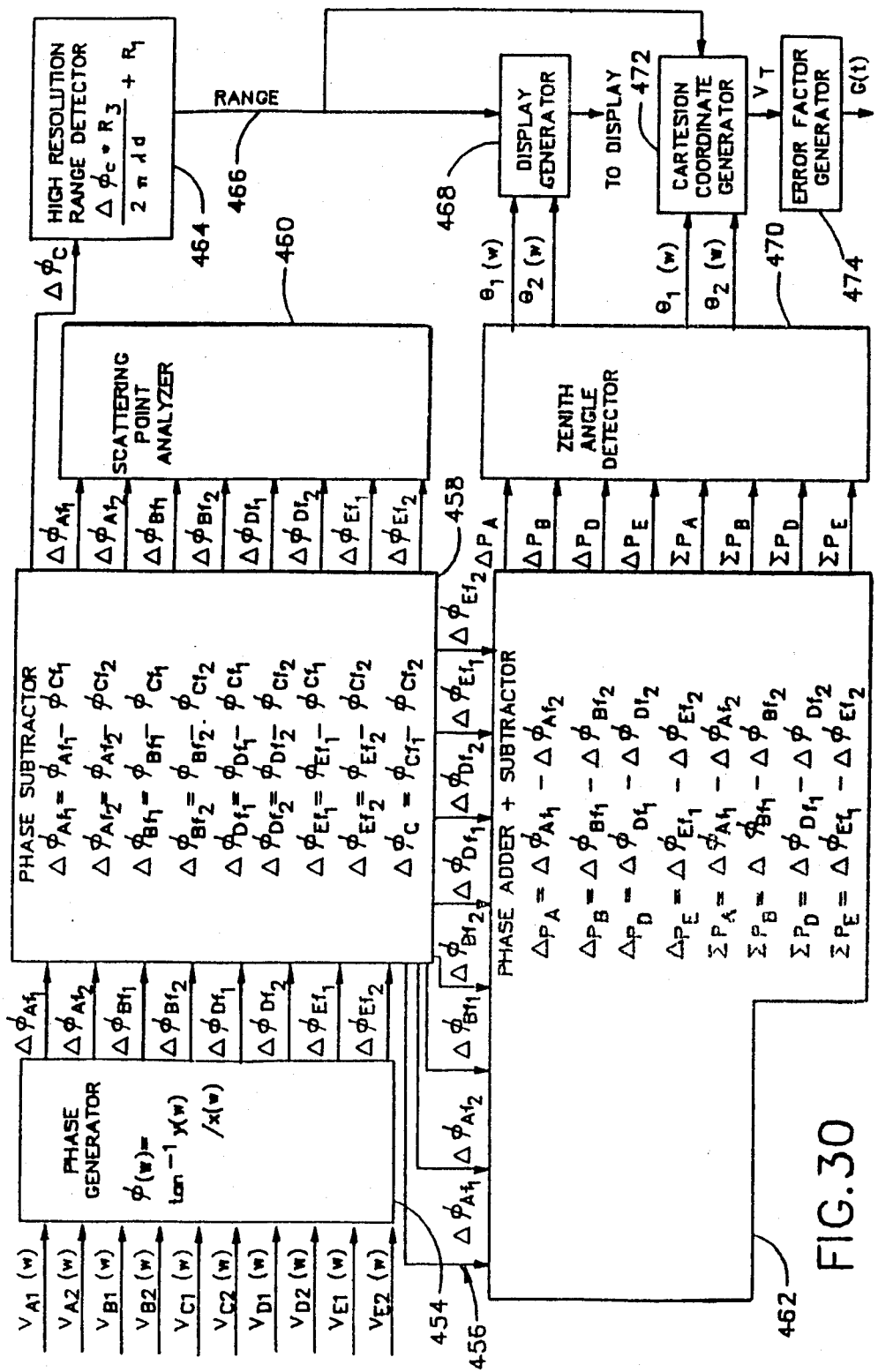
FIG. 30 is a schematic block diagram of the processor of FIG. 29.

The scattering point analysis graphically depicted in FIG. 9 can be used in accordance with the embodiment illustrated in FIGS. 29 and 30 to confirm the spatial consistency of the return signals from a potential target by examining phase values from pairs of antennas aligned in the same plane. Referring to FIG. 20, the voltage response at antenna A from frequency $f_1$ is $\underline{V}_{A1}(t)$. The voltage response at antenna A as a result of frequency $f_2$ is $\underline{V}_{A2}(t)$. Similarly, the voltage response at antenna B as a result of frequency $f_1$ is $\underline{V}_{B1}(t)$. The voltage response of antenna B of frequency $f_2$ is $\underline{V}_{B2}(t)$. Also, the voltage response at antenna C as a result of frequency $f_1$ is $\underline{V}_{C1}(t)$. The voltage response at antenna C for frequency $f_2$ is $\underline{V}_{C2}(t)$.

These complex voltage signals can be transformed to the doppler frequency domain to produce signals such as $\underline{V}_{A1}(w)$ which represent the complex voltage doppler frequency response at antenna A to frequency $f_1$. Phase signals can be produced from these complex voltage signals from the phase generator by the following equation:

$$\phi(w) = \tan^{-1} y(w)/x(w) \qquad (49)$$

The spectral phase value generated at antenna A as a result of frequency $f_1$ is denoted as $\phi_{Af1}(w)$. Similarly, spectral phase values signal generated at antenna B as a result of frequency $f_1$ is denoted as $\phi_{Bf1}(w)$. The spectral phase value signal generated at antenna C as a result of frequency $f_1$ is denoted as $\phi_{Cf1}$. If the difference between $\phi_{Af1}(w)$ and $\phi_{Bf1}(w)$ is taken, a phase difference signal is produced which is denoted as $\Delta\phi_{ABf1}$. Similarly, if the phase differences taken between $\phi_{Bf1}$ and $\phi_{Cf1}$, a phase difference signal is generated which is denoted as $\Delta\phi_{BCf1}$. The phase difference signal $\Delta\phi_{ACf1}$ denotes the difference between $\phi_{AF1}$ and $\phi_{Cf1}$. These delta phase functions can then be used to determine if a common zenith angle such as $\phi_1$ exists at each doppler frequency to determine the spatial consistency of return signal reflected from a target indicating a common zenith angle. Similar data can be taken for a second zenith angle $\theta_2$ to further confirm spatial consistency and provide sufficient information to generate a zenith angle signal $\theta$. In this manner, the spatial consistency of a return signal can be confirmed from the phase signals to distinguish targets from noise in accordance with the five antenna array illustrated in the embodiment of FIGS. 29 and 30.

RANGE ALIASING

In addition to providing high resolution range information, the two frequency signal can eliminate range aliasing. For example, in many cases, targets may be moving at a high rate of speed so that between pulses, the target moves more than a half-wavelength of either of the individual frequencies $f_1$ or $f_2$. This produces range aliasing of the signal since it is impossible to determine how many multiples of $2\pi$ the target has moved between the pulses. These problems of range aliasing are overcome by the present invention in the following manner. The complex voltage signal reflected from a target is:

$$\underline{V}(t) = x(t) + iy(t) \qquad (50)$$

This complex voltage function can also be represented in exponential form as:

$$\underline{V}(t) = Ae^{i\omega t} \tag{51}$$

or $$\underline{V}(t) = Ae^{i2\pi ft} \tag{52}$$

since $$w = 2\pi f \tag{53}$$

Assuming a target is moving towards an observer with a radial velocity ($V_r$). The complex voltage function can be written as:

$$\underline{V}(t) = Ae^{i2\pi f't} \tag{54}$$

where $f'$ = the doppler shifted frequency.

The term $f_1$ can be calculated as follows:

$$f' = f + f_D \tag{55}$$

$$f_D = f(2V_r/c) \tag{56}$$

$$f' = f + f(2V_r/c) \tag{57}$$

where:

$V_r/c$ is the fraction of the speed of light which the target is moving;

f is the frequency of the radiated signal; and $f_D$ is the doppler frequency.

If the target moves more than half of a wavelength between range gate pulses, the resultant detected signal could be any of several ambiguous values of the calculated radial velocity, as set forth above. Hence, a longer wavelength signal must be employed to eliminate range aliasing in this manner. If a two frequency signal is employed, the difference frequency provides a much longer wavelength signal to eliminate range aliasing problems.

From equation (3) the complex voltage response for a first waveform of frequency $f_1$ is:

$$\underline{V}_1(t) = Ae^{i2\pi f_1't} \tag{58}$$

The complex voltage response for a second waveform at frequency $f_2$ is:

$$\underline{V}_2(t) = Ae^{i2\pi f_2't} \tag{59}$$

The complex product of these two signals using the complex conjugate $\underline{V}_2^*(t)$ is:

$$\underline{V}_d(t) = \underline{V}_1 * \underline{V}_2^*(t) = Ae^{i2\pi f_1't} \cdot Ae^{-i2\pi f_2't} \tag{60}$$

$$\underline{V}_d(t) = 2Ae^{i2\pi(f_1' - f_2')t} \tag{61}$$

As can be seen from equation (61), the complex product behaves as a signal at a difference frequency which is equal to the difference between $f_1$ and $f_2$. To increase the wavelength, the frequency must be decreased. The complex product provides a signal which can be significantly less than the frequency of either $f_1'$ or $f_2'$ individually, if these frequencies are close.

The two frequency signal must be propagated either simultaneously, or as a combined two-frequency pulse, since the position of the target cannot substantially change between pulses to obtain a correct answer and still eliminate range aliasing.

SPECTRAL SMEARING

Spectral smearing is an additional problem which results from a change in the doppler frequency. The problems of spectral smearing are overcome in accordance with the present invention in the following manner.

The doppler frequency of a moving radar or sonar target usually varies continuously because the doppler effect is only sensitive to the radial component of the targets' velocity which changes continuously as the perspective from the radar changes, even if the target's velocity is constant. The doppler shift is therefore difficult to measure since it is constantly changing.

There are two distinctly different ways to measure the doppler frequency of a return signal:

1. incoherently, by measuring a single pulse; and,
2. coherently, by tracking the phase of the return signal from pulse to pulse so that the doppler frequency can be determined from the slope of the resulting phase versus time curve, or by using spectral transformations.

Since the present invention uses spectral transformations to coherently measure the doppler frequency, data must be collected over a period of time to perform this spectral transformation. In other words, spectral transformation techniques such as Fast Fourier Transforms, Maximum Entropy Method, Hadimard Transforms, etc. (all of which are referred to herein as Frequency Transformations) are particularly limited in situations where the frequencies are changing, since these transforms necessarily require an average over a period of time. If the doppler frequency has changed significantly over that period of time, the resultant spectral representation will be smeared.

Figure 23:
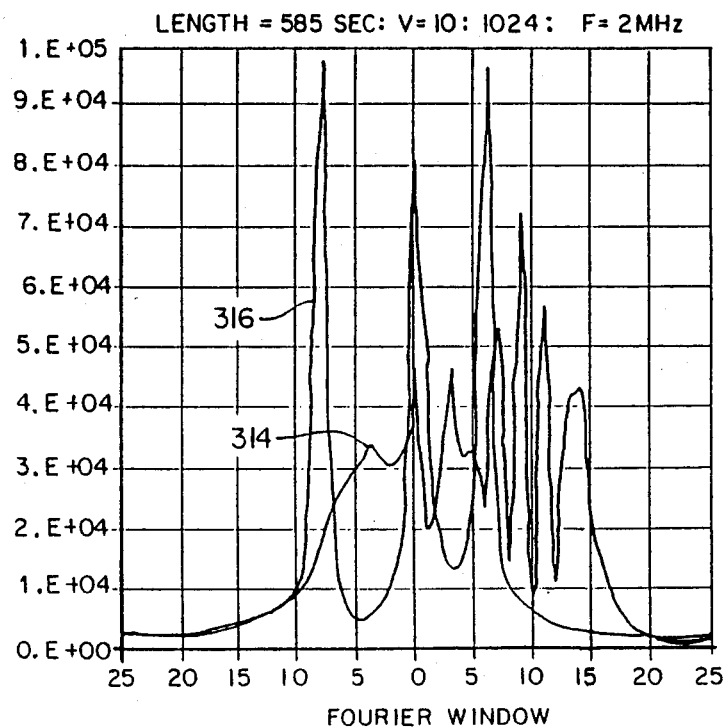
FIG. 23 is a graph illustrating spectral smearing and a corrected spectral response.

FIG. 23 shows a computer simulation illustrating the difficulty caused by radar targets having varying doppler shifts. Three radar targets are illustrated in FIG. 23 which are moving horizontally in an azimuthal location nearly overhead. Curve 314 shows the smeared spectrum, i.e. the spectrum that would be generated from a frequency transformation without the correction process of the present invention. Curve 316 shows the corrected spectrum in which each of the three targets is clearly revealed in the spectrum. It is therefore important to determine the manner in which the doppler frequency changes.

From equation (55) we know that:

$$f' = f + f_D \tag{55}$$

where $f_D$ = doppler frequency

From equation (56) we know that:

$$f_D = f(2V_r/c) \tag{56}$$

where f = the transmitted radar frequency, e.g., $f_1$ or $f_2$;

$V_r$ = the radial velocity of the target.

The rate of change of $f_D$ is proportional to the rate of change of the radial velocity $\vec{V_r}$ of the target along a unit vector 318 ($\vec{1R}$) pointing from the radar antennas to the target as disclosed in FIG. 24. The unit vector $\vec{1R}$ can be written in terms of direction cosines as follows:

$$\vec{1R} = l\vec{1x} + m\vec{1y} + n\vec{1z} \tag{62}$$

Consider a target having a total velocity 320 ($V_T$) which can be represented as follows:

$$\vec{V_T} = u\vec{1x} + v\vec{1y} + w\vec{1z} \tag{63}$$

The radial velocity $\vec{V_r}$ of $\vec{V_T}$ is the component of the target's velocity along $\vec{1R}$. The radial velocity $\vec{V_r}$ is the only measurable component of the target's velocity since velocity components perpendicular to $\vec{1R}$ cause no doppler shift.

The radial velocity is given by:

$$V_r = (V_T * 1R)1R \tag{64}$$

To determine the rate of change of the radial velocity, the derivative of $V_r$ with respect to time must be taken as follows:

$$\vec{dV_r}/dt = V_r(\vec{d1R}/dt) \tag{65}$$

assuming that $\vec{V_T}$ is constant and does not vary with time. In other words, with a constant total velocity $\vec{V_T}$, only the radial vector changes with time. This renders an equation as follows:

$$dV_r/dt = (u^2 + v^2 + w^2)/R + \\ [(u1 + vm + wn)/R^2]dR/dt \tag{66}$$

For vertical wind profilers and other sounding systems where the targets' motions are predominately perpendicular to the radius vector $\vec{1R}$, the second term in equation 66 is much smaller than the first term, and can be ignored. The equation can then be rewritten as:

$$dV_r/dt \approx V_T^2/R \tag{67}$$

since $$V_T^2 = u^2 + v^2 + w^2 \tag{68}$$

The distance R is substantially equal to the altitude N of the target when the target is nearly overhead, so equation (66) can be rewritten as:

$$dV_r/dt \approx V_T^2/N \tag{69}$$

Equation (56) gives the relationship between the radial velocity $\vec{V_r}$ and the doppler frequency $f_D$ in terms of the fundamental frequency f and the speed of light c. Restating equation 56:

$$f_D = 2fV_r/c \tag{56}$$

From equation (69) we know that:

$$\Delta V_r = V_T^2 t/N \tag{70}$$

Hence, the change in doppler frequency $\Delta f_D$ is:

$$\Delta f_D = 2f\Delta V_r/c \tag{71}$$

or $$\Delta f_D = [2f(V_T^2 t/N)]/c = 2fV_T^2 t/cN \tag{72}$$

When a frequency transformation is performed, a spectrum is generated for a number of frequency intervals, or windows. A given spectral component should not change by a significant fraction of a spectral window width if smearing is to be avoided. The width of a spectral window is:

$$(\Delta f)_w = 1/t \tag{73}$$

The ratio of the doppler smearing to the Fourier window width is:

$$(\Delta f_D)_s/(\Delta f)_w = 2fV_T^2 t^2/cN \tag{74}$$

If this ratio is not to exceed 0.1, for example, for target velocities ($V_T$) up to 100 m/s using a 50 MHz radar (f), the observation period would be limited to:

$$T_{max} = \sqrt{0.1cN/2fV_T^2} = 0.55 \text{ sec} \tag{75}$$

This is far too short to be practical for wind profilers. From equation (72) the time varying angular doppler frequency $w_D(t)$ of the return signal is:

$$w_D(t) = w_o + 4\pi fV_T^2 t/cN \tag{76}$$

since $$w_D(t) = w_o + 2\pi\Delta f_D \tag{77}$$

Referring to equation (51), the complex voltage function of the return signal can be represented in exponential form as:

$$\underline{V}(t) = A\rho^{iwt} \tag{51}$$

Combining equations (76) and (51):

$$\underline{V}(t) = A\rho^{iw_o t}\rho^{i\alpha t^2} \tag{78}$$

where $$\alpha = 4\pi fV_T^2/cN \tag{79}$$

Comparing equation (51), which comprises the complex voltage response for a constant frequency signal, and equation (78), which comprises the complex voltage response for a signal having a changing frequency, it is apparent that the term $\rho^{i\alpha t^2}$ modifies the constant frequency voltage function $A\rho^{iwt}$, and therefore, is responsible for the spectral smearing.

By determining the value of $\alpha$, a correction factor G(t) can be generated as follows:

$$G(t) = \rho^{-i\alpha t^2} \tag{80}$$

The correction factor G(t) is multiplied by the temporal voltage signal and then frequency transformed to produce a corrected or desmeared signal.

The manner in which this is implemented is illustrated in the following pseudo-code which discloses the processing of voltage signals from an antenna without desmearing and with desmearing.

---

ITERATIVE IMPLEMENTATION OF DESMEARING

Processing Without Desmearing
(at a single altitude)

INPUT COMPLEX VOLTAGE VS TIME SERIES FOR EACH ANTENNA
PERFORM FOURIER TRANSFORM FOR EACH ANTENNA
PERFORM SCATTERING-POINT ANALYSIS

-continued

ITERATIVE IMPLEMENTATION OF DESMEARING

```
CALCULATE WindVelocity
           Desmearing Procedure
                  (at a single altitude)
INPUT COMPLEX VOLTAGE VS TIME SERIES FOR EACH ANTENNA
    PERFORM FOURIER TRANSFORM FOR EACH ANTENNA
    PERFORM SCATTERING POINT ANALYSIS
    CALCULATE WindVelocity
           Calculate α from equation (79)
(*)    Alpha = 4πfV_T²/cN
           Calculate G(t) from equation (80)
       FOR EACH ANTENNA
       FOR EACH VOLTAGE IN THE TIME SERIES
           V(t) = V(t) * G(t)
       NEXT VOLTAGE
       NEXT ANTENNA
       PERFORM FOURIER TRANSFORM FOR EACH ANTENNA
       PERFORM SCATTERING-POINT ANALYSIS
    CALCULATE WindVelocity (V_T)
    CHECK FOR CLOSURE (Is this velocity the same as
    last time?)
IF NO CLOSURE, GO TO (*)
IF CLOSURE, THEN DONE.
```

FIG. 25 is a graph of radial velocity versus zenith angle θ illustrating the area of interest 322 which has a substantially constant slope. As shown in FIG. 25, the curve shows a substantially linear change in radial velocity versus zenith angle. This linear change occurs in an area which is approximately overhead. The linear nature of the curve allows the use of equation 62 or 64 to approximate the correction factor G(t).

Figure 26:
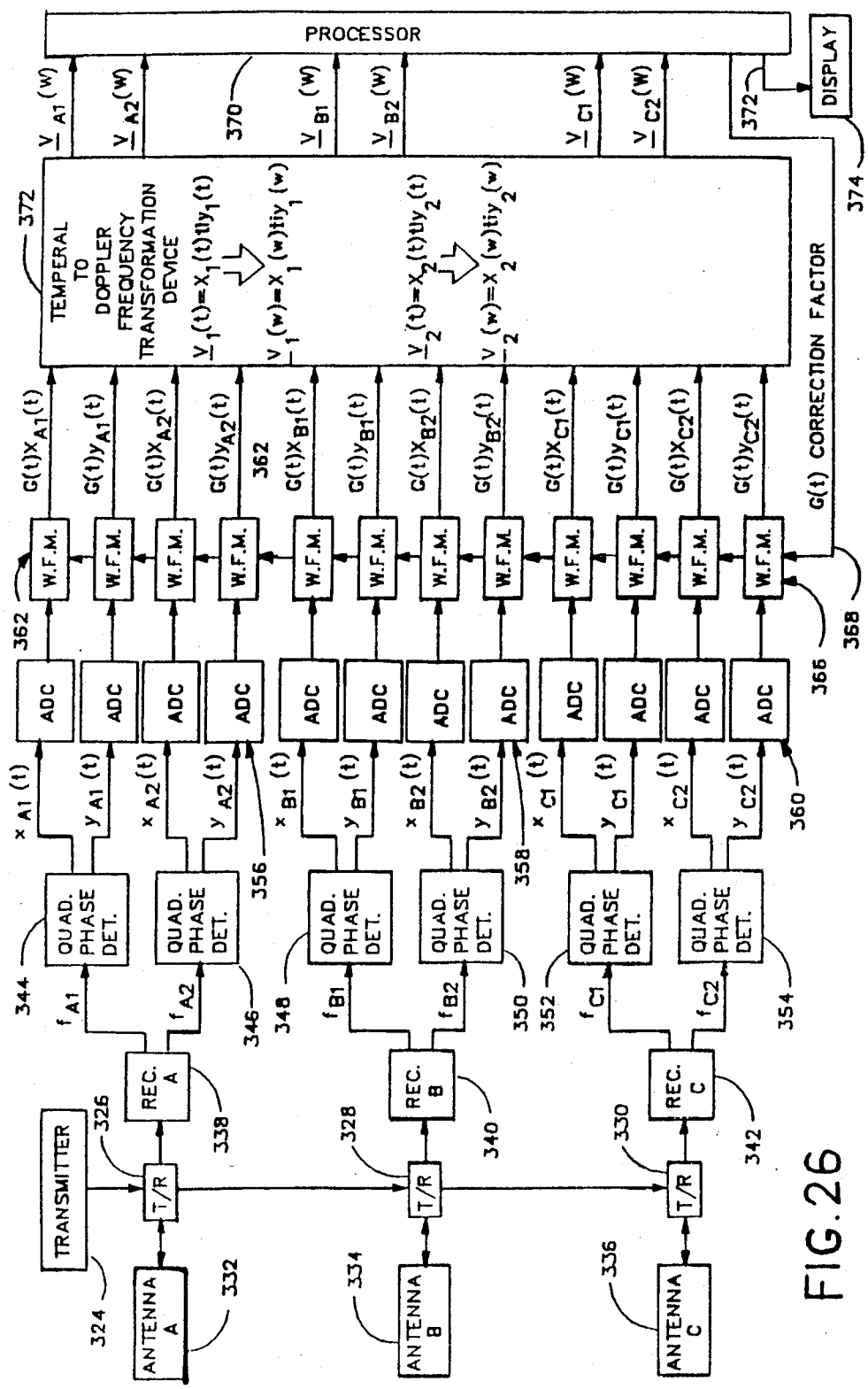
FIG. 26 is a schematic block diagram of one embodiment of the device of the present invention for processing data from a five antenna array.

FIG. 26 is a schematic block diagram of one of the embodiments for implementing the present invention. As illustrated in FIG. 26, transmitter 324 generates a two-frequency signal which can be either a combined frequency signal or a dual frequency signal produced in the manner disclosed in FIG. 19. Although the embodiment of FIG. 26 is disclosed with regard to a radar system, the same general configuration can be used with vibrational systems, including sensor systems and ultrasound systems, and any other systems in which it would be desirable to process the data in the manner disclosed. The transmitted pulse is applied to transmit/receive switches 326, 328, 330. In the transmit mode, the transmit/receive switches apply the transmit signal to antenna A 332, to antenna B 334, and antenna C 336. Transmit/receive switches 326, 328, 330 are then switched to the receive mode to couple the received signal reflected from the target and detected by antennas 332, 334, 336 to receivers 338, 340, 342, respectively. A typical two-frequency receiver unit is illustrated in FIG. 15. Each of the receiver units produces two output signals corresponding to the two frequencies of the transmitted signal. For example, receiver A 338 produces a first signal $f_{A1}$ corresponding to the received signal at a first frequency $f_1$ from antenna A, and a second signal $f_{A2}$ corresponding to a second frequency $f_2$ received at antenna A. Each of these signals is delivered to a separate quadrature phase detector. Quadrature phase detectors produce a complex voltage frequency response such as disclosed in equation 50. For example, quadrature phase detector 344 produces a voltage response as set forth in equation 75.

$$\underline{V}_{A1}(t) = x_{A1} + iy_{A1}(t) \qquad (87)$$

Analog-to-digital converters 356, 358, and 360 convert the complex voltage temporal functions $\underline{V}_A(t)$, $\underline{V}_B(t)$ and $\underline{V}_C(t)$ to digital complex voltage temporal functions and apply the digital signals to window function multipliers 362, 364, 366, respectively. The window function multipliers multiply the input digital signal by a correction factor signal G(t) to correct the complex voltage temporal functions for spectral smearing, as disclosed above. Processor 370, as disclosed infra, generates the correction factor signal G(t) and applies it to the window function multipliers via connector 368. The window function multipliers 362, 364, 366 also function to modify the complex voltage temporal functions by a window function to increase the accuracy of the temporal frequency transformation. The modified digital voltage temporal functions are then applied to temporal doppler frequency transformation device 372 to transform the temporal functions to doppler frequency functions wherein the doppler frequency is generated as a result of relative movement between the targets and the independent sensors. The manner in which the temporal voltage functions are transformed to doppler frequency functions is disclosed in block 372.

The transformed functions are then applied to processor 370 which processes the data to generate a correction factor G(t) and to produce a display signal on line 372 which is coupled to display 374. Processor 370 is capable of processing the data in two different ways, as disclosed in FIGS. 27 and 28.

FIG. 27 is a schematic block diagram illustrating the functions performed by processor 370 of FIG. 26 to detect multiple targets. Referring to FIG. 27, the corrected complex doppler frequency functions for each of the antennas at each frequency are applied to a phase generator 376. For example, the corrected complex voltage doppler frequency function generated from antenna A at frequency 1 is $\underline{V}_{A}(w)$.

Phase generator 376 generates phase functions φ(w) for each input using the standard phase function equation (49). Spectral phase functions are therefore produced for each antenna at each frequency. For example, the phase value for antenna A at frequency $f_1$ is $\phi_{A/1}$. These phase value signals are then applied to a phase subtractor 378 which generates delta phase functions, as illustrated in block 378. The delta phase functions represent the phase differences between a reference antenna, i.e., antenna B, and antennas A and C, at each frequency, i.e., $f_1$ and $f_2$. For example, $\Delta\phi_{A/1}$ is equal to $\phi_{A f1} - \phi_{B f1}$ Additionally, a delta phase function is produced for the reference antenna B (FIG. 21) which is the difference of the phase values at each of the frequencies $f_1$ and $f_2$. In other words a delta phase function $\Delta \phi_B$ is generated which is equal to $\phi_{B f1} - \phi_{B f2}$. This signal is used for high resolution range information.

$\Delta \phi_B$ is applied to high resolution range detector 380 which carries out a proportionality equation to determine the high resolution range of the targets within the range gate. High resolution gate detector 380 uses the proportionality equation 48 as a vernier scale to determine the specific range value of the targets within the range gate and produce an output signal 382 which is applied to display generator 384.

The delta phase functions $\Delta \phi_{A f1}$, $\Delta \phi_{A f2}$, $\Delta \phi_{C f1}$ and $\Delta \phi_{C f2}$ are applied to phase adder and subtractor 396 which performs the arithmetic functions illustrated to generate difference phase functions $\Delta P_{A1}$, $\Delta P_{C1}$, $\Sigma P_A$ and $\Sigma P_C$. These phase functions are applied to zenith angle detector 394 which generates low and high resolution zenith angle information. The difference phase functions are also applied to scattering point analyzer 386 which distinguishes targets from noise.

Scattering point analyzer 386 uses the difference phase functions $\Delta P_A$ and $\Delta P_C$ to determine if a target exists at a predetermined location. This can be simply achieved by using a threshold detector which eliminates noise signals below a predetermined threshold value. Additionally, spatial persistence of a target in time, i.e., if a target is detected at a specific location for a certain length of time, can be used to eliminate noise signals. Once the true target signals have been distinguished from noise in the scattering point analyzer 386, this information is given to the zenith angle detector 394 via connector 392 to ensure that zenith angles are generated for targets rather than noise.

$\Delta P_A$ is used to generate a low resolution $\theta_1$ zenith angle since $\Delta P_A$ functions as a delta phase function at a difference frequency equal to the difference between $f_1$ and $f_2$. In a similar manner, $\Delta P_C$ is used to generate a low resolution $\theta_2$ zenith angle since $\Delta P_C$ functions as a delta phase function at a difference frequency equal to the difference between $f_1$ and $f_2$. Since the difference frequency has a wavelength which is substantially longer than either of the frequencies $f_1$ or $f_2$, the zenith angles $\theta_1$ and $\theta_2$ of the targets can be unambiguously identified because of the long wavelength of the difference frequency signal, as set forth in more detail in the interferometry section set forth above.

Similarly, $\Sigma P_A$ and $\Sigma P_C$ are used to generate high resolution $\theta_1$ and $\theta_2$ angles, respectively, since $\Sigma P_A$ and $\Sigma P_C$ function as delta phase functions at a sum frequency which is approximately twice the frequency of either $f_1$ or $f_2$. The $\theta_1$ function 396 and $\theta_2$ function 398 are applied to a Cartesian coordinate generator 400 which generates the Cartesian coordinates including the total velocity signal $V_T$ which is applied to error factor generator 402 to generate the error factor function G(t), in the manner described above. Cartesian coordinate generator 400 uses the least squares fit technique, as disclosed above, to generate the Cartesian coordinates and the total velocity signal which is applied to error factor generator 402.

FIG. 28 illustrates an alternative manner in which processor 370 of FIG. 26 functions. Although the processing disclosed in FIG. 28 is somewhat simpler than that disclosed in FIG. 27, it is only useful for detecting a single target. Each of the corrected complex voltage doppler frequency functions is applied to a complex voltage multiplier which generates complex product doppler frequency functions. A complex product doppler frequency function $\underline{V}_s(w)$ is generated by generating the complex product of $\underline{V}_1(w)$ and $\underline{V}_2(w)$. The complex product doppler frequency function $\underline{V}_s(w)$ functions as a complex voltage doppler frequency function at a sum frequency equal to the sum of frequencies $f_1$ and $f_2$. The complex voltage multiplier also generates the complex product of $\underline{V}_1(w)$ and $\underline{V}_2^*(w)$, or $\underline{V}_1^*(w)$ and $\underline{V}_2(w)$ to obtain a complex product doppler frequency function $\underline{V}_d(w)$ which functions as a complex voltage doppler frequency function at a difference frequency equal to the difference between frequencies $f_1$ and $f_2$.

The complex product doppler frequency functions $\underline{V}_s(w)$ and $\underline{V}_d(w)$, as well as the complex voltage frequency functions $\underline{V}_{Bf1}(w)$ and $\underline{V}_{Bf2}(w)$ are applied to a phase generator to generate spectral phase functions $\phi(w)$, as well as difference phase functions $\Delta P(w)$ and sum phase functions $\Sigma P(w)$. The phase generator 410 generates the spectral phase functions, such as $\phi_{Bf1}(w)$ from the complex voltage doppler frequency functions, such as $\underline{V}_{Bf1}(w)$. The difference phase functions, such as $\Delta P_A$, are generated from the complex product doppler frequency functions, such as $\underline{V}_{dA}(w)$. The sum phase functions, such as $\Sigma P_A$ are generated from the complex product doppler frequency functions, such as $\underline{V}_{sA}(w)$. Once the phase generator 410 generates the spectral phase functions, the difference phase functions and sum phase functions, the processing illustrated in FIG. 29 is essentially the same as that illustrated in FIG. 27. Phase subtractor 412 derives a $\Delta \phi_B$ signal which is applied to a high resolution range detector 414 to generate a range signal 416 which is applied to display generator 418. Scattering point analyzer 420 detects the difference phase functions $\Delta P_A$ and $\Delta P_C$ and discriminates the target signals from noise. This can be accomplished, as disclosed in FIG. 27, through threshold detection or persistence detection. Target data is then applied to zenith angle detector 422 which generates high resolution $\theta_1$ and $\theta_2$ signals which are applied to display generator 418 and to Cartesian coordinate generator 420. Cartesian coordinate generator 420 derives a total velocity signal $V_T$ which is applied to error factor generator 422 which generates the error factor G(t).

FIG. 29 is a schematic block diagram illustrating a system employing five antennas 428 which correspond to the five antenna array illustrated in FIG. 20. The system works essentially in the same manner as the system illustrated in FIG. 26 with a transmitter 430 which supplies signals to five transmit/receive switches 432. The detector signal is received by five receivers 434 which apply ten different frequency signals to quadrature phase detector 436. Ten different complex voltage signals 438 are then applied to an analog-to-digital converter 440 which converts the complex voltage analog signals to digital signals. Window function multiplier 442 multiplies the digital signals by a correction factor G(t). The corrected voltage signal is then applied to temporal to doppler frequency transformation device 444 which transforms the temporal domain signals to doppler frequency domain signals 446. The complex voltage doppler frequency domain signals are then applied to processor 448 which generates the correction factor signal G(t) on output 450 and a display signal which is applied to display 452.

FIG. 30 is a schematic block diagram illustrating the functions performed by processor 448 of FIG. 29. Referring to FIG. 30, the complex voltage doppler frequency signals are applied to phase generator 454 which generate phase value signals 456 which are applied to phase subtractor 458. Phase subtractor 458 generates a series of delta phase functions which are applied to a scattering point analyzer 460 and a phase adder and subtractor 462. Phase adder and subtractor 462 generates a series of difference phase functions $\Delta P(w)$ and sum phase functions $\Sigma P(w)$ in the manner illustrated in block 462.

Phase subtractor 458 also generates a delta phase function $\Delta \phi_C$ which is applied to high resolution range detector 464 which generates a high resolution range signal 466 which is applied to display generator 468. Scattering point analyzer 460 uses the delta phase functions to identify targets from noise. The delta phase functions are examined at each of the doppler frequencies to determine if the delta phase functions indicate a common locational source of a signal. The manner in which this is accomplished is disclosed in the pseudo-code set forth below. If a common locational source of a signal is identified in the scattering point analyzer 460, this information is transmitted to zenith angle detector 470 which identifies the low resolution and high resolution zenith angle for each target. This information is then applied to display generator 468 and Cartesian coordinate generator 472 which generates a total velocity signal $V_T$ which is applied to error factor generator 474. The pseudo-code disclosed below discloses the manner in which data processing can be performed for a five antenna array, such as disclosed in FIG. 20, wherein antennas A and E are identified as number 3, antennas B and D are identified as number 2 and antenna C as number 1. The scattering point analysis is set forth in paragraph #2.

---

HIGH-RESOLUTION IMAGING DOPPLER INTERFEROMETER DATA PROCESSING, USING DESMEARING AND DUETTING, AS APPLIED TO THE MAPSTAR RADAR

STARTING POINT:

To begin the calculations, we have the following:
1. 10 independent complex voltage series, each 256 points long. Label these voltages
   V(r, f, d, a, t)
   where r = range index = 1, 2, 3. . . , 100
   f = frequency index = 1, 2
   d = direction index = 1(E-W), 2(N-S)
   a = antenna index = 1, 2, 3 (see FIG. 1)
   t = time index = 1, 2, 3, . . . , 256
Notice that V(r, f, 1, 1, t) = V(r, f, 2, 1, t) so that there are only 10 independent channels. V(r, f, d, a, t) storage = 1.228 MBytes.
2. The magnitude of the vector wind profile Wind (z) from the previous sounding. Approximate Wind(r) - Wind(z). If no previous profile available, take Wind(z) = 25 m/sec at all altitudes.

CONSTANTS:
Pi = 3.14159265
Clight = 2.997E8

PSEUDO-CODE FOR REAL-TIME PROCESSING

1. DESMEAR THE DATA

FOR EACH RANGE r: (100)
FOR EACH RADAR FREQUENCY f: (2)
  Alpha(r, f) = 4*Pi*Frequency(f)*Wind(r)**2 / [Clight*Range(r)]
  FOR EACH DIRECTION d: (2)
  FOR EACH ANTENNA a: (3)
  FOR EACH TIME t: (256)
    V(r, f, d, a, t) = V(r, f, d, a, t)*EXP( -i * Alpha(r, f) * t**2)
NEXT TIME
NEXT ANTENNA
NEXT DIRECTION
NEXT RADAR FREQUENCY
NEXT RANGE

2. LOW-RESOLUTION SCATTERING-POINT ANALYSIS

FOR EACH RANGE r: (100)
FOR EACH RADAR FREQUENCY f: (2)
FOR EACH DIRECTION d: (2)
FOR EACH ANTENNA a: (3)
  V(r,f,d,a,w) = FFT[V(r,f,d,a,t)] (256-point complex FFT)
FOR EACH DOPPLER FREQUENCY w: (256)
  Phase (r,f,d,a,w) - ARCTAN{IMAG[ V(r,f,d,a,w) ]/REAL V(r,f,d,a,w]}
NEXT ANTENNA
NEXT DIRECTION
NEXT RADAR FREQUENCY
FOR EACH DIRECTION d:
  dPhase(1,d) = [Phase(r,1,d,2,w) − Phase(r,1,d,1,w)] *[2*Frequency(1)*D12]/Clight
  dPhase(2,d) = [Phase(r,2,d,2,w) − Phase(r,2,d,1,w] *[2*Frequency(2)*D12]/Clight
  dPhase(3,d) = {[Phase(r,1,d,3,w) − Phase(r,1,d,1,w)] − [Phase(r,1,d,3,w) − Phase(r,2,d,1,w)]} {2*[Frequency(1) − Frequency(2)]*D13}/ Clight
IF (dPhase(k,d) .LT. −180) dPhase(k,d) = dPhase(k,d) +360
IF (dPhase(k,d) .GT. 180) dPhase(k,d) = dPhase(k,d) −360
dPhaseAve(d) = SUMk(dPhase(k,d))/3
RmsError(d) = SQRT{SUMk[(dPhaseAve(d) − dPhase(k,d))**2]/3}
NEXT DIRECTION
  IF (RmsError(1) .LT. 20 .AND. RmsError(2) .LT. 20)
  THEN THIS IS A VALID SCATTERING POINT!
*DO ONLY FOR VALID SCATTERING POINTS:
*(j = 1,2, . . . ,J = Scattering-Point Number)
*RangeGate(j) = r
*Doppler(j) = w
*ZenithAngle(d,j) = SUMi(ARCSIN(dPhaseAve(d)/Pi)/3)
*PhaseAve(d,j) =
  SUMf±[Phase(r,f,d,1,w)+Phase(r,f,d,2,w) −dPhaseAve(d)*D12]/2²/2
*Amplitude(d,j) = AMPLITUDE[V(r,1,d,1,w)+V(r,2,d,1,w)
  + V(r,1,d,2,w)*EXP(2*Pi*i*D12* Frequency(1)*sin(Theta(d,j)/Clight
  + V(r,2,d,2,w)*EXP(2*Pi*i*D12* Frequency(2)*sin(Theta(d,j)/Clight
  + V(r,1,d,3,w)*EXP(2*Pi*i*D13* Frequency(1)*sin(Theta(d,j)/Clight
  + V(r,2,d,3,w)*EXP(2*Pi*i*D13* Frequency(2)*sin(Theta(d,j)/Clight
*STORE j,Doppler(j), RangeGate(j), ZenithAngle(d,j), PhaseAve(d,j), Amplitude(d,j)
NEXT RANGE
Convert RangeGate and 2 ZenithAngles to x,y,z for each scattering point.
Calculate the vector Wind Profile = Wind(z) per description in JGR paper.

3. HIGH-RESOLUTION CALCULATIONS

FOR EACH SCATTERING POINT j:
LOCATE each scattering point in a single range gate.
MRRange(j) = RangeGate(j) [Phase(r,2,d,1,w) − Phase(r,1,d,1,w)]/100 (in km)
FOR EACH POSSIBLE SOLUTION s:
  HRRtry(j,s) = RangeGate(j) + {(s-1)+[Phase(r,2,d,1,w)+Phase(r,1,d,1,w)]/ (2*Pi)}*Clight/{2*[Frequency(1)+ Frequency(2)]}
NEXT POSSIBLE SOLUTION
  SELECT the HRRtry(j,s) closest to the MRRange(j) = HRRange(j)
FOR EACH DIRECTION d:
  HRdPhase(d,j) = [Phase(r,1,d,3,w) − [Phase(r,1,d,1,w)+ Phase(r,1,d,2,w)²/2]
FOR EACH POSSIBLE SOLUTION s:

-continued

```
HRZAtry(d,j,s) = arcsin[{HRdPhase(d,j)+(s-1)*360}*
   Clight/{Pi*[Frequency(1)+Frequency(2) *(D13 +
   D23)}]
NEXT POSSIBLE SOLUTION
   SELECT the HRZAtry(d,j,s) closest to the
ZenithAngle(d,j) = HRZenithAngle(d,j)
NEXT DIRECTION
   STORE j,Doppler(j), MRRange(j), HRRange(j),
   HRZenithAngle(d,j), PhaseAve(d,j), Amplitude
   (d,j)
NEXT SCATTERING POINT
   Convert HRRange and 2 HRZenithAngles to x,y,z for
each scattering point.
Calculate the high-resolution vector Wind Profile =
HRWind(z) using variable-width altitude intervals,
each containing 4 scattering points.
```

Consequently, the present invention is capable of performing scattering point analysis to distinguish targets from noise by using delta phase functions at different frequencies and simultaneously using the two-frequency signals to eliminate zenith angle aliasing, range aliasing and to determine high resolution range location. The present invention also provides for correction of spectral smearing by the generation of a correction factor signal which is used to correct the complex voltage temporal functions and provide a high resolution response.

Since a previously calculated correction factor is used for each currently detected signal, the initial correction factor can be generated with a short series of the two-frequency pulses to minimize errors in the correction factor. By initially minimizing errors in the correction factor, subsequent correction factor have less errors.

Another alternative method of use of the present invention comprises detecting changes in phase path length induced between the sensors and a fixed target by an intermediate medium such as a gas. This could be implemented by placing a gas between the sensors and a fixed reflector, such as a steel plate. Changes in the speed of sound in the medium due to the minute changes in the gas can then be detected. Continual measurements of a fixed range between the sensors and the plate are detected with small changes in the phase path length due to the intermediate gas. Changes in the speed of sound in the gas can result from changes in temperature in the gas, or changes in density. These same techniques can be used with other states of matter, such as plasmas, and may be particularly useful for interferometry studies of plasmas.

The present invention is therefore capable of locating and identifying a multiple number of targets simultaneously with a high degree of resolution. The information obtained can be used to form images of the targets and can be implemented in a wide variety of technical areas, such as imaging radar, as disclosed herein, medical body scanners, materials testing for internal defects, examination of three dimensional dynamics of flames and combustion processes, imaging sonar, inspection of dams and bridges, high resolution mapping of lake and ocean bottoms, underwater archeology and geology, fish counting and tracking, three dimensional fluid flow in wind tunnels and pipes, non-intrusive tree ring counting and growth studies, production line quality control for manufacturing processes, digital imaging for robotics and the non-intrusive examination of orbiting satellites. High resolution can be achieved using two frequency range detector devices. Additionally, synthetic beam translation techniques can be utilized to image non-moving targets.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except in so far as limited by the prior art.

What is claimed is:

1. A process of locating and distinguishing targets comprising the steps of:
   transmitting a temporal series of pulses to illuminate said targets;
   detecting said temporal series of pulses reflected from said targets by at least three independent sensors;
   producing complex voltage temporal functions at each of said independent sensors;
   transforming said complex voltage temporal functions to complex voltage doppler functions which vary with a doppler frequency (w) indicative of relative movement between said targets and said sensors;
   generating phase value functions from said complex voltage doppler frequency functions which vary as a function of doppler frequency (w);
   analyzing said phase value functions to distinguish said targets from noise and locate said targets in zenith angle by comparing differences in phase amplitudes of said phase value functions as a function of spatial separation of said independent sensors such that a common locational source of said temporal series of pulses returned from said targets can be identified;
   generating at least one correction factor function which varies with the rate of change of said doppler frequency (w);
   modifying said complex voltage temporal functions by a previously generated correction factor function to correct said complex voltage temporal functions for spectral smearing.

2. The process of claim 1 wherein said step of generating correction factor functions comprises the steps of:
   determining total scalar velocity of each of said targets;
   determining range of said targets;
   using said total scalar velocity and said range of said targets in an exponential function to generate said corrections factor signal.

3. The process of claim 1 wherein said step of generating correction factor functions comprises the steps of:
   determining mean motion of ensemble of targets of said targets;
   determining range of said targets;
   using said total scalar velocity and said range of said targets in an exponential function to generate said corrections factor signal.

4. The process of claim 2 wherein said step of determining range of said targets comprises:
   measuring time of flight of said temporal series of pulses to provide a range gate;

using two-frequency pulses as said temporal series of pulses having a difference frequency which has a wavelength that is longer than said range gate;

generating phase functions of said difference frequency to locate said targets in said range gate.

5. A process for eliminating zenith angle aliasing in a process for locating at least one target with a two-frequency pulse comprising the steps of:

transmitting said two frequency pulse;

detecting said pulse with at least three independent sensors;

producing complex voltage temporal functions $\underline{V}_1(t)$ and $\underline{V}_2(t)$ from each of said independent sensors corresponding to a first and second frequency of said two-frequency pulse;

transforming said complex voltage temporal functions $\underline{V}_1(t)$ and $\underline{V}_2(t)$ to complex voltage doppler frequency functions $\underline{V}_1(w)$ and $\underline{V}_2(w)$ which are a function of the doppler frequency (w) of said targets relative to said independent sensors;

generating complex products with the complex conjugate of $\underline{V}_1(w)$ and $\underline{V}_2(w)$ to produce complex product doppler frequency functions $\underline{V}_d(w)$ which act as complex voltage doppler frequency functions at a difference frequency equal to the difference between said first and second frequencies;

generating phase difference functions $\Delta P(w)$ from said complex product doppler frequency functions $\underline{V}_d(w)$ which indicate the difference between phase delta functions $\Delta\phi_1(w)$ and $\Delta\phi_2(w)$ detected between corresponding predetermined sets of said independent sensors;

examining phase amplitudes of said phase difference functions ($\Delta P$) as a function of doppler frequency to spatially identify said targets without zenith angle aliasing by selecting said first and second frequencies so that said difference frequency has a wavelength sufficiently long to eliminate zenith angle aliasing.

6. A process for eliminating zenith angle aliasing in a process for locating at least one target with a two-frequency pulse comprising the steps of:

transmitting said two frequency pulse;

detecting said pulse with at least three independent sensors;

producing complex voltage temporal functions $\underline{V}_1(t)$ and $\underline{V}_2(t)$ from each of said independent sensors corresponding to a first and second frequency of said two-frequency pulse;

transforming said complex voltage temporal functions $\underline{V}_1(t)$ and $\underline{V}_2(t)$ to complex voltage doppler frequency functions $\underline{V}_1(w)$ and $\underline{V}_2(w)$ which are a function of the doppler frequency (w) of said targets relative to said independent sensors;

generating spectral phase functions $\phi_1(w)$ from $\underline{V}_1(w)$;

generating spectral phase functions $\phi_2(w)$ from $\underline{V}_2(w)$;

generating delta phase functions $\Delta\phi_1(w)$ from $\phi_1(w)$;

generating delta phase functions $\Delta\phi_2(w)$ from $\phi_2(w)$;

determining the difference between $\Delta\phi_1(w)$ and $\Delta\phi_2(w)$ for identical sets of said sensors to generate a difference phase functions $\Delta P(w)$;

examining phase amplitudes of said phase difference functions ($\Delta P$) as a function of doppler frequency to spatially identify said targets without zenith angle aliasing by selecting said first and second frequencies so that said difference frequency has a wavelength sufficiently long to eliminate zenith angle aliasing.

7. A process for correcting spectrally transformed complex voltage temporal data signals reflected from at least one target comprising the steps of:

generating a correction factor signal equal to $\rho^{-i\alpha t^2}$ where:

$$\alpha = \frac{4\pi f V_T^2}{cN};$$

f = fundamental frequency of said temporal data signals;

$V_T$ = scalar total velocity of said target;

N = altitude of said target;

c = speed of light.

multiplying said complex voltage temporal data signals by said correction factor signal.

8. A process for providing high resolution zenith angle information of a plurality of targets comprising:

transmitting a two-frequency pulse comprising a first frequency and a second frequency;

detecting said pulse with at least three independent sensors;

measuring the time of flight of said pulse reflected from said targets to provide a range gate spacing which is less than the wavelength of a difference frequency, said difference frequency equal to the difference between said first frequency and said second frequency;

producing complex voltage temporal functions $V_1(t)$ from each of said independent sensors derived from said first frequency signal;

producing complex voltage temporal functions $V_2(t)$ from each of said independent sensors derived from said second frequency signal;

transforming said complex voltage temporal functions $V_1(t)$ and $V_2(t)$ to complex voltage doppler frequency functions $V_1(w)$ and $V_2(w)$ which are a function of doppler frequencies (w) resulting from relative motion between said targets and said independent sensors;

generating the complex products of $\underline{V}_1(w)$ and $\underline{V}_2(w)$ using a complex conjugate to produce complex product doppler frequency functions $\underline{V}_d(w)$ which act as complex voltage doppler frequency functions at said difference frequency, and to produce complex product doppler frequency functions $\underline{V}_s(w)$ which act as complex voltage doppler frequency functions at a sum frequency equal to the sum of said first and second frequencies;

generating phase difference functions $\Delta P(w)$ from said complex product doppler frequency functions $\underline{V}_d(w)$;

generating phase sum functions $\Sigma P(w)$ from said complex voltage doppler frequency functions $\underline{V}_s(w)$;

examining said phase difference functions $\Delta P(w)$ to eliminate zenith angle aliasing of said targets;

examining said phase sum functions $\Sigma P(w)$ to determine zenith angle of said targets for which aliasing of said zenith angle has been eliminated.

9. The process of claim 8 further comprising the steps of:

deriving phase value functions $\phi_1(w)$ and $\phi_2(w)$ from said complex voltage doppler frequency functions $\underline{V}_1(w)$ and $\underline{V}_2(w)$;

using the difference between said phase value functions to determine the range of said targets within a range gate.

10. The process of claim 9 further comprising the steps of:
    generating correction factor functions derived from a rate of change of said doppler frequencies (w);
    modifying said complex voltage temporal functions $\underline{V}_1(t)$ and $\underline{V}_2(t)$ from previously generated correction factor functions to correct said complex voltage temporal functions for spectral smearing.

11. The process of claim 10 further comprising the steps of:
    initially generating said correction factor functions with a short series of said two-frequency pulses to minimize spectral smearing;
    using said initially generated correction factor functions to modify subsequent complex voltage temporal functions for minimizing spectral smearing.

12. The method of claim 10 further comprising the steps of:
    sequentially scanning said independent sensors at a predetermined scanning rate to synthetically induce a change in path length between said independent sensors and said targets to synthetically generate a doppler frequency (w).

13. The method of claim 12 wherein said step of generating said correction factor functions comprises the steps of:
    precisely determining said correction factor functions by precisely determining said rate of change of said complex voltage temporal functions $\underline{V}_1(t)$ and $\underline{V}_2(t)$ from said predetermined scanning rate.

14. A process for providing three dimensional, high resolution locational information for a plurality of targets comprising the steps of:
    transmitting a two-frequency pulse;
    detecting said pulse reflected from said targets with at least three independent sensors;
    measuring the time of flight of said pulse reflected from said targets to provide a range gate;
    producing complex voltage temporal functions $\underline{V}_1(t)$ from each of said independent sensors derived from a first frequency signal of said two-frequency pulse, said complex voltage temporal functions $\underline{V}_1(t)$ each having an in-phase component $X_1(t)$ and a quadrature component $y_1(t)$;
    producing complex voltage temporal functions $\underline{V}_2(t)$ from each of said independent sensors derived from a second frequency signal of said two-frequency pulse, said complex voltage temporal functions $\underline{V}_2(t)$ each having an in-phase component $X_2(t)$ and a quadrature component $y_1(t)$;
    generating corrected complex voltage temporal functions $G(t)\underline{V}_1(t)$ and $G(t)\underline{V}_2(t)$ by modifying $\underline{V}_1(t)$ and $\underline{V}_2(t)$ by a window function $G(t)$ comprising a correction factor to compensate for changes in velocity of said targets relative to said independent sensors;
    selecting said range gate and said first and second frequencies so that said range gate is less than a wavelength of a difference frequency, said difference frequency equal to the difference between the frequencies of said first frequency signal and said second frequency signal;
    transforming said corrected complex voltage temporal functions $G(t)\underline{V}_1(t)$ and $G(t)\underline{V}_2(t)$ to complex voltage doppler frequency functions $\underline{V}_1(w)$ and $\underline{V}_2(w)$;
    generating phase value functions $\phi_1(w)$ and $\phi_2(w)$ from said corrected complex voltage temporal functions;
    examining the phase amplitude of the difference of said phase value functions $\phi_1(w)$ and $\phi_2(w)$ derived from a single sensor to identify said targets by determining a common zenith angle indicating a common locational source of said pulse reflected from said target.
    generating complex products of $\underline{V}_1(w)$ and $\underline{V}_2(w)$ to produce complex product doppler frequency functions $\underline{V}_s(w)$ which act as corrected complex voltage doppler frequency functions at a sum frequency, said sum frequency equal to the sum of the frequencies of said first frequency signal and said second frequency signal;
    generating complex products of $\underline{V}_1(w)$ and $\underline{V}_2(w)$ to produce complex product doppler frequency functions $\underline{V}_d(w)$ which act as corrected complex voltage doppler frequency functions at said difference frequency;
    generating phase difference functions $\Delta P(w)$ from said complex product doppler frequency functions $\underline{V}_d(w)$;
    generating phase sum functions $\Sigma P(w)$ from said complex voltage doppler frequency functions $\underline{V}_s(w)$;
    examining the phase amplitude of said phase difference functions $\Delta P(w)$ as a function of doppler frequency to eliminate zenith angle aliasing of said targets;
    examining the phase amplitude of said phase sum functions $\Sigma P(w)$ as a function of doppler frequency using data produced by examining said phase difference functions $\Delta P(w)$ to provide high resolution zenith angle data;
    generating correction factors for correcting subsequent complex voltage temporal functions using a least squares fit technique by approximately determining the altitudes of said targets and calculating the total velocity of each of said targets relative to said independent sensors determined from previously derived radial velocities, spatial locations and ranges of said targets.

15. A process for identifying and locating a plurality of targets comprising the steps of:
    transmitting a two-frequency pulse having a first and second frequency;
    detecting said pulse reflected from said targets with at least three independent sensors;
    measuring the time of flight of said two-frequency pulse to provide a range gate which is less than the wavelength of a difference frequency, said difference frequency equal to the difference between said first and second frequency;
    producing complex voltage temporal functions $\underline{V}_1(t)$ at each of said independent sensors from said first frequency;
    producing complex voltage temporal functions $\underline{V}_2(t)$ at each of said independent sensors from said second frequency;
    transforming said complex voltage temporal functions $\underline{V}_1(t)$ and $\underline{V}_2(t)$ to complex voltage doppler frequency functions $\underline{V}_1(w)$ and $\underline{V}_2(w)$ which are a function of a doppler frequency generated as a result of relative movement between said targets and said independent sensors;

generating spectral phase functions $\phi_1(w)$ from said complex voltage doppler frequency functions $\underline{V}_1(w)$;

generating spectral phase functions $\phi_2(w)$ from said complex voltage doppler frequency functions $\underline{V}_2(w)$;

generating phase delta functions $\Delta\phi_1(w)$ equal to the difference between said spectral phase functions $\phi_1(w)$ for predetermined sets of said independent sensors;

generating phae delta functions $\Delta\phi_2(w)$ equal to the difference between said spectral phase functions $\phi_2(w)$ for said predetermined sets of said independent sensors;

comparing $\Delta\phi_1(w)$ and $\Delta\phi_2(w)$ for corresponding sets of said predetermined sets of said independent sensors to identify said targets by determining a common zenith angle indicating a common locational source of said pulse reflected from said targets.

16. The process of claim 15 further comprising the steps of:

generating phase difference functions $\Delta P(w)$ equal to the difference between $\Delta\phi_1(w)$ and $\Delta\phi_2(w)$ for said corresponding sets of said predetermined sets of said independent sensors, whereby said phase difference functions act as spectral phase functions at a difference frequency equal to the difference between said first and second frequency;

analyzing said phase difference functions $\Delta P(w)$ to eliminate zenith angle aliasing and unambiguously determine said zenith angle of said targets by selecting said first and second frequency such that said difference frequency has a half wavelength which is greater than said predetermined intervals.

17. The process of claim 16 further comprising the steps of:

generating phase sum functions $\Sigma P(w)$ equal to the sum of said phase delta functions $\Delta\phi_1(w)$ and $\Delta\phi_2(w)$ for said corresponding sets of said predetermined sets of said independent sensors whereby said phase sum functions act as spectral phase functions at a sum frequency equal to the sum of said first and second frequency;

analyzing said phase sum functions $\Sigma P(w)$ to determine said zenith angle of said targets with high resolution using data produced by said low resolution zenith angle detector means.

18. The process of claim 15 further comprising the steps of:

generating at least one range phase delta function equal to the difference between $\phi_1(w)$ and $\phi_2(w)$ for a single sensor of said independent sensors;

using said range phase delta function as a proportionality function to calculate the range of said targets within said range gates.

19. The process of claim 15 further comprising the steps of:

generating a correction factor function which is derived from the rate of change of said doppler frequency (w);

modifying said complex voltage temporal functions $\underline{V}_1(t)$ and $\underline{V}_2(t)$ from previously generated correction factor functions to correct said complex voltage temporal functions $\underline{V}_1(t)$ and $\underline{V}_2(t)$ for spectral smearing.

20. The process of claim 19 wherein said step of generating a correction factor function further comprises the steps of:

determining total scalar velocity of a target;

generating an exponential function from said total scalar velocity and a detected range.

21. The method of claim 19 further comprising the steps of:

initially generating said correction factor function with a short series of said two-frequency pulses;

using said correction factor function initially generated with said narrow pulsewidth two-frequency pulses to correct said subsequent complex voltage temporal functions.

22. The method of claim 19 further comprising the steps of:

sequentially scanning said independent sensors to synthetically induce a change in path length between said independent sensors and said targets to generate said doppler frequency (w).

23. The method of claim 21 wherein said step of generating said correction factor functions comprises the steps of:

precisely determining said correction factor function by precisely determining said rate of change of said complex voltage temporal functions $\underline{V}_1(t)$ and $\underline{V}_2(t)$ from a predetermined scanning rate used to sequentially scan said independent sensors and from said range and zenith angle determined from said phase difference functions ($\Delta P$) and said phase sum functions ($\Sigma P$).

24. The method of claim 19 wherein said step of generating a correction factor function comprises the steps of:

determining scalar total velocity ($V_T$) of said targets;

generating a correction factor signal substantially equal to $\rho^{i\alpha t^2}$ where:

$$\alpha = \frac{4\pi f V_T^2}{cN};$$

f = fundamental frequency of said temporal data signals;

$V_T$ = scalar total velocity of said target;

N = altitude of said target;

c = speed of light.

25. The method of claim 19 wherein said step of generating correction factor function comprises the steps of:

generating a correction factor signal substantially equal to $\rho^{-\alpha t^2}$ where:

$$\alpha = \frac{2\pi f(u^2 + v^2 + w^2)R - (ul + vm + wm)dR/dt}{cR^2}$$

f = fundamental frequency of said temporal data signals;

R = altitude of said targets;

(x,y,z) = coordinates of said targets;

l = x/R m = y/R n = z/R u = magnitude of the velocity of said targets in x direction;

v = magnitude of the velocity of said targets in y direction;

w = magnitude of the velocity of said targets in z direction.

26. The process of claim 19 further comprising:
generating the complex product of the complex voltage doppler frequency functions $\underline{V}_1(w)$ and the complex voltage doppler frequency functions $\underline{V}_2(w)$ to produce a complex product doppler frequency function $\underline{V}_d(w)$ at said difference frequency;
using said complex product doppler frequency function $\underline{V}_d(w)$ to locate at least one of said targets and eliminate zenith angle aliasing.

27. A system for locating and distinguishing targets comprising:
transmitter array means for transmitting a temporal series of pulses to illuminate said targets;
sensor array means for detecting said temporal series of pulses reflected from said targets by at least three independent sensors;
phase detector means for producing complex voltage temporal functions at each of said independent sensors;
spectral transformation means for transforming said complex voltage temporal functions to complex voltage doppler functions which vary with a doppler frequency (w) generated as a result of relative movement between said targets and said sensors;
phase generator means for generating phase value functions from said complex voltage doppler frequency functions which vary as a function of doppler frequency (w);
means for analyzing said phase value functions to distinguish said targets from noise and locate said targets in zenith angle by comparing differences in phase amplitudes of said phase value functions as a function of spatial separation of said independent sensor such that a common locational source of said temporal series of pulses returned from said targets can be identified;
means for generating a correction factor function which varies with the rate of change of said doppler frequency (w);
means for modifying said complex voltage temporal functions by a previously generated correction factor function to correct said complex voltage temporal functions for spectral smearing.

28. The system of claim 27 wherein said means for generating a correction factor function comprises:
means for determining total scalar velocity of a target;
means for determining range of said target;
means for generating an exponential function from said total scalar velocity and said range to produce a correction factor signal.

29. A system for simultaneously locating a plurality of targets comprising:
transmitter array means for transmitting two-frequency pulses to illuminate said targets;
sensor array means having at least three independent sensors for detecting said two-frequency pulses reflected from said targets;
phase detector means for producing complex voltage temporal functions $\underline{V}_1(t)$ independently for each of said independent sensors of said sensor array means, said complex voltage temporal functions $\underline{V}_1(t)$ derived from a first frequency of said two-frequency pulses, and for producing complex voltage temporal functions $\underline{V}_2(t)$ independently for each of said independent sensors of said sensor array means, said complex voltage temporal functions $\underline{V}_2(t)$ derived from a second frequency of said two frequency pulses;
spectral transformation means for transforming $\underline{V}_1(t)$ and $\underline{V}_2(t)$ to complex voltage doppler frequency functions $\underline{V}_1(w)$ and $\underline{V}_2(w)$ which are a function of doppler frequencies (w) induced in $\underline{V}_1(t)$ and $\underline{V}_2(t)$ as a result of a change in path length between said transmitter array means, said targets and said sensor array means;
means for generating complex products of $\underline{V}_1(w)$ and $\underline{V}_2(w)$ using complex conjugates to produce complex product doppler frequency functions $\underline{V}_d(w)$ which act as complex voltage doppler frequency functions at a difference frequency equal to the difference between said first frequency and said second frequency;
means for generating complex products of $\underline{V}_1(w)$ and $\underline{V}_2(w)$ to produce complex product doppler frequency functions $\underline{V}_s(t)$ which act as complex voltage temporal functions at a sum frequency equal to the sum of said first frequency and said second frequency;
means for generating phase difference functions $\Delta P(w)$ from said complex product doppler frequency functions $\underline{V}_d(w)$;
means for generating phase sum functions $\Sigma P(w)$ from said complex product doppler frequency functions $\underline{V}_s(w)$;
means for analyzing said phase difference functions $\Delta P(w)$ to eliminate zenith angle aliasing by unambiguously determining said zenith angle with a first predetermined resolution;
means for analyzing said phase sum functions $\Sigma P(w)$ to determine said zenith angle of said targets with a second predetermined resolution which is higher than said first predetermined resolution.

30. The system of claim 29 further comprising:
means for generating correction factor functions for each of said targets which are a function of a rate of change of said doppler frequencies (w);
means for modifying said complex voltage temporal functions $\underline{V}_1(t)$ and $\underline{V}_2(t)$ from previously generated correction factor functions to correct said complex voltage temporal functions $\underline{V}_1(t)$ and $\underline{V}_2(t)$ for spectral smearing.

31. The system of claim 30 further comprising:
synthetic beam translation means for sequentially scanning said independent sensors at a predetermined scanning rate to synthetically induce a change in said path length between said independent sensors and said targets to synthetically generate a doppler frequency (w).

32. The system of claim 31 wherein said means for generating correction factor functions further comprises:
means for precisely determining said correction factor functions by precisely determining said rate of change of said doppler frequencies (w) from said predetermined scanning rate.

33. The system of claim 29 further comprising:
means for generating spectral phase functions $\phi_1(w)$ from $\underline{V}_1(w)$;
means for generating spectral phase functions $\phi_2(w)$ from $\underline{V}_2(w)$;
phase subtractor means for generating phase delta functions $\Delta\phi_1(w)$ equal to the difference between said spectral phase functions $\phi_1(w)$ for predetermined sets of said independent sensors;

phase subtractor means for generating phase delta functions $\Delta\phi_2(w)$ equal to the difference between said spectral phase functions $\phi_2(w)$ for said predetermined sets of said independent sensors;

means for comparing $\Delta\phi_1(w)$ and $\Delta\phi_2(w)$ for corresponding sets of said predetermined sets of said sensors to identify said targets by determining a common zenith angle indicating a common locational source of said two-frequency pulses reflected from said targets.

34. A system for simultaneously locating a plurality of targets comprising:

transmitter means for transmitting two-frequency pulses to illuminate said targets;

sensor array means having at least three independent sensors spaced a predetermined intervals for detecting said two-frequency pulses reflected from said targets;

phase detector means for producing complex voltage temporal functions $\underline{V}_1(t)$ independently for each of said independent sensors, said complex voltage temporal functions $\underline{V}_1(t)$ derived from a first frequency of said two frequency pulse;

phase detector means for producing complex voltage temporal functions $\underline{V}_2(t)$ independently for each of said independent sensors, said complex voltage temporal functions $\underline{V}_2(t)$ derived from a second frequency of said two-frequency pulse;

spectral transformation means for transforming said complex voltage temporal functions $\underline{V}_1(t)$ and $\underline{V}_2(t)$ to complex voltage doppler frequency functions $\underline{V}_1(w)$ and $\underline{V}_2(w)$;

phase generator means for generating spectral phase functions $\phi_1(w)$ from said complex voltage doppler frequency functions $\underline{V}_1(w)$ and for generating spectral phase functions $\phi_2(w)$ from said complex voltage doppler frequency functions $\underline{V}_2(w)$;

phase subtractor means for generating phase delta functions $\Delta\phi_1(w)$ equal to the difference between said spectral phase functions $\phi_1(w)$ for predetermined sets of said independent sensors;

phase subtractor means for generating phase delta functions $\Delta\phi_2(w)$ equal to the difference between said spectral phase functions $\phi_2(w)$ for said predetermined sets of said independent sensors;

means for comparing $\Delta\phi_1(w)$ and $\Delta\phi_2(w)$ for corresponding sets of said predetermined sets of said sensors to identify said targets by determining a common zenith angle indicating a common locational source of said two-frequency pulses reflected from said targets.

35. The system of claim 34 further comprising:

phase subtractor means for generating phase difference functions $\Delta P(w)$ equal to the difference between $\Delta\phi_1(w)$ and $\Delta\phi_2(w)$ for said corresponding sets of said predetermined sets of said independent sensors, whereby said phase difference function acts as a spectral phase function at a difference frequency equal to the difference between said first and second frequency;

low resolution zenith angle detector means for analyzing said phase difference functions $\Delta P(w)$ to eliminate zenith angle aliasing and unambiguously determine said zenith angle of said targets by selecting said first and second frequency such that said difference frequency has a half wavelength which is greater than said predetermined intervals.

36. The system of claim 34 further comprising:

phase adder means for generating phase sum functions $\Sigma P(w)$ equal to the sum of said phase delta functions $\Delta\phi_1(w)$ and $\Delta\phi_2(w)$ for said corresponding sets of said predetermined sets of said independent sensors whereby said phase sum functions act as spectral phase functions at a sum frequency equal to the sum of said first and second frequency;

high resolution zenith angle detector means for analyzing said phase sum functions $\Sigma P(w)$ to determine said zenith angle of said targets with high resolution using data produced by said low resolution zenith angle means.

37. The system of claim 34 further comprising:

phase subtractor means for generating at least one range phase delta function equal to the difference between $\phi_1(w)$ and $\phi_2(w)$ for a single sensor of said independent sensors;

using said range phase delta function as a proportionality function to calculate the range of said targets within said range gates.

38. The system of claim 34 further comprising:

means for generating a correction factor function which is derived from the rate of change of said doppler frequency (w);

means for modifying said complex voltage temporal functions $\underline{V}_1(t)$ and $\underline{V}_2(t)$ from previously generated correction factor functions to correct said complex voltage temporal functions $\underline{V}_1(t)$ and $\underline{V}_2(t)$ for spectral smearing.

39. The system of claim 34 wherein said means for generating a correction factor function comprises:

means for determining total scalar velocity of a target;

means for generating an exponential function from said total scalar velocity and said detected range.

40. The system of claim 38 further comprising:

synthetic beam translation means for sequentially scanning said independent sensors at a predetermined scanning rate to synthetically generate a doppler frequency (w);

means for precisely determining said correction factor functions by precisely determining said rate of change of said doppler frequencies (w) from said predetermined scanning rate.

41. The system of claim 29 further comprising:

transmitter means for generating a third frequency signal in combination with said two frequency signal to generate a three frequency signal;

means for processing said three frequency signal reflected from said targets to increase range and zenith angle resolution.

* * * * *